(12) United States Patent
Kawai et al.

(10) Patent No.: US 8,319,976 B2
(45) Date of Patent: Nov. 27, 2012

(54) THREE-DIMENSIONAL SHAPE MEASURING SYSTEM AND THREE-DIMENSIONAL SHAPE MEASURING METHOD

(75) Inventors: Yasuhiro Kawai, Tochigi-ken (JP);
Kazuhiko Yamaashi, Utsunomiya (JP);
Kensaku Kaneyasu, Utsunomiya (JP);
Tetsuya Ozawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 392 days.

(21) Appl. No.: 12/820,534

(22) Filed: Jun. 22, 2010

(65) Prior Publication Data
US 2010/0321704 A1 Dec. 23, 2010

(30) Foreign Application Priority Data

| Jun. 23, 2009 | (JP) | 2009-148724 |
| Jun. 25, 2009 | (JP) | 2009-151157 |
| Jul. 2, 2009 | (JP) | 2009-157649 |
| Jul. 16, 2009 | (JP) | 2009-168017 |

(51) Int. Cl.
*G01B 11/24* (2006.01)

(52) U.S. Cl. ......................................................... 356/601
(58) Field of Classification Search .................. 356/601, 356/614; 382/141
See application file for complete search history.

(56) References Cited

U.S. PATENT DOCUMENTS

| 4,498,414 A * | 2/1985 | Kiba et al. ..................... 118/663 |
| 4,941,182 A * | 7/1990 | Patel ............................. 382/141 |
| 2010/0008588 A1* | 1/2010 | Feldkhun et al. ............. 382/206 |

FOREIGN PATENT DOCUMENTS

| JP | 06-307812 | 11/1994 |
| JP | 07-229725 | 8/1995 |

* cited by examiner

*Primary Examiner* — Roy M Punnoose
(74) *Attorney, Agent, or Firm* — Rankin, Hill & Clark LLP

(57) ABSTRACT

Chirped light pulses, the color of which changes regularly with time, are generated and applied to an object to be measured. A reflected light image of the chirped light pulses reflected from the object is acquired. Then, three-dimensional information of the object is acquired using two-dimensional information, color information represented by the reflected light image of the chirped light pulses, and the field of vision of the three-dimensional information to be acquired is enlarged.

18 Claims, 28 Drawing Sheets

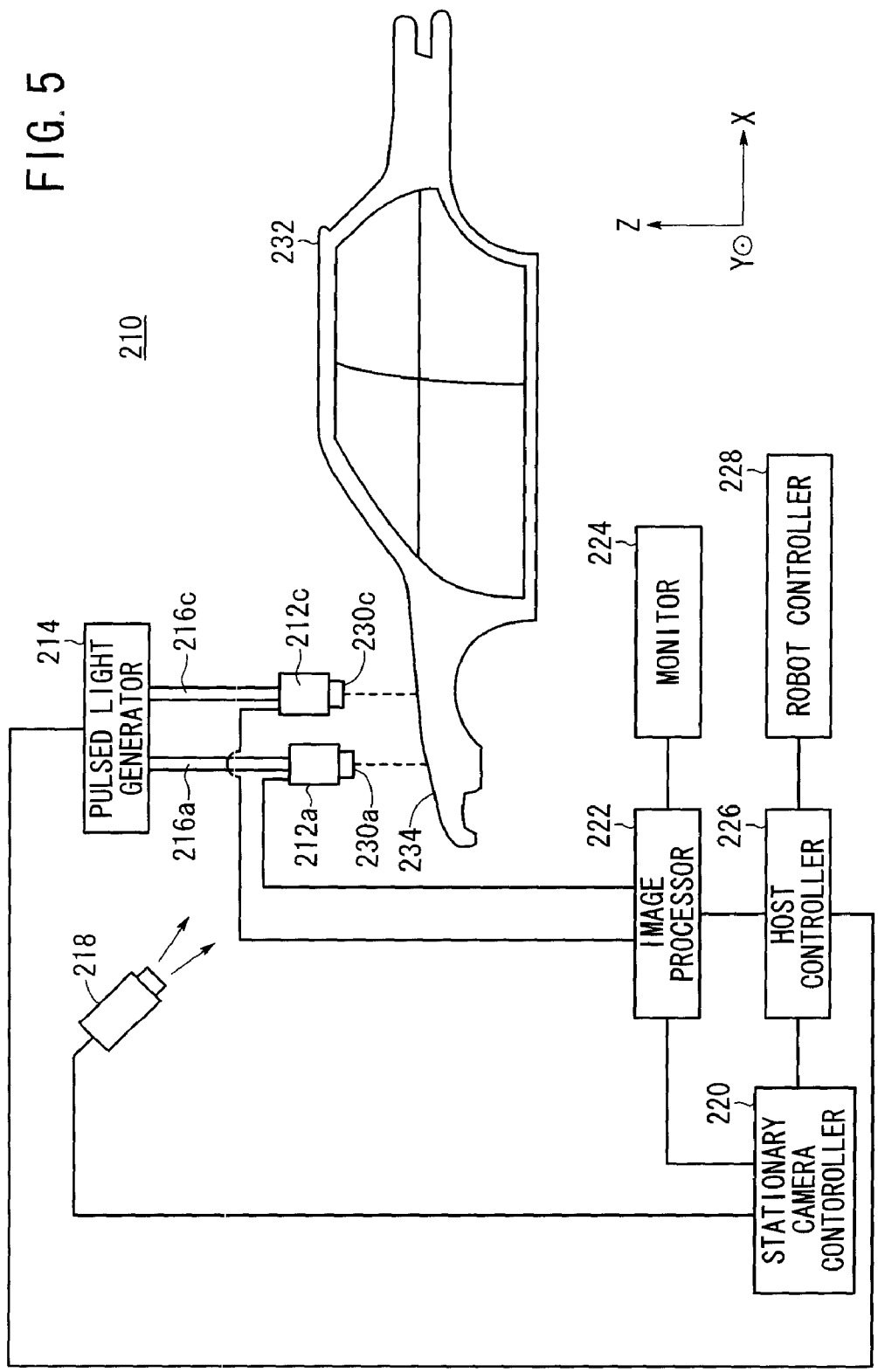

FIG. 9A
| TASK NAME | MEASUREMENT MODE | NUMBER OF CAPTURED IMAGES | PULSED LIGHT QUANTITY REQUIRED FOR MEASUREMENT [%] |
|---|---|---|---|
| $M_1$ | SHORT RANGE | 50 | 20% |
| $M_2$ | NORMAL | 50 | 40% |
| $M_3$ | LONG RANGE | 100 | 60% |
| $M_4$ | NORMAL | 200 | 40% |
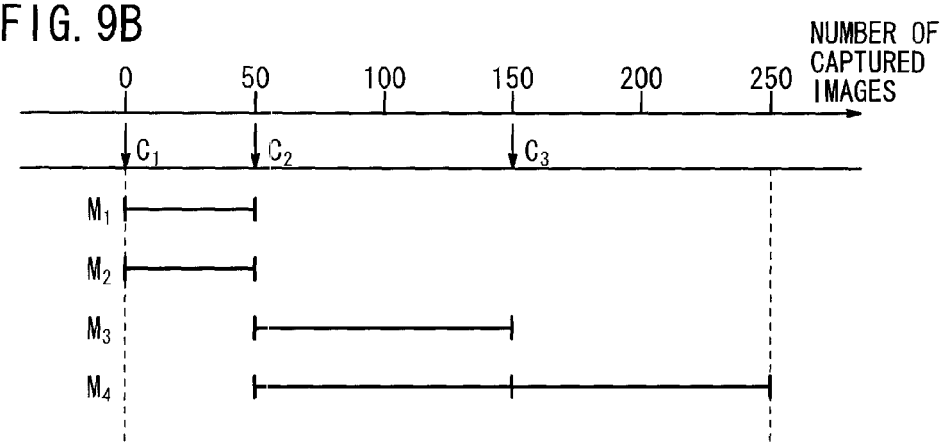
FIG. 9B
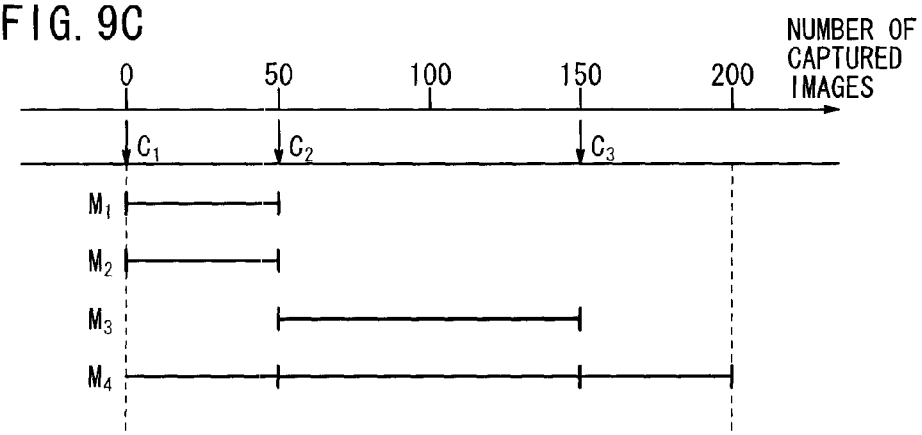
FIG. 9C

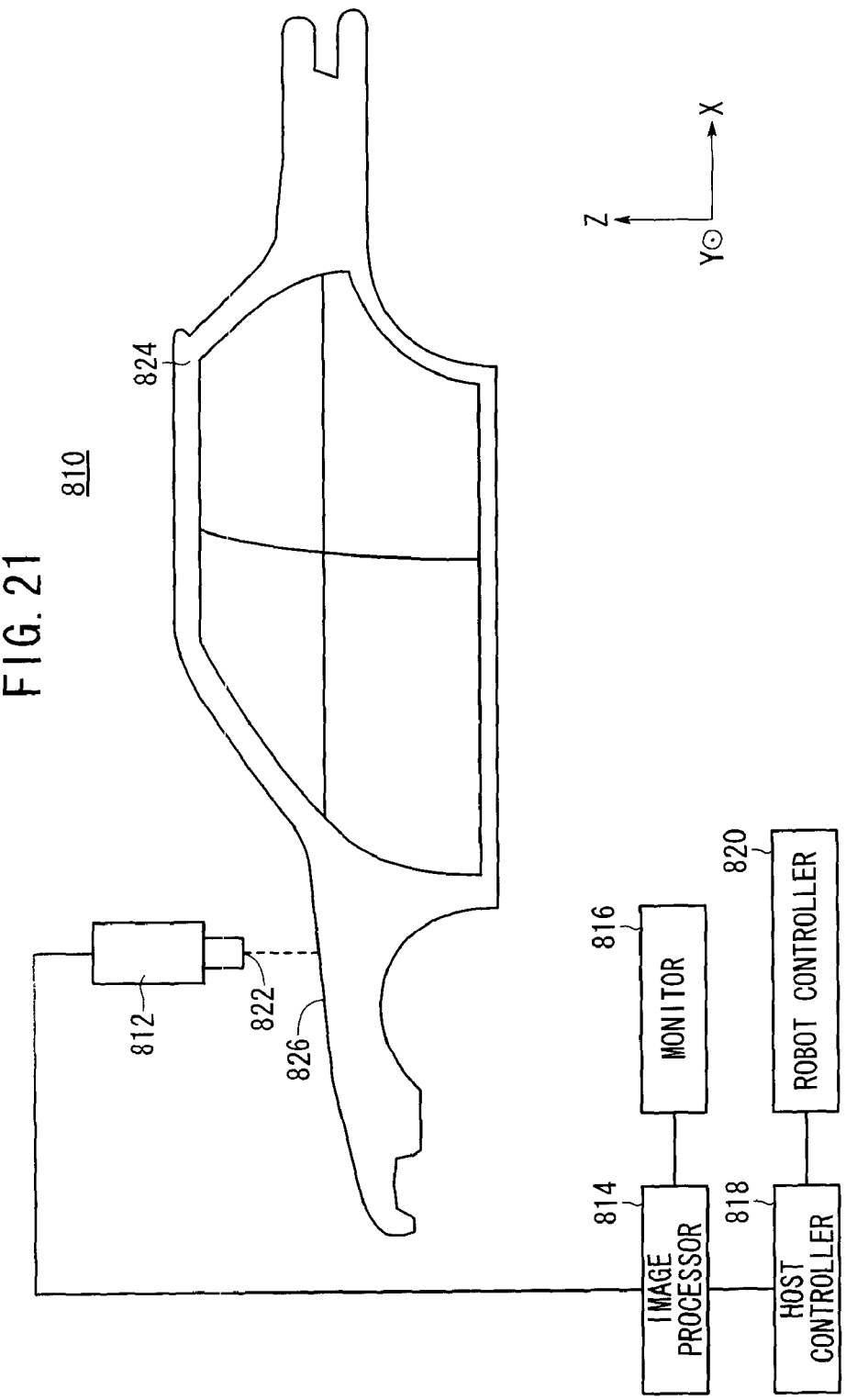

333# THREE-DIMENSIONAL SHAPE MEASURING SYSTEM AND THREE-DIMENSIONAL SHAPE MEASURING METHOD

CROSS-REFERENCE TO RELATED APPLICATION

This application is based upon and claims the benefit of priority from Japanese Patent Applications No. 2009-148724 filed on Jun. 23, 2009, No. 2009-151157 filed on Jun. 25, 2009, No. 2009-157649 filed on Jul. 2, 2009, and No. 2009-168017 filed on Jul. 16, 2009, of which the contents are incorporated herein by reference.

BACKGROUND OF THE INVENTION

1. Field of the Invention

The present invention relates to a three-dimensional shape measuring system and a three-dimensional shape measuring method for measuring the three-dimensional shape of an object.

2. Description of the Related Art

One of various methods for measuring the three-dimensional shape of an object, e.g., a surface defect or smoothness of a coated surface on a workpiece or the like, is known as a TOF (Time Of Flight) method, which utilizes pulsed light.

According to such a TOF method using pulsed light, pulsed light emitted from a pulsed light source is reflected by an irradiated region on a surface of an object, and then the reflected light is detected by a detector. Based on the times of flight (TOF) that the pulsed light takes until it is detected by the detector, as well as on the velocity of light, depthwise distance differences are calculated in order to measure the three-dimensional shape on the surface of the object.

Japanese Patent No. 2500379 discloses a three-dimensional shape measuring apparatus, which converts three-dimensional information into a colored contour map in the form of a two-dimensional image, and detects the three dimensional information using light pulses, the color of which changes regularly with time, i.e., so-called chirped light pulses. The disclosed three-dimensional shape measuring apparatus is capable of measuring the three-dimensional shape of an object highly accurately at a high speed.

However, although the three-dimensional shape measuring apparatus disclosed in Japanese Patent No. 2500379 is able to measure the three-dimensional shape of an object highly accurately, a region (area) irradiated by the pulsed light needs to be established within a small space in order to achieve the desired level of measurement accuracy. Therefore, the disclosed three-dimensional shape measuring apparatus is problematic, in that the region which can be measured in one irradiation cycle, i.e., the measured region, is limited.

SUMMARY OF THE INVENTION

It is an object of the present invention to provide a three-dimensional shape measuring system and a three-dimensional shape measuring method, which are capable of accurately measuring the three-dimensional shape of an object, not only within small, but also within relatively wide measurement regions.

According to the present invention, there is provided a three-dimensional shape measuring system comprising a chirped light pulse generator for generating chirped light pulses the color of which changes regularly with time, a reflected light image acquisition unit for applying chirped light pulses generated by the chirped light pulse generator to an object to be measured, and acquiring a reflected light image of the chirped light pulses reflected from the object, a three-dimensional information acquisition unit for acquiring three-dimensional information of the object using two-dimensional information and color information represented by the reflected light image of the chirped light pulses, which are acquired by the reflected light image acquisition unit, and a field-of-vision enlarging mechanism for enlarging the field of vision of the three-dimensional information acquired by the three-dimensional information acquisition unit.

Since the three-dimensional shape measuring system includes a field-of-vision enlarging mechanism, which enlarges the field of vision of the three-dimensional information acquired by the three-dimensional information acquisition unit, the three-dimensional shape of the object can be measured within a wide field of vision. The three-dimensional shape measuring system has high measuring efficiency, especially when the three-dimensional shape of the object to be measured lies within a relatively wide measurement range.

According to the present invention, there also is provided a three-dimensional shape measuring method comprising a two-dimensional information acquiring step of applying illumination light to an object to be measured in order to acquire two-dimensional information of the object, acquiring a reflected light image of the illumination light that is reflected from the object, and acquiring two-dimensional information represented by the reflected light image of the illumination light. The method further comprises a three-dimensional information acquiring step of generating chirped light pulses, the color of which changes regularly with time, applying the chirped light pulses to the object, acquiring a reflected light image of the chirped light pulses that are reflected from the object, and acquiring three-dimensional information of the object, using the two-dimensional information, and color information represented by the reflected light image of the chirped light pulses. Lastly, the method comprises a step of carrying out the three-dimensional information acquiring step on a location of the object, which is selected based on the two-dimensional information acquired by the two-dimensional information acquiring step.

Since a location on the object is selected based on the two-dimensional information, and the three-dimensional information acquiring step is carried out on the selected location, both two-dimensional information and three-dimensional information of the object can selectively be acquired, allowing the appearance of the three-dimensional shape of the object to be recognized efficiently.

According to the present invention, there also is provided a three-dimensional shape measuring system comprising a chirped light pulse generator for generating chirped light pulses, the color of which changes regularly with time, a single-wavelength light pulse generator for generating single-wavelength light pulses having a predetermined wavelength, a first reflected light image acquisition unit for applying the chirped light pulses generated by the chirped light pulse generator to an object to be measured, and acquiring a reflected light image of the chirped light pulses that are reflected from the object, a second reflected light image acquisition unit for applying the single-wavelength light pulses generated by the single-wavelength light pulse generator to the object, and acquiring a reflected light image of the single-wavelength light pulses that are reflected from the object, a three-dimensional information acquisition unit for acquiring three-dimensional information of the object, using two-dimensional information and color information represented by the reflected light image of the chirped light pulses, which is acquired by the first reflected light image acquisition unit, while referring to two-dimensional information of the reflected light image of the single-wavelength light pulses, which is acquired by the second reflected light image acquisition unit, and an irradiation timing adjuster for adjusting a timing at which the chirped light pulses are applied to the object, and a timing at which the single-wavelength light pulses are applied to the object.

The three-dimensional shape measuring system includes the single-wavelength light pulse generator for generating single-wavelength light pulses, the second reflected light image acquisition unit for acquiring a reflected light image of the single-wavelength light pulses, and the irradiation timing adjuster for applying the single-wavelength light pulses to the object in timed relation to the chirped light pulses that are applied to the object. The single-wavelength light pulses perform a marking function, which allows the chirped light pulses to be regarded as a single long chirped light pulse. The three-dimensional shape measuring system thus is capable of measuring a three-dimensional shape of the object within an enlarged measurement range, without causing a drop in spatial resolution in the depthwise direction of the object.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a schematic side elevational view, partially in block form, of a three-dimensional shape measuring system according to a second embodiment of the present invention;

FIG. 9A is a diagram showing a list of tasks registered in a host controller shown in FIG. 5;

FIG. 9B is a diagram showing a task execution schedule for executing the tasks shown in FIG. 9A according to a first rule;

FIG. 9C is a diagram showing a task execution schedule for executing the tasks shown in FIG. 9A according to a second rule;

FIG. 21 is a schematic side elevational view, partially in block form, of a three-dimensional shape measuring system according to a fifth embodiment of the present invention;

DESCRIPTION OF THE PREFERRED EMBODIMENTS

Three-dimensional shape measuring systems and three-dimensional shape measuring methods according to preferred embodiments of the present invention will be described in detail below with reference to the accompanying drawings.

First, a three-dimensional shape measuring system 10 according to a first embodiment of the present invention will be described below with reference to FIGS. 1 through 4.

Figure 1:
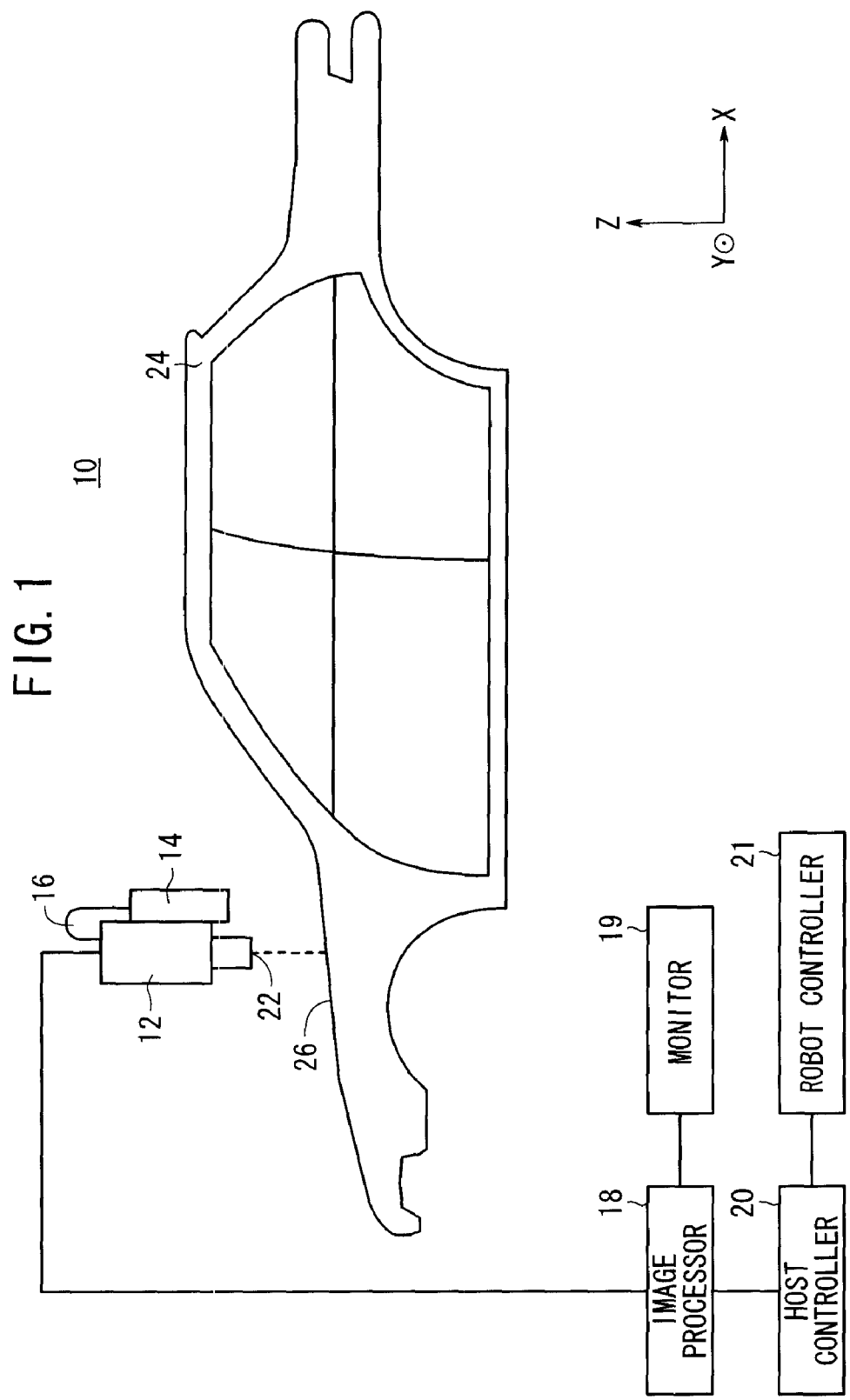
FIG. 1 is a schematic side elevational view, partially in block form, of a three-dimensional shape measuring system according to a first embodiment of the present invention.

As shown in FIG. 1, the three-dimensional shape measuring system 10 comprises a three-dimensional shape measuring apparatus 12, a range finder 14, a cable 16, an image processor 18, a monitor 19, a host controller 20, and a robot controller 21.

The three-dimensional shape measuring apparatus 12 has an image capturing surface 22 facing a surface 26 of a workpiece 24, which serves as an object to be measured. The three-dimensional shape measuring apparatus 12 is mounted on the arm of a robot (not shown) and hence the three-dimensional shape measuring apparatus 12 can be moved vertically and horizontally by the robot arm, which is actuated under the control of the robot controller 21. In FIG. 1, an automotive body is illustrated as the workpiece 24.

The range finder 14 comprises a contactless range finder such as a laser range finder or the like for measuring the distance between the surface 26 of the workpiece 24 and the image capturing surface. 22. Such a distance shall be referred to hereinafter as a "spaced distance". The range finder 14 is fixedly mounted on a side surface of the three-dimensional shape measuring apparatus 12. The range finder 14 is electrically connected by the cable 16 to the three-dimensional shape measuring apparatus 12.

The image processor 18 is electrically connected to the three-dimensional shape measuring apparatus 12 and performs various image processing steps on a captured image signal, which is supplied from the three-dimensional shape measuring apparatus 12.

The monitor 19 is electrically connected to the image processor 18 and displays images processed by the image processor 18, together with measurement information, etc.

The host controller 20 comprises a PLC (Programmable Logic Controller), for example, for sending various commands to the image processor 18 and the robot controller 21, which controls a robot, not shown. The host controller 20 has a control console, not shown, which is used by the operator of the three-dimensional shape measuring system 10 in order to selectively set a plurality of measurement modes, e.g., a normal mode, a short range mode, and a long range mode, to be described later.

Three mutually perpendicular axes, i.e., an X-axis, a Y-axis and a Z-axis, are established with respect to the workpiece 24, as shown in FIG. 1. More specifically, the X-axis extends along the longitudinal direction of the workpiece 24, the Y-axis extends along the transverse direction of the workpiece 24, and the Z-axis extends along the vertical direction of the workpiece 24.

Figure 2:
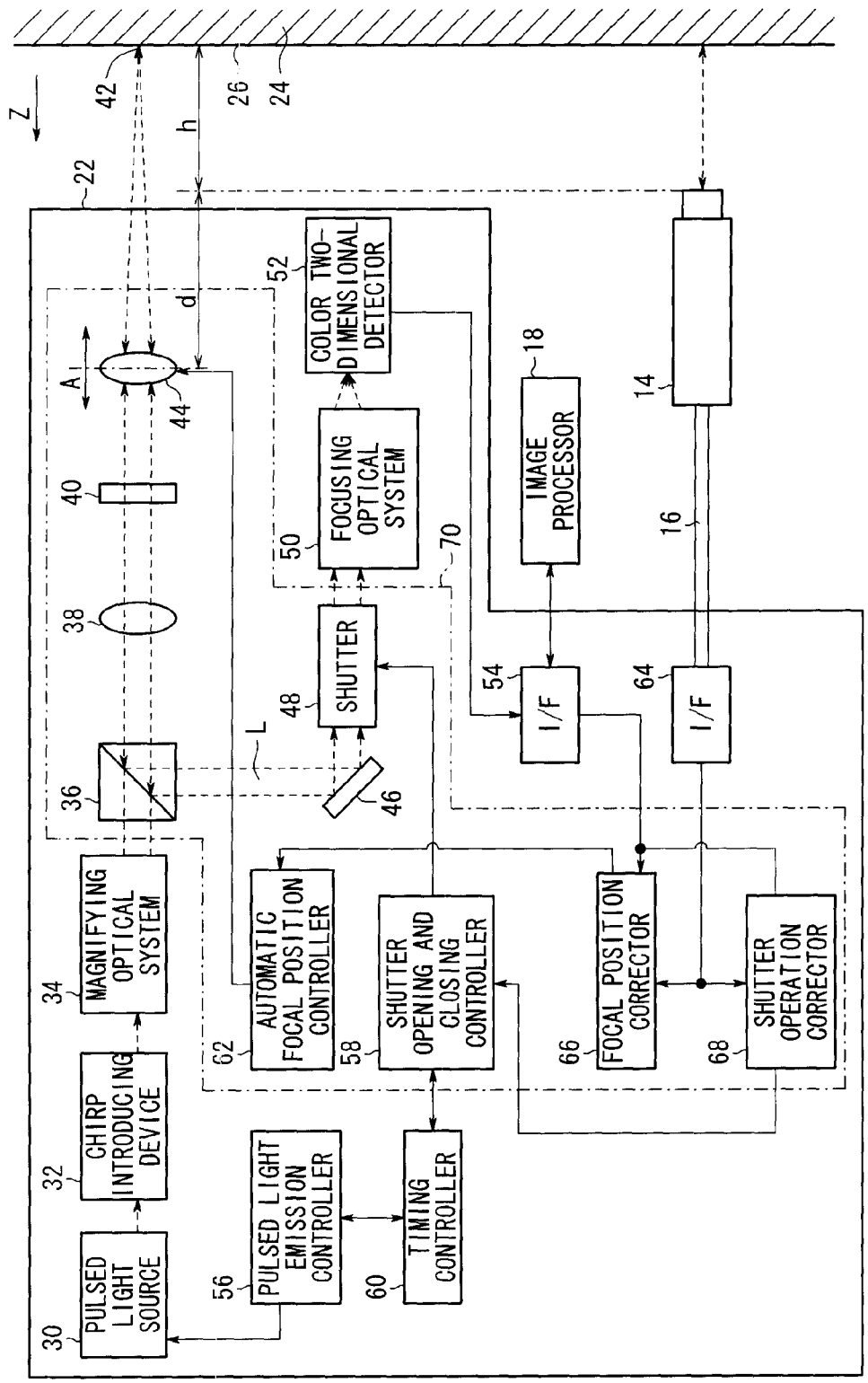
FIG. 2 is a block diagram of the three-dimensional shape measuring apparatus shown in FIG. 1.

FIG. 2 is a block diagram of the three-dimensional shape measuring apparatus 12 shown in FIG. 1.

As shown in FIG. 2, the three-dimensional shape measuring apparatus 12 includes a pulsed light source 30 for emitting pulsed light, a chirp introducing device (chirped light pulse generator) 32 for generating chirped light pulses by chirping the pulsed light emitted from the pulsed light source 30, a magnifying optical system 34 for increasing the beam diameter of the chirped light pulses generated by the chirp introducing device 32, a polarizing beam splitter 36 for splitting the chirped light pulses, the beam diameter of which has been increased by the magnifying optical system 34, depending on the direction of polarization thereof, a collimator lens 38 for parallelizing the chirped light pulses transmitted through the polarizing beam splitter 36, a λ/4 wavelength plate 40 for tilting by a given amount the direction of polarization of the chirped light pulses parallelized by the collimator lens 38, and an objective lens 44 for converging the rays of chirped light pulses polarized by the λ/4 wavelength plate 40 into a focused image (hereinafter referred to as "irradiated region") 42 on the surface 26 of the workpiece 24. The objective lens 44 is movable in the directions indicated by the arrow A, i.e., in directions perpendicular to the workpiece 24, by a drive mechanism, not shown.

The three-dimensional shape measuring apparatus 12 also includes, on a light path L, a reflecting mirror 46 for reflecting the chirped light pulses, which are reflected by the polarizing beam splitter 36, at a given angular direction, a shutter 48 having an openable and closable opaque shutter diaphragm, not shown, for extracting the chirped light pulses reflected by the reflecting mirror 46, a focusing optical system 50 for producing a reflected light image from the chirped light pulses extracted by the shutter 48, and a color two-dimensional detector (three-dimensional information acquisition unit) 52 for converting the reflected light image produced by the focusing optical system 50 into a captured image signal. An interface (I/F) 54 is electrically connected to the image processor 18, for transmitting the captured image signal produced by the color two-dimensional detector 52 to the image processor 18.

The three-dimensional shape measuring apparatus 12 also includes a pulsed light emission controller 56 for controlling emission of the pulsed light from the pulsed light source 30, a shutter opening and closing controller 58 for controlling opening and closing of the shutter diaphragm, not shown, of the shutter 48, a timing controller 60 for controlling the emission timing of the pulsed light from the pulsed light source 30, and the timing at which the shutter diaphragm of the shutter 48 is opened and closed, and an automatic focal position controller 62 for controlling the focus of the image by moving the objective lens 44 in directions indicated by the arrow A, i.e., along the Z-axis.

The three-dimensional shape measuring apparatus 12 also includes an interface (I/F) 64 electrically connected to the range finder 14 by the cable 16, for acquiring a spaced distance h measured by the range finder 14, a focal position corrector 66 for correcting focal position information, which is representative of the position of the objective lens 44, based on the spaced distance acquired by the I/F 64 and the established measurement mode acquired by the I/F 54, and supplying the corrected focal position information to the automatic focal position controller 62, and a shutter operation corrector 68 for correcting the timing and speed at which the shutter 48 is opened and closed (hereinafter referred to as "shutter control information") based on the spaced distance h and the established measurement mode, and supplying the corrected shutter control information to the shutter opening and closing controller 58.

The polarizing beam splitter 36, the collimator lens 38, the λ/4 wavelength plate 40, the objective lens 44, the reflecting mirror 46, the shutter 48, the shutter opening and closing controller 58, the automatic focal position controller 62, the focal position corrector 66, and the shutter operation corrector 68 jointly make up a reflected light image acquisition unit 70 for extracting, at a given timing, a predetermined light quantity of chirped light pulses on the light path L, which are reflected by the workpiece 24, and acquiring a reflected light image of the chirped light pulses. The reflected light image acquisition unit 70 functions as a three-dimensional field-of-vision enlarging mechanism for enlarging the field of vision of the three-dimensional information acquired by the color two-dimensional detector 52.

The focal position corrector 66 serves as an irradiated region scaler for enlarging (widening) or reducing (narrowing) the irradiated region 42 where the workpiece 24 is irradiated with light pulses. The shutter operation corrector 68 serves as a light quantity adjuster for adjusting a given timing, or a predetermined light quantity, by which light pulses are extracted depending on the enlarged or reduced irradiated region 42.

The three-dimensional shape measuring system 10 according to the first embodiment basically is constructed as described above. A measuring operation sequence of the three-dimensional shape measuring system 10 will be described below.

First, the operator, i.e., a user of the three-dimensional shape measuring system 10, makes preparations for a process of measuring a three-dimensional shape of the surface 26 of the workpiece 24 with the three-dimensional shape measuring system 10.

Using the control console, not shown, of the host controller 20, the operator sets one of the normal mode, the short range mode, and the long range mode as a measurement mode. The normal mode is a measurement mode, which is capable of measuring the three-dimensional shape of the surface 26 with a high spatial resolution in the depthwise direction, i.e., along the Z-axis. The normal mode is set when a detailed three-dimensional shape of the surface 26 is to be recognized.

The short range mode is a measurement mode in which the spaced distance h is smaller than in the normal mode. The short range mode is capable of increasing the spatial resolution in the depthwise direction, i.e., the direction along the Z-axis, although the irradiated region 42 (see FIG. 2) is smaller than in the normal mode. The short range mode is appropriate when a three-dimensional shape of a microscopic region in an X-Y plane is to be recognized.

The long range mode is a measurement mode in which the spaced distance h is greater than in the normal mode. The long range mode is capable of widening the irradiated region 42 (see FIG. 2), although the spatial resolution in the depthwise direction, i.e., the direction along the Z-axis, is lower than in the normal mode. The long range mode is appropriate when a three-dimensional shape of a macroscopic region in the X-Y plane is to be recognized.

According to the measurement mode set by the operator, a target value for the size of the irradiated region 42 (hereinafter simply referred to as "the size of the irradiated region 42") is determined. For example, preferably, measurements to be selected are associated with corresponding sizes of the irradiated region 42, so that when the measurement mode is set by the operator, a corresponding size of the irradiated region 42 can be determined. The size of the irradiated region 42, which is determined by the operator using the non-illustrated control console of the host controller 20, is supplied via the image processor 18 and the I/F 54 to the three-dimensional shape measuring apparatus 12, whereupon the size is stored in a memory, not shown.

Then, the host controller 20 sends a command to the robot controller 21 to actuate the arm of the robot, not shown, on which the three-dimensional shape measuring apparatus 12 is mounted into a given position and attitude. The image capturing surface 22 of the three-dimensional shape measuring apparatus 12 faces the surface 26 of the workpiece 24, thereby establishing an irradiated region 42 (see FIG. 2) at a given measuring location on the surface 26.

Then, the spaced distance h between the surface 26 of the workpiece 24 and the image capturing surface 22 is measured automatically or manually by the range finder 14. The measured spaced distance h is supplied from the range finder 14 via the cable 16 and the I/F 6 to the three-dimensional shape measuring apparatus 12, whereupon the spaced distance h is stored in the memory, not shown.

Preparations are now completed for the process of measuring a three-dimensional shape of the surface 26 of the workpiece 24 with the three-dimensional shape measuring system 10.

Then, the operator enters a measurement start instruction using the non-illustrated control console of the host controller 20 in order to start the process of measuring a three-dimensional shape of the surface 26 of the workpiece 24.

As shown in FIG. 2, in response to a pulse emission command from the pulsed light emission controller 56, the pulsed light source 30 emits pulsed light. The pulsed light is chirped by the chirp introducing device 32, thereby generating chirped light pulses. The chirped light pulses are increased in beam diameter by the magnifying optical system 34, and then travel through the polarizing beam splitter 36 to the collimator lens 38, which parallelizes the chirped light pulses. The parallelized chirped light pulses are converted from linearly polarized light into circularly polarized light by the λ/4 wavelength plate 40, and then focused by the objective lens 44 onto the irradiated region 42 on the surface 26 of the workpiece 24.

Before the pulsed light is emitted from the pulsed light source 30, the irradiated region 42 is preset to a desired size. If the size of the irradiated region 42, which is set during preparations for the measuring process, and the measured spaced distance h are the same as standard settings, then the objective lens 44 is not moved, but is left unchanged at a preset Z-axis coordinate.

Conversely, if the size of the irradiated region 42, which is set during preparations for the measuring process, or the measured spaced distance h is different from the standard settings, then since the focal position of the chirped light pulses applied from the three-dimensional shape measuring apparatus 12 changes, the objective lens 44 needs to be moved in the direction indicated by the arrow A (i.e., along the Z-axis) in order to correct the focal position.

More specifically, the size of the irradiated region 42 and the spaced distance h, which correspond to the set measurement mode, are read from the memory and supplied to the focal position corrector 66. Based on the supplied size of the irradiated region 42 and the spaced distance h, the focal position corrector 66 calculates a corrected Z-axis coordinate, i.e., a Z-axis displacement, for the objective lens 44. The calculated Z-axis displacement is supplied to the automatic focal position controller 62. Then, the drive mechanism, not shown, moves the objective lens 44 by the Z-axis displacement amount in the direction indicated by the arrow A, i.e., along the Z-axis.

The Z-axis displacement amount is determined by a combination of the magnifying optical system 34, the collimator lens 38, the objective lens 44, and the distance (h+d) from the central position of the objective lens 44 to the surface 26 of the workpiece 24. Preferably, the relationship between spaced distances h and appropriate Z-axis displacements for the objective lens 44 are stored in the memory as a focal point correcting LUT (Look-Up Table). Such a focal point correcting LUT allows an appropriate Z-axis displacement for the objective lens 44 to be determined easily once a spaced distance h is given.

The irradiated region 42 can thus be preset to a desired size.

As shown in FIG. 2, the chirped light pulses, which are reflected by the irradiated region 42 on the surface 26 of the workpiece 24, are converged by the objective lens 44, converted from circularly polarized light to linearly polarized light by the λ/4 wavelength plate 40, parallelized by the collimator lens 38, reflected so as to travel along the light path L by the polarizing beam splitter 36, and reflected at the given angular direction toward the shutter 48 by the reflecting mirror 46. The shutter 48 extracts a predetermined light quantity of chirped light pulses at a given timing. The focusing optical system 50 produces a reflected light image from the extracted light quantity of the chirped light pulses. The color two-dimensional detector 52 then converts the reflected light image into a captured image signal. The captured image signal is sent via the I/F 54 to the image processor 18, which is located externally of the three-dimensional shape measuring apparatus 12.

Before pulsed light is emitted from the pulsed light source 30, the shutter 48 is set to operate as desired. The timing at which opening and closing of the shutter 48 is started, as well as the timing at which pulsed light emission from the pulsed light source 30 is started, are controlled by the timing controller 60.

If the size of the irradiated region 42 set during preparations for the measuring process and the measured spaced distance h are the same as standard settings, then the shutter 48 is operated according to preset shutter control information.

Conversely, if the size of the irradiated region 42 set during preparations for the measuring process or the measured spaced distance h is different from the standard settings, then since the timing at which the chirped light pulses on the light path L arrive at the shutter 48, or the light quantity of chirped light pulses, changes, it is necessary to correct the shutter control information for the shutter 48.

More specifically, the size of the irradiated region 42 and the spaced distance h, which correspond to the set measurement mode, are read from the memory and supplied to the shutter operation corrector 68. Based on the supplied size of the irradiated region 42 and the spaced distance h, the shutter operation corrector 68 calculates corrected shutter control information. The corrected shutter control information is supplied to the shutter opening and closing controller 58. The shutter opening and closing controller 58 then controls the shutter 48 based on the corrected shutter control information.

Based on the shutter control information, the timing to open and close the shutter 48 is determined by a change $\Delta h$ in the spaced distance h from the standard setting. If the spaced distance h increases from the standard setting by $\Delta h$, then the timing at which the shutter 48 is opened and closed may be changed to lag behind the standard setting by $2\Delta h/c$, where c represents the velocity of light. Conversely, if the spaced distance h decreases from the standard setting by $\Delta h$, then the timing at which the shutter 48 is opened and closed may be changed to lead the standard setting by $2\Delta h/c$.

Based on the shutter control information, the speed of the shutter 48 is determined by the ratio k of the area of the irradiated region 42 to the standard setting. More specifically, the speed of the shutter 48 may be increased or reduced so that the light quantity, which is extracted by opening and closing the shutter 48, becomes k times. The light quantity per unit area in the irradiated region 42, i.e., the light quantity detected by the color two-dimensional detector 52, is thus kept substantially constant. Consequently, the S/N ratio of the captured image signal is prevented from dropping due to insufficient light quantity, and hence the captured image signal is made less susceptible to electric noise.

Since the area of the irradiated region 42 changes in accordance with the spaced distance h, the speed of the shutter 48 also is determined in relation to the spaced distance h. Therefore, preferably, the relationship between sizes of the irradiated region 42, or spaced distances h, and appropriate timings to open and close the shutter 48 are stored as a shutter timing correcting LUT (Look-Up Table) in the memory, so that shutter control information can be determined based on the shutter timing correcting LUT and the focal point correcting LUT.

The shutter 48 can thus be preset to operate desirably.

A three-dimensional shape of the workpiece 24 within the irradiated region 42 on the surface 26 of the workpiece 24 is measured by the above process. More specifically, differences between the times of flight of the chirped light pulses at respective positions in the X-Y plane, i.e., differences between depths along the Z-axis, in the irradiated region 42 are represented as image gradations by light colors (wavelengths), which are simultaneously extracted by opening and closing the shutter 48. If chirped light pulses, the color of which changes continuously from a longer wavelength side (red) at a leading edge thereof to a shorter wavelength side (purple) at a trailing end thereof, are used, then the time for such chirped light pulses to reach the shutter 48 is delayed at a position in the X-Y plane where the depth along the Z-axis is larger. Therefore, the color two-dimensional detector 52 tends to detect a light color on the longer wavelength side at the leading edge of the chirped light pulses.

As shown in FIG. 1, the image processor 18 processes the captured image signal sent from the three-dimensional shape measuring apparatus 12 via the I/F 54, and transmits the processed image signal to the monitor 19, which displays a visible image based on the image signal.

After one measuring cycle by the three-dimensional shape measuring apparatus 12 has finished, the host controller 20 sends a command to the robot controller 21 to actuate the arm of the robot, not shown, on which the three-dimensional shape measuring apparatus 12 is mounted into a given position and attitude. The image capturing surface 22 of the three-dimensional shape measuring apparatus 12 faces the surface 26 of the workpiece 24, thereby establishing an irradiated region 42 (see FIG. 2) in a next measuring location on the surface 26. Thereafter, a measuring cycle of the three-dimensional shape measuring apparatus 12, and a measuring location setting process of the robot controller 21, are repeated until the measuring operation sequence is finished.

Captured images of a three-dimensional shape, which are acquired as described above, will be described below with reference to FIGS. 3A through 4B.

Figure 3A:
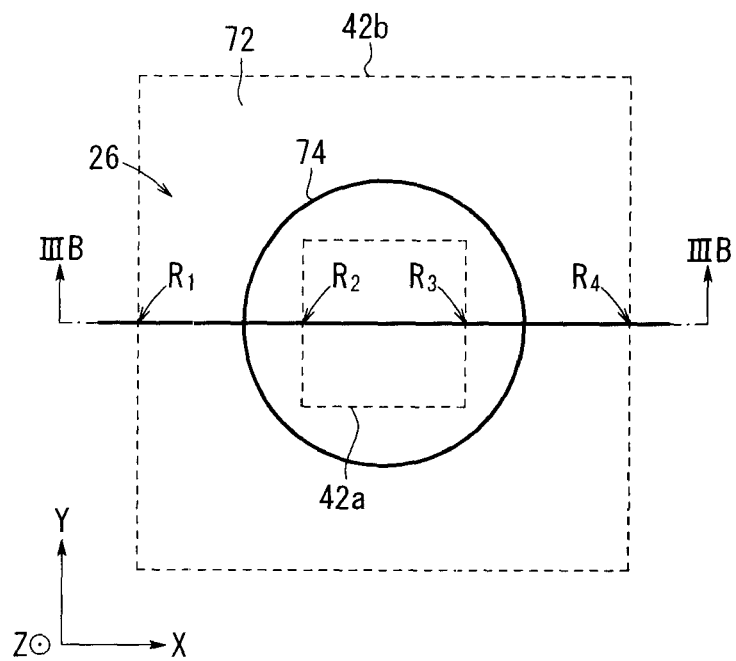
FIG. 3A is a front elevational view, partially omitted, of a surface of an object to be measured.
Figure 3B:
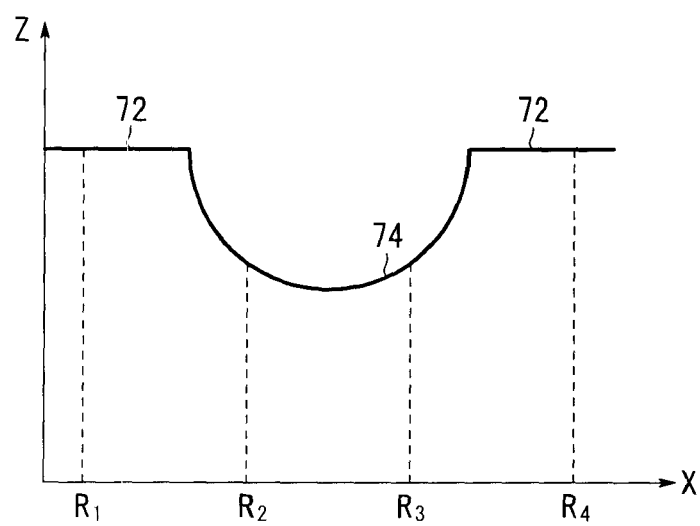
FIG. 3B is a cross-sectional view taken along line IIIB-IIIB of FIG. 3A.

FIG. 3A is a front elevational view, partially omitted, of the surface 26 of the workpiece 24, and FIG. 3B is a cross-sectional view taken along line IIIB-IIIB of FIG. 3A.

As shown in FIG. 3A, the surface 26 of the workpiece 24 has a semispherical dimple 74 defined substantially centrally in a flat surface region 72. It is assumed that the irradiated region in the long distance mode is indicated by 42a, and the irradiated region in the short distance mode is indicated by 42b. The area of the irradiated region 42a is about nine times the area of the irradiated region 42b.

Figure 4A:
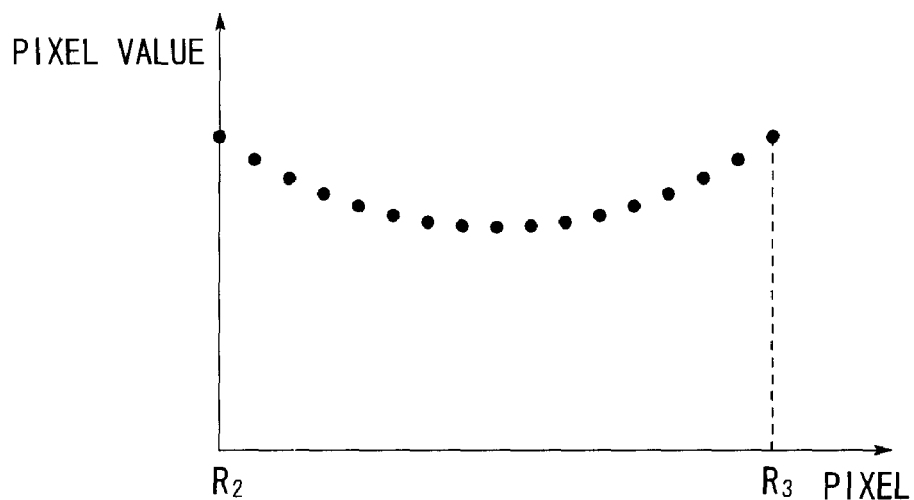
FIG. 4A is a diagram showing a profile of a captured image signal within an irradiated region, which is acquired in a short range mode.
Figure 4B:
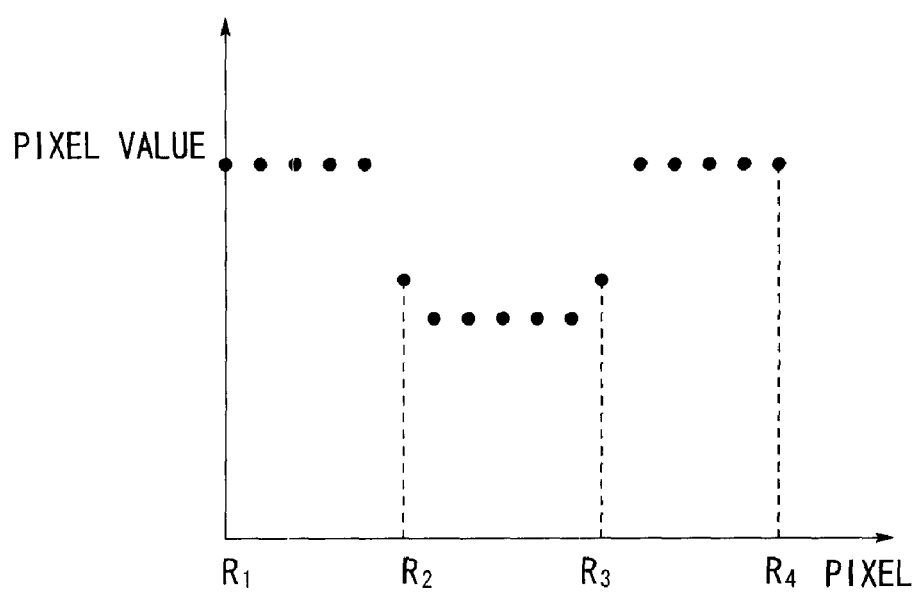
FIG. 4B is a diagram showing a profile of a captured image signal within an irradiated region, which is acquired in a long range mode.

FIG. 4A is a diagram showing a profile of a captured image signal within the irradiated region 42a, which is acquired in the short range mode. FIG. 4B is a diagram showing a profile of a captured image signal within the irradiated region 42b, which is acquired in the long range mode. It is assumed that, as the captured image signal has a larger pixel value, the surface 26 is closer to the image capturing surface 22, and as the captured image signal has a smaller pixel value, the surface 26 is farther from the image capturing surface 22.

The irradiated region 42a in the short range mode is smaller than the irradiated region 42b in the long range mode. However, since the spatial resolution is higher in the depthwise direction, i.e., along the Z-axis, in the short range mode than in the long range mode, the short range mode substantially reproduces the semispherical shape (see FIG. 3B) of the dimple 74 as shown in FIG. 4A. Therefore, the short range mode is suitable when one desires to recognize the detailed three-dimensional shape of a microscopic region (the irradiated region 42a) in the X-Y plane (see FIG. 3A).

On the other hand, since spatial resolution is lower in the depthwise direction, i.e., along the Z-axis, in the long range mode than in the short range mode, the long range mode is unable to reproduce the semispherical shape (see FIG. 3B) of the dimple 74 as shown in FIG. 4B. However, since the irradiated region 42b in the long range mode is greater than the irradiated region 42a in the short range mode, the long range mode allows the flat surface region 72 and the dimple 74 to be compared easily with each other. Therefore, the long range mode is suitable when one desires to recognize a general three-dimensional shape of a macroscopic region (the irradiated region 42b) in the X-Y plane (see FIG. 3A).

The present invention is not limited to the above first embodiment, but various changes and modifications may be made to the illustrated embodiment within the scope of the invention.

For example, according to the first embodiment, the pulsed light source 30, which serves as a light source, and the color two-dimensional detector 52, which serves as a detector, are integrally incorporated into the three-dimensional shape measuring apparatus 12. However, the light source and the detector may be disposed separately from the three-dimensional shape measuring apparatus 12.

Chirped light pulses used to measure a three-dimensional shape are not limited to light pulses in a visible wavelength range, but may be light pulses in an ultraviolet range or an infrared range, or other ranges. Chirped light pulses in such other ranges may be used not only in the first embodiment, but also in the second through third embodiments to be described below.

A three-dimensional shape measuring system 210 according to a second embodiment of the present invention will be described below with reference to FIGS. 5 through 9.

As shown in FIG. 5, the three-dimensional shape measuring system 210 comprises four three-dimensional shape measuring apparatus 212a, 212b, 212c, 212d, a pulsed light generator 214, four optical fiber cables 216a, 216b, 216c, 216d, a stationary camera 218, a stationary camera controller 220, an image processor 222, a monitor 224, a host controller 226, and a robot controller 228. For reasons of expediency, the three-dimensional shape measuring apparatus 212b, 212d, and the optical fiber cables 216b, 216d are omitted from the illustration.

The three-dimensional shape measuring apparatus 212a, 212b, 212c, 212d each have respective image capturing surfaces 230a, 230b, 230c, 230d facing a surface 234 of a workpiece 232, which serves as an object to be measured. The three-dimensional shape measuring apparatus 212a, 212b, 212c, 212d are mounted on the arm of a robot, not shown, and can be moved vertically and horizontally by the robot arm, which is actuated under the control of the robot controller 228. In FIG. 5, an automotive body is illustrated as the workpiece 232.

The pulsed light generator 214 is fixedly disposed above the three-dimensional shape measuring apparatus 212a, 212c. The pulsed light generator 214 is optically connected to the three-dimensional shape measuring apparatus 212a, 212b, 212c, 212d by respective optical fiber cables 216a, 216b, 216c, 216d.

The stationary camera 218, which serves as a three-dimensional position acquisition unit, is fixedly disposed leftwardly and upwardly of the three-dimensional shape measuring apparatus 212a, 212b, 212c, 212d, and faces toward the three-dimensional shape measuring apparatus 212a, 212b, 212c, 212d.

The stationary camera controller 220 is electrically connected to the stationary camera 218 for acquiring a captured image signal supplied from the stationary camera 218.

The image processor 222 is electrically connected to the three-dimensional shape measuring apparatus 212a, 212b, 212c, 212d, and performs various image processing steps on captured image signals supplied from the three-dimensional shape measuring apparatus 212a, 212b, 212c, 212d. The image processor 222, which also serves as a three-dimensional information combiner, is electrically connected to the stationary camera controller 220, and performs various image processing steps on a captured image signal supplied from the stationary camera controller 220.

The monitor 224 is electrically connected to the image processor 222 and displays images processed by the image processor 222, together with measurement information, etc.

The host controller 226 comprises a PLC, for example, and sends various commands to the pulsed light generator 214, the stationary camera controller 220, the image processor 222, and the robot controller 228, which controls the robot, not shown. The host controller 226 has a control console, not shown, which is used by the operator of the three-dimensional shape measuring system 210 to selectively set a plurality of measurement modes, e.g., a normal mode, a short range mode, and a long range mode.

Figure 6:
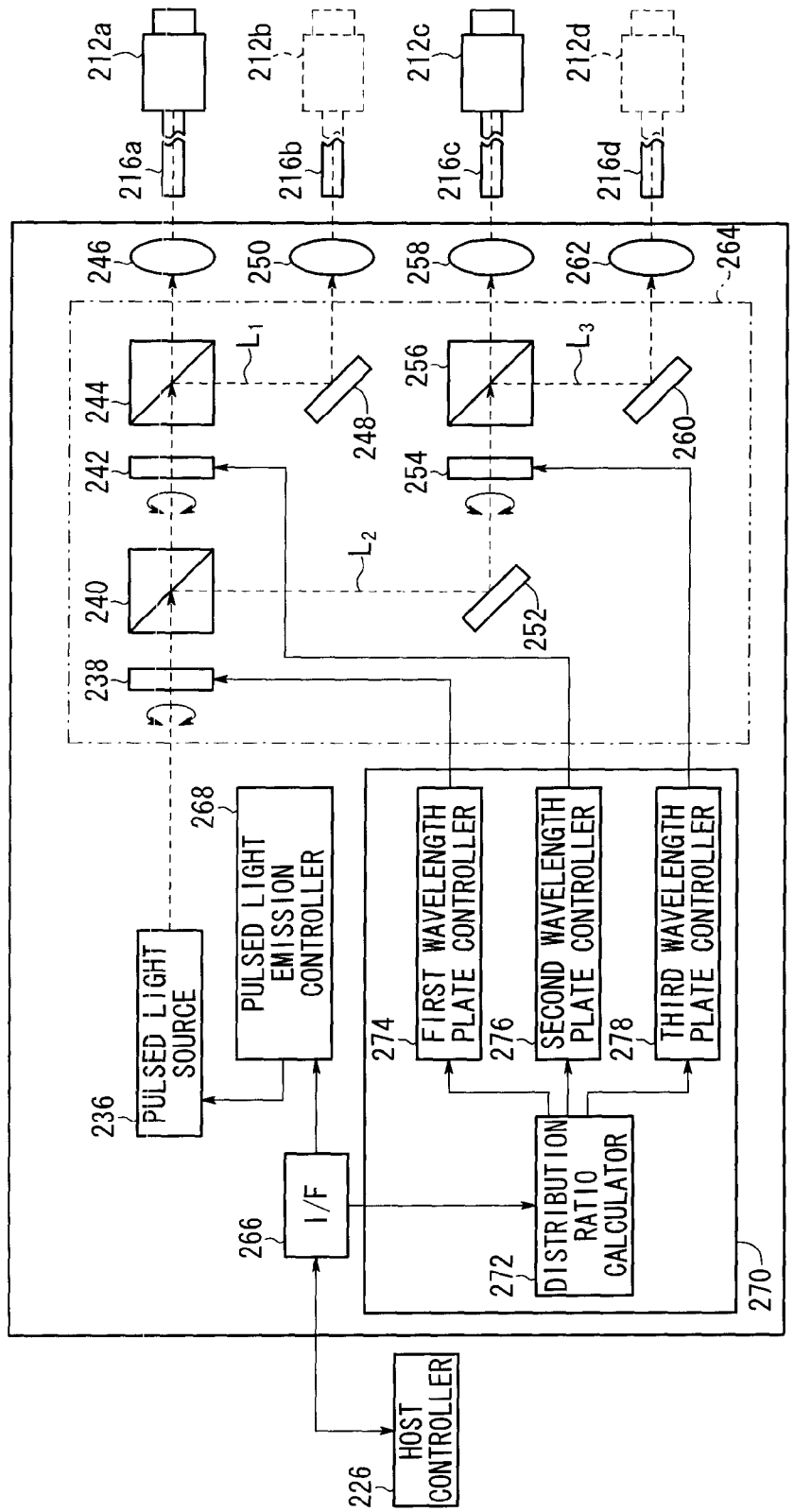
FIG. 6 is a block diagram of a pulsed light generator shown in FIG. 5.

FIG. 6 is a block diagram of the pulsed light generator 214 shown in FIG. 5.

As shown in FIG. 6, the pulsed light generator 214 includes a pulsed light source 236 for emitting pulsed light, a first wavelength plate 238 for tilting the direction of polarization of the pulsed light emitted from the pulsed light source 236 to a given direction, a first polarizing beam splitter 240 for splitting the pulsed light polarized by the first wavelength plate 238 depending on the direction of polarization thereof, a second wavelength plate 242 for tilting the direction of polarization of the pulsed light transmitted through the first polarizing beam splitter 240 to a given direction, a second polarizing beam splitter 244 for splitting the pulsed light polarized by the second wavelength plate 242 depending on the direction of polarization thereof, and a fiber coupling lens 246 for transmitting the pulsed light transmitted through the second polarizing beam splitter 244 to the three-dimensional shape measuring apparatus 212a via an optical fiber cable 216a.

The pulsed light generator 214 also includes, on a light path $L_1$, a reflecting mirror 248 for reflecting the pulsed light from the second polarizing beam splitter 244 at a given angular direction, and a fiber coupling lens 250 for transmitting the light reflected from the reflecting mirror 248 to the three-dimensional shape measuring apparatus 212b via the optical fiber cable 216b.

The pulsed light generator 214 also includes, on a light path $L_2$, a reflecting mirror 252 for reflecting the pulsed light from the first polarizing beam splitter 240 at a given angular direction, a third wavelength plate 254 for tilting the direction of polarization of the light reflected from the reflecting mirror 252 to a given direction, a third polarizing beam splitter 256 for splitting the pulsed light polarized by the third wavelength plate 254 depending on the direction of polarization thereof, and a fiber coupling lens 258 for transmitting the pulsed light transmitted through the third polarizing beam splitter 256 to the three-dimensional shape measuring apparatus 212c via an optical fiber cable 216c.

The pulsed light generator 214 also includes, on a light path $L_3$, a reflecting mirror 260 for reflecting the pulsed light from the third polarizing beam splitter 256 at a given angular direction, and a fiber coupling lens 262 for transmitting the light reflected from the reflecting mirror 260 to the three-dimensional shape measuring apparatus 212d via the optical fiber cable 216d.

The first wavelength plate 238, the second wavelength plate 242, and the third wavelength plate 254 are angularly movable about optical axes thereof by respective drive mechanisms, not shown.

The first wavelength plate 238, the first polarizing beam splitter 240, the second wavelength plate 242, the second polarizing beam splitter 244, the reflecting mirror 248, the reflecting mirror 252, the third wavelength plate 254, the third polarizing beam splitter 256, and the reflecting mirror 260 jointly make up a light distributor 264 for distributing pulsed light emitted from the pulsed light source 236.

The pulsed light generator 214 has an interface (I/F) 266, which is electrically connected to the host controller 226, and can receive a pulse emission instruction from the host controller 226. The pulsed light generator 214 also has a pulsed light emission controller 268.

Measurement information with respect to the three-dimensional shape measuring system 210 (hereinafter simply referred to as "measurement information") is supplied from the host controller 226 via the I/F 266 to a pulsed light distribution controller 270. The pulsed light distribution controller 270 comprises a distribution ratio calculator 272 for determining distribution quantities for the pulsed light based on measurement information supplied from the host controller 226, and for calculating distribution ratios based on the distribution quantities, a first wavelength plate controller 274 for controlling angular movement of the first wavelength plate 238 based on a distribution ratio for the first wavelength plate 238, which is supplied from the distribution ratio calculator 272, a second wavelength plate controller 276 for controlling angular movement of the second wavelength plate 242 based on a distribution ratio for the second wavelength plate 242, which is supplied from the distribution ratio calculator 272, and a third wavelength plate controller 278 for controlling angular movement of the third wavelength plate 254 based on a distribution ratio for the third wavelength plate 254, which is supplied from the distribution ratio calculator 272.

Measurement information refers not only to measuring conditions representing a measurement mode, the distance up to the workpiece 232, the size of an irradiated region 294, etc., but also information concerning measurement, including an image count, a region to be measured, and the type of the workpiece 232.

Figure 7:
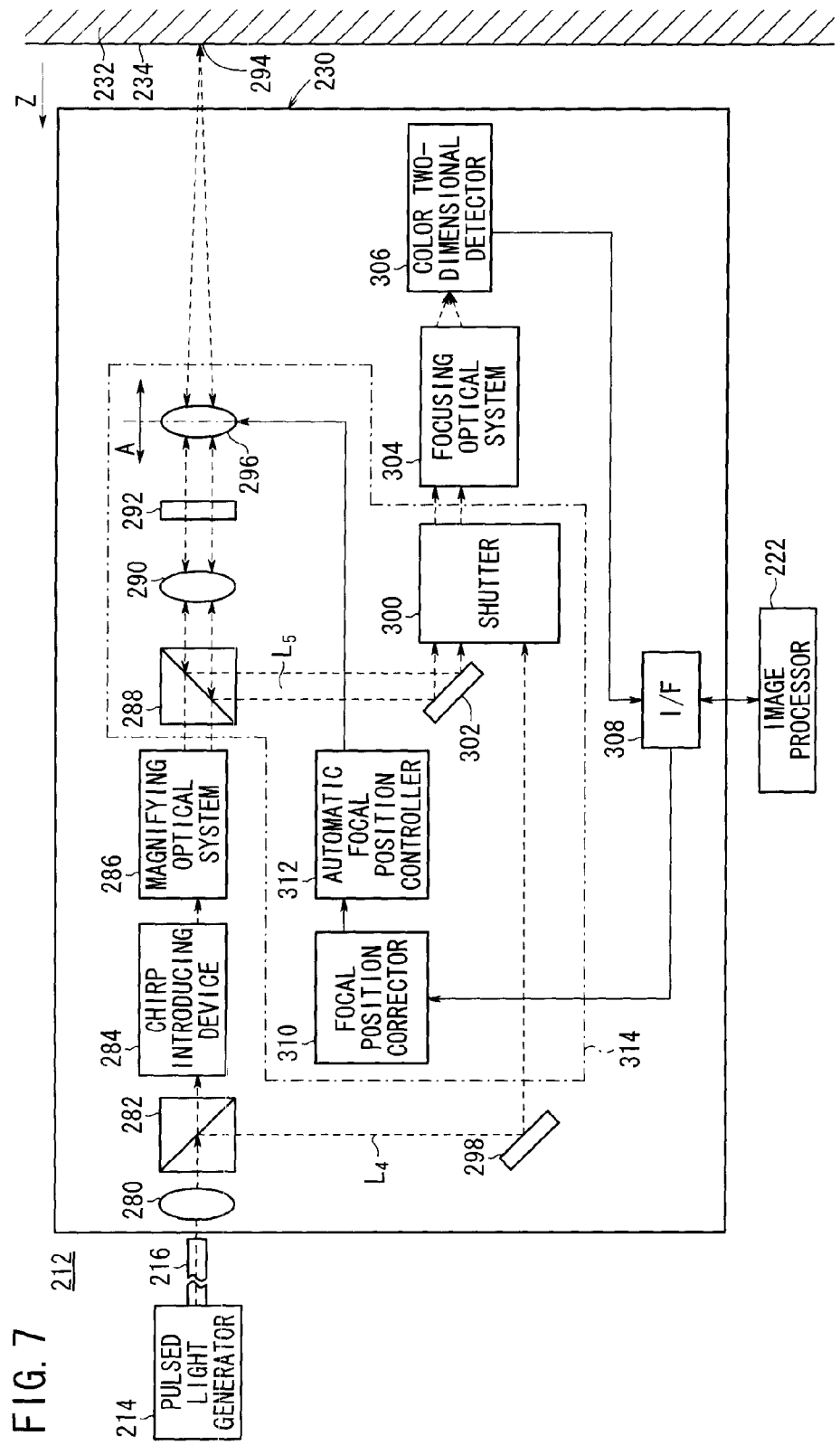
FIG. 7 is a block diagram of a three-dimensional shape measuring apparatus shown in FIG. 5.

FIG. 7 is a block diagram of each of the three-dimensional shape measuring apparatus shown in FIG. 5. The three-dimensional shape measuring apparatus 212a, 212b, 212c, 212d are identical in structure to each other, and will collectively be referred to as a three-dimensional shape measuring apparatus 212, without the suffixes "a", "b", "c" and "d".

As shown in FIG. 7, the three-dimensional shape measuring apparatus 212 includes a fiber coupling lens 280 for receiving pulsed light from the pulsed light generator 214 via an optical fiber cable 216, a beam splitter 282 for splitting the pulsed light received by the fiber coupling lens 280, a chirp introducing device (a plurality of chirped light pulse generators) 284 for generating chirped light pulses by chirping the pulsed light transmitted through the beam splitter 282, a magnifying optical system 286 for increasing the beam diameter of the chirped light pulses generated by the chirp introducing device 284, a polarizing beam splitter 288 for splitting the chirped light pulses, the beam diameter of which has been increased by the magnifying optical system 286, depending on the direction of polarization thereof, a collimator lens 290 for parallelizing the chirped light pulses transmitted through the polarizing beam splitter 288, a λ/4 wavelength plate 292 for tilting the direction of polarization of the chirped light pulses parallelized by the collimator lens 290 to a given direction, and an objective lens 296 for converging rays of the chirped light pulses polarized by the λ/4 wavelength plate 292 into a focused image (irradiated region 294) on the surface 234 of the workpiece 232. The objective lens 296 is movable in the directions indicated by the arrow A, i.e., directions perpendicular to the workpiece 232, by a drive mechanism, not shown.

The three-dimensional shape measuring apparatus 212 also includes, on a light path $L_4$, a reflecting mirror 298 for reflecting the pulsed light from the beam splitter 282 at a given angular direction, and a shutter 300 which opens and closes when triggered by light reflected by the reflecting mirror 298 as exciting light. The shutter 300 comprises an ultrahigh-speed nonlinear optical shutter or the like.

The three-dimensional shape measuring apparatus 212 further includes, on a light path $L_5$, a reflecting mirror 302 for reflecting chirped light pulses reflected by the polarizing beam splitter 288 at a given angular direction, a shutter 300 for extracting the chirped light pulses reflected by the reflecting mirror 302, a focusing optical system 304 for producing a reflected light image from the chirped light pulses extracted by the shutter 300, and a color two-dimensional detector (three-dimensional information acquisition unit) 306 for converting the reflected light image produced by the focusing optical system 304 into a captured image signal. An I/F 308 is electrically connected to the image processor 222 for transmitting the captured image signal produced by the color two-dimensional detector 306 to the image processor 222. The I/F 308 also serves to acquire an established measurement mode entered from the host controller 226 via the image processor 222.

The three-dimensional shape measuring apparatus 212 also includes a focal position corrector 310 for correcting focal position information, which is representative of the position of the objective lens 296, based on an established measurement mode acquired by the I/F 308, and an automatic focal position controller 312 for controlling the focus of the image by moving the objective lens 296 in the directions indicated by the arrow A, i.e., along the Z-axis, based on the focal position corrected by the focal position corrector 310.

The polarizing beam splitter 288, the collimator lens 290, the λ/4 wavelength plate 292, the objective lens 296, the reflecting mirror 302, the shutter 300, the focal position corrector 310, and the automatic focal position controller 312 jointly make up a reflected light image acquisition unit 314 (more specifically, a plurality of reflected light image acquisition units 314a through 314d) for extracting a predetermined light quantity of chirped light pulses on the light path $L_5$, which are reflected by the workpiece 232, and acquiring a reflected light image of the chirped light pulses.

The three-dimensional shape measuring system 210 functions as a three-dimensional field-of-vision enlarging mechanism for enlarging the field of vision of three-dimensional information by applying chirped light pulses from a plurality of paths (the three-dimensional shape measuring apparatus 212a through 212d) to respective irradiated regions 294 of the workpiece 232, and then acquiring reflected images from the respective irradiated regions 294 with the respective color two-dimensional detectors 306.

The three-dimensional shape measuring system 210 according to the second embodiment basically is constructed as described above. A measuring operation sequence of the three-dimensional shape measuring system 210 will be described below.

First, an operator (i.e., the user) of the three-dimensional shape measuring system 210 makes preparations for a process of measuring a three-dimensional shape of the surface 234 of the workpiece 232 with the three-dimensional shape measuring system 210. A measurement mode is established by the operator in the same manner as described above according to the first embodiment, and will not be described below.

Then, the host controller 226 sends a command to the robot controller 228 to actuate the arm of the robot, not shown, on which the three-dimensional shape measuring apparatus 212a, 212b, 212c, 212d are mounted, into a given position and attitude. Image capturing surfaces 230a, 230b, 230c, 230d of the three-dimensional shape measuring apparatus 212a, 212b, 212c, 212d face toward the surface 234 of the workpiece 232, thereby establishing respective irradiated regions 294 (see FIG. 7) within a given measuring location on the surface 234.

Preparations are now completed for the process of measuring a three-dimensional shape of the surface 234 of the workpiece 232 with the three-dimensional shape measuring system 210.

Then, the operator enters a measurement start instruction using the non-illustrated control console of the host controller 226 in order to start a process of measuring a three-dimensional shape of the surface 234 of the workpiece 232.

As shown in FIG. 6, in response to a pulse emission command from the host controller 226 via the I/F 266 and the pulsed light emission controller 268, the pulsed light source 236 emits pulsed light. The first wavelength plate 238 tilts the direction of polarization of the pulsed light to a given direction. The pulsed light then is transmitted through the first polarizing beam splitter 240. The second wavelength plate 242 tilts the direction of polarization of the pulsed light to a given direction. The pulsed light then is transmitted through the second polarizing beam splitter 244. The fiber coupling lens 246 converges the rays of pulsed light, whereupon the pulsed light is supplied through the optical fiber cable 216a to the three-dimensional shape measuring apparatus 212a.

The pulsed light, which is tilted to the given direction by the second wavelength plate 242, is reflected so as to travel along the light path $L_1$ by the second polarizing beam splitter 244, and the pulsed light is reflected at the given angular direction toward the fiber coupling lens 250 by the reflecting mirror 248. The fiber coupling lens 250 converges the rays of pulsed light, whereupon the pulsed light is supplied through the optical fiber cable 216b to the three-dimensional shape measuring apparatus 212b.

The pulsed light, which is tilted to the given direction by the first wavelength plate 238, is reflected so as to travel along the light path $L_2$ by the first polarizing beam splitter 240, and the pulsed light is reflected at the given angular direction toward the third wavelength plate 254 by the reflecting mirror 252. Then, the third wavelength plate 254 tilts the direction of polarization of the pulsed light to the given direction. The pulsed light then is transmitted through the third polarizing beam splitter 256. The fiber coupling lens 258 converges the rays of pulsed light, whereupon the pulsed light is supplied through the optical fiber cable 216c to the three-dimensional shape measuring apparatus 212c.

The pulsed light, which is tilted to the given direction by the third wavelength plate 254, is reflected so as to travel along the light path $L_3$ by the third polarizing beam splitter 256, and the pulsed light is reflected at the given angular direction toward the fiber coupling lens 262 by the reflecting mirror 260. The fiber coupling lens 262 converges the rays of pulsed light, whereupon the pulsed light is supplied through the optical fiber cable 216d to the three-dimensional shape measuring apparatus 212d.

Before the pulsed light has been emitted from the pulsed light source 236, the pulsed light source 236 presets to a desired light quantity the pulsed light to be supplied to the three-dimensional shape measuring apparatus 212a. The transmittance (or reflectance) of the first polarizing beam splitter 240 can freely be controlled by angularly moving the first wavelength plate 238 through a given angle in order to adjust the direction of polarization of the pulsed light. Similarly, the transmittance (or reflectance) of the second polarizing beam splitter 244 can freely be controlled by angularly moving the second wavelength plate 242 through a given angle in order to adjust the direction of polarization of the pulsed light, and the transmittance (or reflectance) of the third polarizing beam splitter 256 can freely be controlled by angularly moving the third wavelength plate 254 through a given angle in order to adjust the direction of polarization of the pulsed light. Transmittances (or reflectances) of the first polarizing beam splitter 240, the second polarizing beam splitter 244, and the third polarizing beam splitter 256 can appropriately be combined so as to establish a desired distribution ratio for the pulsed light, which is supplied to the three-dimensional shape measuring apparatus 212a, 212b, 212c, 212d.

As shown in FIG. 7, pulsed light distributed from the pulsed light generator 214 is received by the three-dimensional shape measuring apparatus 212 via the optical fiber cable 216 and the fiber coupling lens 280. The pulsed light is transmitted through the beam splitter 282 and chirped by the chirp introducing device 284, thereby generating chirped light pulses. Such chirped light pulses are increased in beam diameter by the magnifying optical system 286, and then travel through the polarizing beam splitter 288 toward the collimator lens 290, which parallelizes the chirped light pulses. The parallelized chirped light pulses are converted from linearly polarized light into circularly polarized light by the λ/4 wavelength plate 292, and then focused by the objective lens 296 onto the irradiated region 294 on the surface 234 of the workpiece 232.

Before pulsed light is emitted from the pulsed light source 236 of the pulsed light generator 214, the irradiated region 294 is preset to a desired size. The size of the irradiated region 294 and the spaced distance, which correspond to the set measurement mode, are read from a memory, not shown, and supplied to the focal position corrector 310. Based on the size of the irradiated region 294 and the spaced distance that are supplied, the focal position corrector 310 calculates a corrected Z-axis coordinate for the objective lens 296, i.e., a Z-axis displacement. The calculated Z-axis displacement is supplied to the automatic focal position controller 312. Then, the drive mechanism, not shown, moves the objective lens 296 by the Z-axis displacement in a direction indicated by the arrow A, i.e., along the Z-axis.

The Z-axis displacement is determined by a combination of the magnifying optical system 286, the collimator lens 290, the objective lens 296, and the distance from the central position of the objective lens 296 to the surface 234 of the workpiece 232.

The irradiated region 294 can thus be preset to a desired size.

As shown in FIG. 7, chirped light pulses reflected by the irradiated region 294 on the surface 234 of the workpiece 232 are converged by the objective lens 296, converted from circularly polarized light into linearly polarized light by the λ/4 wavelength plate 292, parallelized by the collimator lens 290, reflected so as to travel along the light path $L_5$ by the polarizing beam splitter 288, and reflected at a given angular direction toward the shutter 300 by the reflecting mirror 302. The shutter 300 extracts a predetermined light quantity of chirped light pulses at a given timing. The focusing optical system 304 produces a reflected light image from the extracted light quantity of chirped light pulses. The color two-dimensional detector 306 then converts the reflected light image into a captured image signal. The captured image signal is sent via the I/F 308 to the image processor 222, which is disposed externally of the three-dimensional shape measuring apparatus 212.

Pulsed light, which is transmitted through the fiber coupling lens 280, is reflected so as to travel along a light path $L_4$ by the beam splitter 282, and then the pulsed light is reflected at a given angular direction by a reflecting mirror 298. The pulsed light is applied to the shutter 300. The shutter 300, which comprises an ultrahigh-speed nonlinear optical shutter or the like, is opened only when pulsed light, which acts as exciting light, reaches the shutter 300. The shutter 300 can realize a response time with a range from picoseconds to femtoseconds. The shutter 300 can be opened and closed at an appropriate timing by setting the light path $L_5$ to an appropriate length.

The image processor 222 processes the captured image signal sent from the three-dimensional shape measuring apparatus 212 via the I/F 308, and sends the processed image signal to the monitor 224 (see FIG. 5), which displays a visible image based on the image signal. Based on the displayed visible image, the operator can analyze and recognize a three-dimensional shape of the workpiece 232 that resides within the irradiated region 294 on the surface 234.

When the three-dimensional shape measuring apparatus 212 performs one image capturing cycle, the three-dimensional shape measuring system 210 acquires a captured image signal having image gradations and a spatial resolution therein (see FIGS. 3A through 4B) as described above.

After one image capturing cycle by the three-dimensional shape measuring apparatus 212 has been completed, the host controller 226 sends a command to the robot controller 228 in order to actuate the robot arm, not shown, on which the three-dimensional shape measuring apparatus 212 is mounted, into a given position and attitude. The image capturing surface 230 of the three-dimensional shape measuring apparatus 212 faces toward the surface 234 of the workpiece 232, thereby establishing an irradiated region 294 (see FIG. 7) at a next measuring location on the surface 234. Thereafter, an image capturing cycle of the three-dimensional shape measuring apparatus 212, and a measuring location setting process for the robot controller 228, are repeated a given number of times to perform processes (hereinafter referred to as "tasks") for measuring the total range of the measurement region on the surface 234 of the workpiece 232.

The four three-dimensional shape measuring apparatus 212a, 212b, 212c, 212d each measures three-dimensional shapes, respectively, concurrently according to a task management process performed by the host controller 226. An operation sequence of the three-dimensional shape measuring system 210 for executing a plurality of tasks will be described in detail below with reference to FIG. 8.

First, measurement information of the three-dimensional shape measuring system 210 is acquired in step S1. Such measurement information represents the number of tasks TN to be performed by the three-dimensional shape measuring apparatus 212, measurement modes (a normal mode, a short range mode, and a long range mode), and an image count (number of shots). It is assumed for illustrative purposes that one task is assigned to each three-dimensional shape measuring apparatus 212. After the measuring process has started, the number of remaining tasks TN does not increase.

In step 2, a distribution ratio for the pulsed light to be distributed to the three-dimensional shape measuring apparatus 212 is calculated, and then the calculated distribution ratio is set in the light distributor 264. The distribution ratio refers to a ratio by which the pulsed light is to be distributed if the maximum light quantity of pulsed light that can be generated by the pulsed light source 236 is 100%.

Then, tasks to which the pulsed light is distributed are carried out in step S3. The tasks are continuously carried out until at least one of the tasks is completed in step S4. Since each of the three-dimensional shape measuring apparatus 212 has its own reflected light image acquisition unit 314, the three-dimensional shape measuring system 210 is capable of executing a plurality of different tasks. The three-dimensional shape measuring system 210 is capable of completing not only one task, but also n tasks (where n is a natural number).

The number of remaining tasks TN (TN=TN−n) is counted in step S5. If the number of remaining tasks TN is not 0 ("NO" in step S6), then a distribution ratio for the pulsed light to be distributed to the three-dimensional shape measuring apparatus 212 is recalculated, and the calculated distribution ratio is set again in the light distributor 264 in step S3. Steps S2 through S6 are repeated until the number of remaining tasks TN becomes 0.

Figure 8:
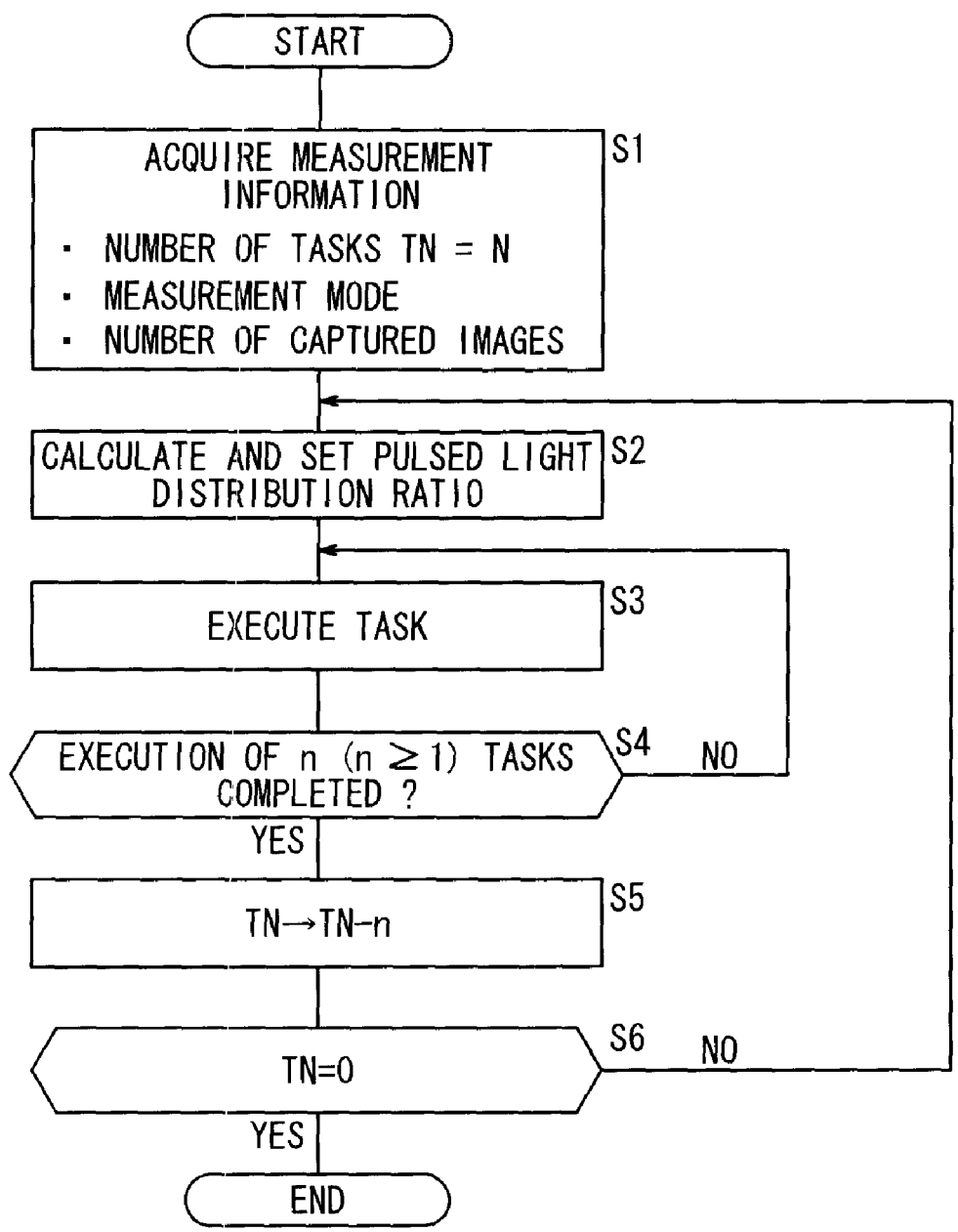
FIG. 8 is a flowchart of a sequence for executing a plurality of tasks using the three-dimensional shape measuring system shown in FIG. 5.

A task execution schedule of the three-dimensional shape measuring system 210, particularly with respect to the specific example of step S2 shown in FIG. 8, will be described below with reference to FIGS. 9A through 9C.

FIG. 9A is a diagram showing a list of tasks registered in the host controller 226 of the three-dimensional shape measuring system 210. In the example shown in FIG. 9A, four tasks $M_1$, $M_2$, $M_3$, $M_4$ are registered in the host controller 226.

In FIG. 9A, the pulsed light quantity required for measurement refers to a pulsed light quantity required for each measurement mode, assuming that the maximum light quantity of pulsed light that can be generated by the pulsed light source 236 has a reference level of 100%. In the present example, 20% is set as a recommended pulsed light quantity required for the short range mode in task $M_1$, 40% is set for the normal mode in tasks $M_2$ and $M_4$, and 60% is set for the long range mode in task $M_3$.

Since the sum of the pulsed light quantities in the tasks $M_1$, $M_2$, $M_3$, $M_4$ is 160%, and thus exceeds 100%, the pulsed light quantities cannot be distributed directly per se. One solution would be to adjust the pulsed light quantities at the distribution ratio. For example, 14% may be set as a pulsed light quantity in task $M_1$, 25% may be set in task $M_2$, 36% may be set in task $M_3$, and 25% may be set in task $M_4$.

However, if the pulsed light quantity used for measurement is reduced, then since the light quantity detected by the color two-dimensional detector 306 also is reduced, the S/N ratio of the captured image signal becomes reduced, thus making the captured image signal more susceptible to electric noise. Therefore, measurement accuracy is likely to be lowered. In view of such difficulties, it is preferable to assign priorities to respective tasks, and to execute the tasks successively according to such priorities.

FIG. 9B is a diagram showing a task execution schedule for executing the tasks shown in FIG. 9A, according to a first rule. The first rule is that priorities for executing tasks are determined by the order in which such tasks are registered. Initially, the tasks $M_1$, $M_2$, $M_3$, $M_4$ are registered in a descending order of priorities, as shown in FIG. 9A.

At a first distribution ratio calculation time $C_1$, the tasks $M_1$, $M_2$, $M_3$, $M_4$, are in a descending order of priorities. Since the sum of the pulsed light quantities in the tasks $M_1$, $M_2$, $M_3$, $M_4$ is 160%, and thus exceeds 100%, only two tasks $M_1$ and $M_2$ are executed concurrently with each other. When an image count of 50 is reached, execution of the two tasks $M_1$ and $M_2$ is completed.

At a second distribution ratio calculation time $C_2$, the remaining two tasks $M_3$ and $M_4$ are in a descending order of priorities. Since the sum of the pulsed light quantities in the tasks $M_3$ and $M_4$ is 100% and does not exceed 100%, the two tasks $M_3$ and $M_4$ are executed concurrently with each other. When an image count of 100 is reached, execution of the task $M_3$ is completed.

At a third distribution ratio calculation time $C_3$, the remaining task $M_4$ is executed. When an image count of 100 is reached, execution of the task $M_4$ is completed.

Therefore, if a distribution ratio is calculated according to the first rule, all the tasks $M_1$, $M_2$, $M_3$, $M_4$ are finished when an image count of 250 is reached.

FIG. 9C is a diagram showing a task execution schedule for executing the tasks shown in FIG. 9A according to a second rule. The second rule requires that tasks with smaller pulsed light quantities required for measurement are preferentially executed, whereas priorities for executing tasks with equal pulsed light quantities required for measurement are determined by the order in which such tasks are registered. Initially, the tasks $M_1$, $M_2$, $M_4$, $M_3$ are in a descending order of priorities, as shown in FIG. 9A.

At a first distribution ratio calculation time $C_1$, the tasks $M_1$, $M_2$, $M_4$, $M_3$ are in a descending order of priorities. Since the sum of the pulsed light quantities in the tasks $M_1$, $M_2$, $M_4$, $M_3$ is 160%, and thus exceeds 100%, the three tasks $M_1$, $M_2$ and $M_4$ are executed concurrently with each other. When an image count of 50 is reached, execution of the two tasks $M_1$ and $M_2$ is completed.

At a second distribution ratio calculation time $C_2$, the remaining two tasks $M_4$ and $M_3$ are in a descending order of priorities. Since the sum of the pulsed light quantities in the tasks $M_3$ and $M_4$ is 100% and does not exceed 100%, the two tasks $M_3$ and $M_4$ are executed concurrently with each other. When an image count of 100 is reached, execution of the task $M_3$ is completed.

At a third distribution ratio calculation time $C_3$, the remaining task $M_4$ is executed. When an image count of 50 is reached, execution of the task $M_4$ is completed.

Therefore, if a distribution ratio is calculated according to the first rule, all of the tasks $M_1$, $M_2$, $M_3$, $M_4$ are finished when an image count of 200 is reached.

As described above, the time required for measurement can be reduced according to a given predetermined rule. In particular, if a distribution ratio for pulsed light is calculated based on priorities associated with measurement modes, image counts, etc., according to the second rule, then a measurement schedule can easily be managed. Furthermore, if a distribution ratio is calculated in order to distribute pulsed light successively to irradiated regions 294 of higher priorities when the sum of the determined pulsed light quantities exceeds a predetermined value (e.g., a maximum light quantity (100%) of pulsed light that can be generated by the pulsed light source 236), then the time required for measurement by the three-dimensional shape measuring system 210 is further shortened.

Finally, captured image signals produced by executing the tasks with the three-dimensional shape measuring apparatus 212a, 212b, 212c, 212d are combined with each other. In this manner, the same measurement result (image display capability) as if a single three-dimensional shape measuring apparatus 212 were used can quickly be obtained, while at the same time greatly reducing the time required for measuring the workpiece 232.

The stationary camera 218 captures an image representative of positions and attitudes of the three-dimensional shape measuring apparatus 212a, 212b, 212c, 212d, and sends a captured image signal to the image processor 222 via the stationary camera controller 220.

The stationary camera 218 preferably acquires three-dimensional positional information using a wave, which is incoherent with the chirped light pulses used with the three-dimensional shape measuring apparatus 212a, 212b, 212c, 212d. The wave may comprise an electromagnetic wave (an ultraviolet wave, an infrared wave, a microwave, millimeter wave, or the like) having a wavelength outside of the wavelength range of the chirped light pulses, or an ultrasonic wave, for example. If an ultrasonic wave is used, then the stationary camera 218 is replaced with an ultrasonic detector.

The image processor 222 receives the captured image signals from the three-dimensional shape measuring apparatus 212a, 212b, 212c, 212d, and the captured image signal from the stationary camera 218. Then, the image processor 222 converts the captured image signals, which are expressed in respective image capturing coordinate systems, from the three-dimensional shape measuring apparatus 212a, 212b, 212c, 212d into captured image signals, which are expressed in a world coordinate system, thereby combining three-dimensional images represented respectively by the captured image signals in the world coordinate system.

For example, according to the technology disclosed in Japanese Laid-Open Patent Publication No. 06-307812, an object coordinate system, an image capturing coordinate system, and a world coordinate system are established in advance. A surface shape of an object to be measured is expressed as a first curved surface according to an approximating equation in the object coordinate system, and coordinates of the approximated curved surface are converted into coordinates in the image capturing coordinate system, thereby producing a second curved surface. Then, points of intersection between the second curved surface and given straight lines (straight lines passing through points of interest on the surface of the object to be measured and through a reference point of the image capturing coordinate system) are determined in the image capturing coordinate system. Thereafter, coordinates of the points of intersection are converted into coordinates in the world coordinate system. In this manner, three-dimensional coordinate positions on the surface of the object to be measured can simply and accurately be identified.

As described above, the three-dimensional shape measuring system 210 can measure a three-dimensional shape of the workpiece 232 on the surface 234 thereof. According to the second embodiment, since the pulsed light distributed by the light distributor 264 is applied to irradiated regions 294 of the workpiece 232, the irradiated regions 294 can simultaneously be measured. Therefore, if the workpiece 232 has a wide measurement region, the workpiece 232 can be measured within a short period of time. The cost of the three-dimensional shape measuring system 210 is relatively low, because the three-dimensional shape measuring system 210 needs only one pulse light source 236.

The present invention is not limited to the above second embodiment, but various changes and modifications may be made to the illustrated embodiment within the scope of the invention.

For example, according to the second embodiment, up to four three-dimensional shape measuring apparatus 212 are connected to the pulsed light generator 214. However, there is no limitation on the number of three-dimensional shape measuring apparatus that can be connected to the pulsed light generator 214.

In the second embodiment, a pulsed light distribution controller 270 is included in the pulsed light generator 214. However, the pulsed light distribution controller 270 may be provided as a pulsed light distribution controller, which is disposed separately from the pulsed light generator 214.

In the second embodiment, the optical mechanism (including the polarizing beam splitter 288, the collimator lens 290, the λ/4 wavelength plate 292, and the objective lens 296), which serves as a light emitter, and the color two-dimensional detector 306, which serves as a detector, are integrally incorporated in the three-dimensional shape measuring apparatus 212. However, the light emitter and the detector may be disposed separately from the three-dimensional shape measuring apparatus 212.

In the second embodiment, the three-dimensional shape measuring apparatus 212a, 212b, 212c, 212d are identical in structure to each other. However, a plurality of three-dimensional shape measuring apparatus, each having different measuring abilities, may be combined with each other. A three-dimensional shape measuring system with such a combination of three-dimensional shape measuring apparatus, each of which has different measuring abilities, operates in the same manner as when the pulsed light quantities required for measurement differ from each other depending on measurement modes (see FIG. 9A).

A three-dimensional shape measuring system 410 according to a third embodiment of the present invention will be described below with reference to FIGS. 10 through 16.

Figure 10:
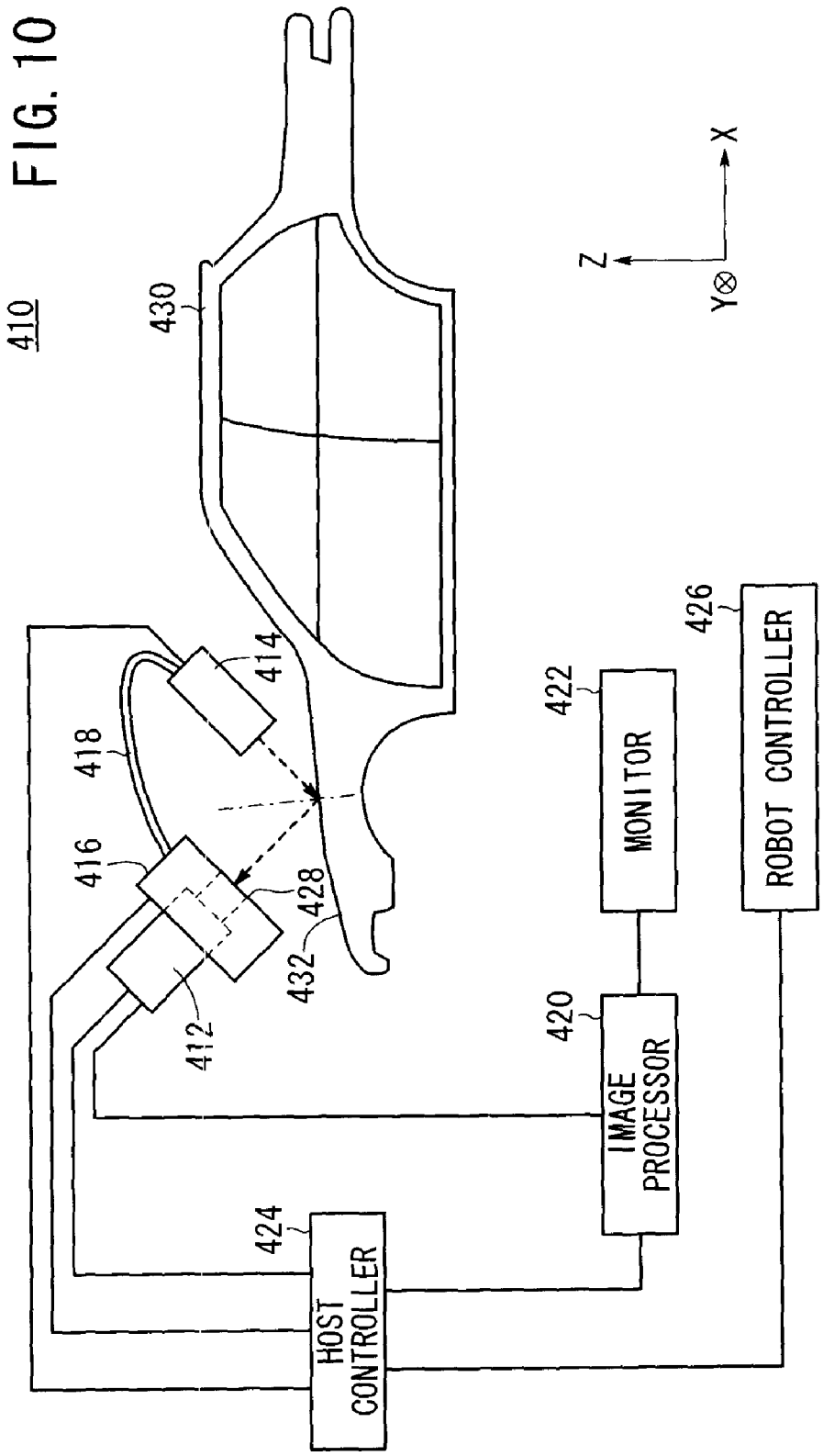
FIG. 10 is a schematic side elevational view, partially in block form, of a three-dimensional shape measuring system according to a third embodiment of the present invention.

As shown in FIG. 10, the three-dimensional shape measuring system 410 comprises a three-dimensional shape measuring apparatus 412, a chirped light generator 414, a shutter device 416, an optical fiber cable 418, an image processor 420, a monitor 422, a host controller 424, and a robot controller 426.

The three-dimensional shape measuring apparatus 412 has an image capturing surface 428 facing toward a surface 432 of a workpiece 430 that serves as an object to be measured. The three-dimensional shape measuring apparatus 412 is mounted on the arm of a robot, not shown, and hence can be moved vertically and horizontally by the robot arm, which is actuated under the control of the robot controller 426.

The chirped light generator 414 also faces toward the surface 432 of the workpiece 430 and is mounted on the arm of a robot, not shown. The direction in which the chirped light generator 414 faces the surface 432 of the workpiece 430 is inclined with respect to a line normal to the surface 432 by an angle, which is the same as an angle by which the direction in which the three-dimensional shape measuring apparatus 412 faces the surface 432 of the workpiece 430 is inclined with respect to the line normal to the surface 432.

The shutter device 416, which serves as a reflected light image acquisition unit (and a second reflected light image acquisition unit), is removably mounted on the three-dimensional shape measuring apparatus 412. The shutter device 416 is optically connected to the chirped light generator 414 by the optical fiber cable 418.

The image processor 420 is electrically connected to the three-dimensional shape measuring apparatus 412 for performing various image processing steps on a captured image signal supplied from the three-dimensional shape measuring apparatus 412.

The host controller 424 sends various commands to the three-dimensional shape measuring apparatus 412, the chirped light generator 414, the shutter device 416, the image processor 420, and the robot controller 426, which controls the robot, not shown. The host controller 424 has a control console, not shown, which is used by the operator of the three-dimensional shape measuring system 410 to selectively set a plurality of measurement modes, e.g., a two-dimensional mode and a three-dimensional mode, to be described later.

Figure 11:
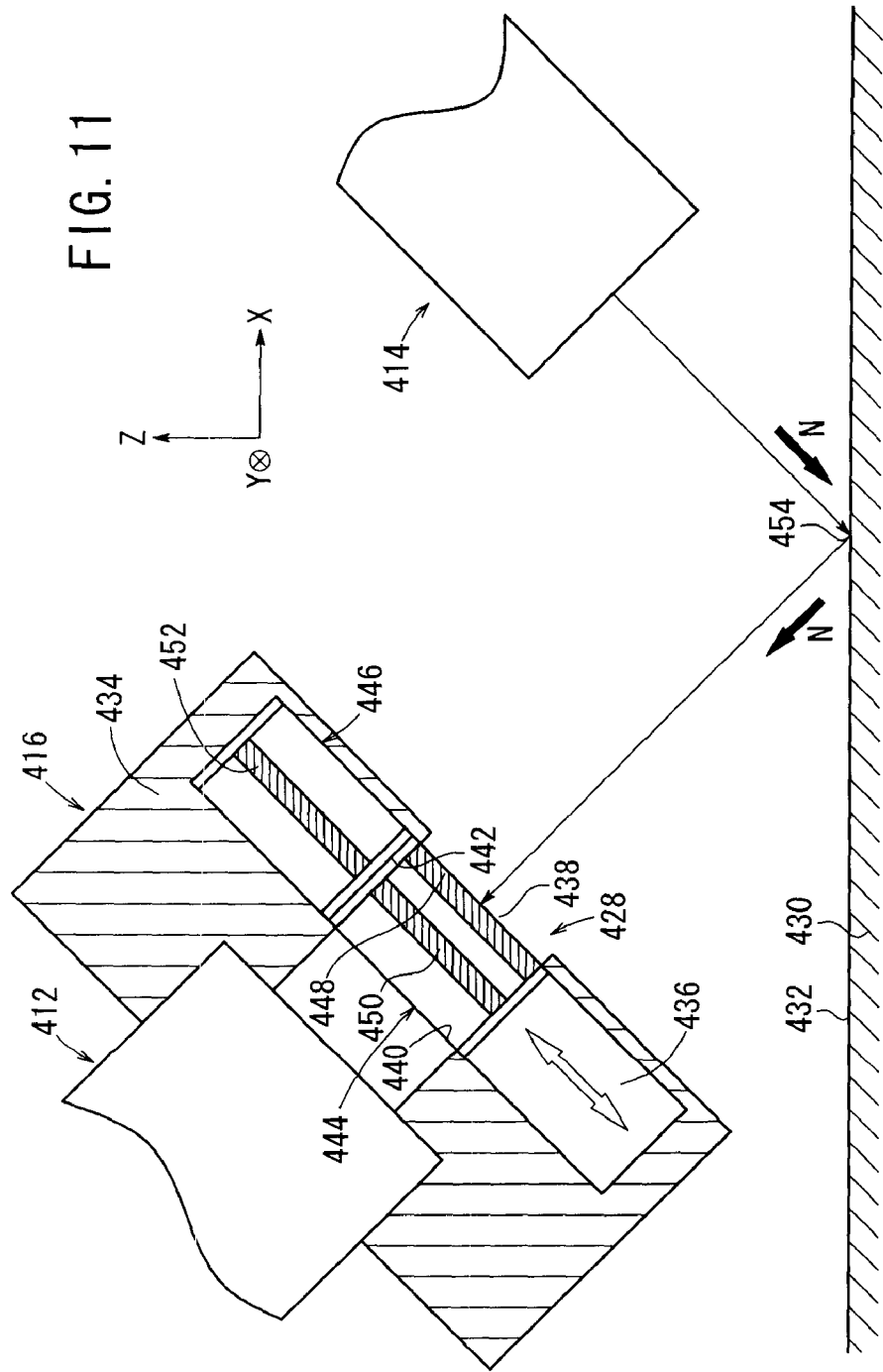
FIG. 11 is a cross-sectional view of a shutter device shown in FIG. 10.

FIG. 11 is a cross-sectional view of the shutter device 416 shown in FIG. 10.

The shutter device 416 is fitted over a distal end of the three-dimensional shape measuring apparatus 412, and has a main body 434 in the form of a rectangular parallelepiped. The main body 434 has a cavity 436 defined therein in the form of a rectangular parallelepiped, which communicates with the outside of the main body 434 through an opening 438 defined in a side surface of the main body 434. The opening 438 is positioned in confronting relation to a light-detecting surface 440 of the three-dimensional shape measuring apparatus 412.

The shutter device 416 includes a shutter unit 442 disposed in the cavity 436. The shutter unit 442 is movable in the cavity 436 by a drive mechanism, not shown, in the directions indicated by the blank arrow.

The shutter unit 442 comprises a mechanical or an electronic shutter 444 having a front diaphragm 448 and a rear diaphragm 450, each in the form of an opaque metal film or the like. The front diaphragm 448 and the rear diaphragm 450 are independently movable, i.e., are openable and closable, along the Y-axis under the control of a shutter opening and closing controller, to be described later.

The shutter device 416 also includes an ultrahigh-speed shutter (second reflected light image acquisition unit) 446, which comprises a nonlinear optical shutter or the like, and has a shutter diaphragm 452 made of a nonlinear optical material. For example, a shutter based on the Kerr effect (Kerr shutter) can change the polarized state of light that passes through a nonlinear optical material.

Chirped light pulses emitted from the chirped light generator 414 are applied to an irradiated region 454 (see FIG. 12) on the surface 432 of the workpiece 430, whereupon the chirped light pulses are reflected by the surface 432 of the workpiece 430 and applied to the image capturing surface 428 of the three-dimensional shape measuring apparatus 412.

Natural light N, serving as illumination light for acquiring two-dimensional information of the workpiece 430, is applied to and reflected from the surface 432 of the workpiece 430 in various angular directions.

The illumination light by which two-dimensional information of the workpiece 430 is acquired is defined as light required to acquire a planar image representing the surface 432 of the workpiece 430. Such illumination light includes not only natural light N, but also artificial light, such as light emitted from a fluorescent lamp, light emitted from a light-emitting diode, laser light, or the like. The illumination light by which two-dimensional information of the workpiece 430 is acquired excludes light that is prepared for acquiring three-dimensional information of the workpiece 430, such as chirped light or slit light.

Figure 12:
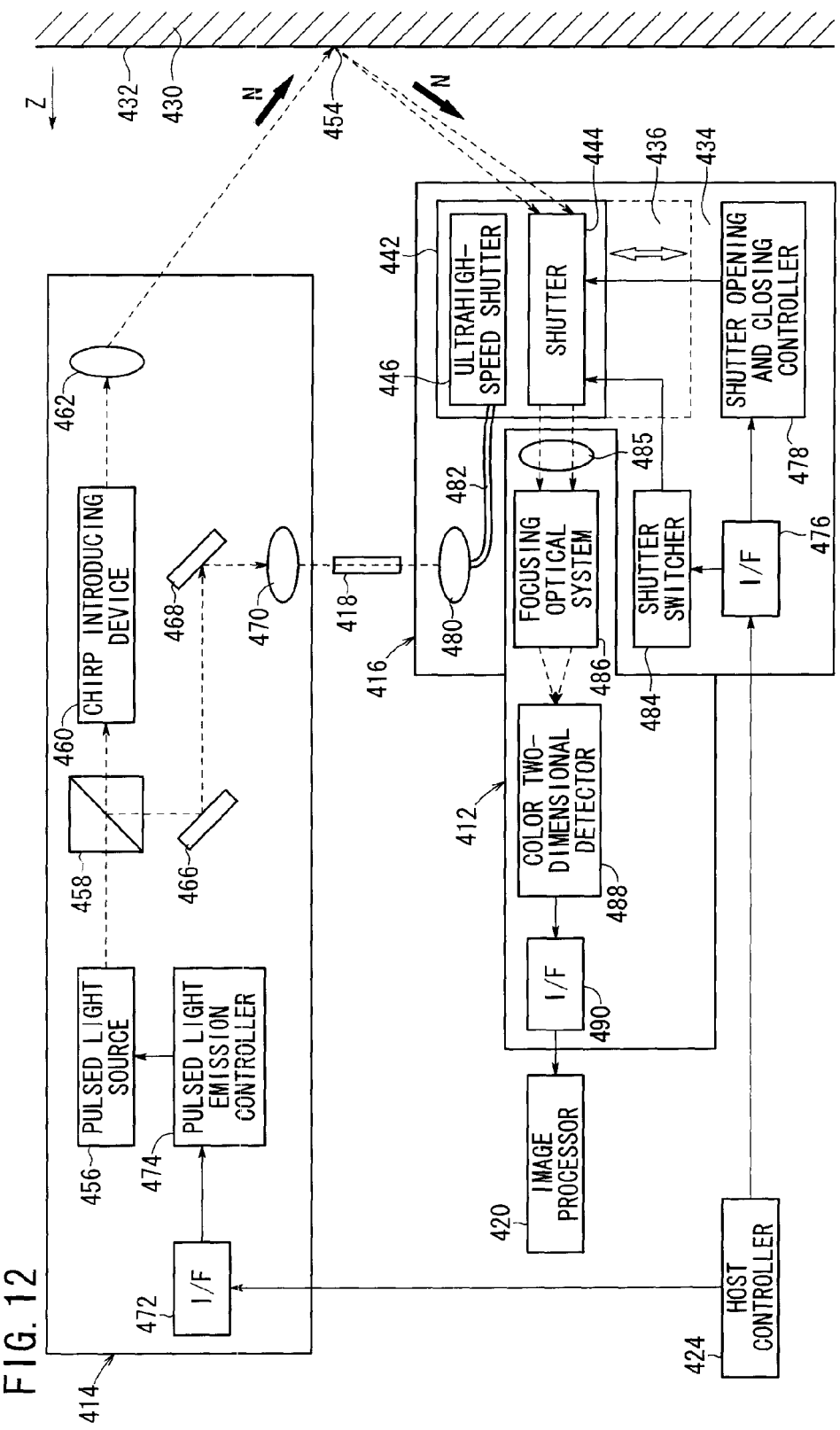
FIG. 12 is a block diagram of a three-dimensional shape measuring apparatus, a chirped light generator, and the shutter device shown in FIG. 10.

FIG. 12 is a block diagram of the three-dimensional shape measuring apparatus 412, the chirped light generator 414, and the shutter device 416 shown in FIG. 10.

The chirped light generator 414 includes a pulsed light source 456 for emitting pulsed light, a beam splitter 458 for splitting the pulsed light emitted from the pulsed light source 456, a chirp introducing device (chirped light pulse generator) 460 for generating chirped light pulses by chirping the pulsed light transmitted through the beam splitter 458, and an objective lens 462 for converging rays of the chirped light pulses generated by the chirp introducing device 460 into a focused image (irradiated region) 454 on the surface 432 of the workpiece 430.

The chirped light generator 414 also includes reflecting mirrors 466, 468 for reflecting at a given angular direction the pulsed light, which is reflected by the beam splitter 458, and a fiber coupling lens 470 for transmitting the pulsed light reflected by the reflecting mirrors 466, 468 to the three-dimensional shape measuring apparatus 412 via an optical fiber cable 418.

The shutter device 416 includes, as described above, the main body 434 with the cavity 436 defined therein, the shutter unit 442 including the shutter 444, and the ultrahigh-speed shutter 446. The shutter device 416 also includes a fiber coupling lens 480 for receiving pulsed light from the chirped light generator 414 via the optical fiber cable 418, a light guide fiber 482 for supplying pulsed light received by the fiber coupling lens 480 to the ultrahigh-speed shutter 446, an I/F 476 for receiving a measurement start command from the host controller 424, and a shutter opening and closing controller 478 for controlling opening and closing of the front diaphragm 448 and the rear diaphragm 450 (see FIG. 11) of the shutter 444.

The shutter device 416 also includes a shutter switcher (switcher) 484 for actuating the shutter unit 442 selectively in the directions indicated by the blank arrow, based on the measurement start command received by the I/F 476.

The three-dimensional shape measuring apparatus 412 includes an objective lens 485 for converging chirped light pulses extracted by the shutter 444, a focusing optical system 486 for producing a reflected light image from the chirped light pulses extracted by the shutter 444, a color two-dimensional detector 488 for converting the reflected light image produced by the focusing optical system 486 into a captured image signal, and an interface (I/F) 490 for transmitting the captured image signal produced by the color two-dimensional detector (a three-dimensional information acquisition unit, a two-dimensional detector) 488 to the image processor 420.

The focusing optical system 486 functions as a three-dimensional field-of-vision enlarging mechanism for enlarging the field of vision of two-dimensional information, so as to exceed the field of vision of the three-dimensional information.

The three-dimensional shape measuring system 410 according to the third embodiment basically is constructed as described above. A measuring operation sequence of the three-dimensional shape measuring system 410 will be described below.

The operator, i.e., the user of the three-dimensional shape measuring system 410, operates a control console, not shown, of the host controller 424 to establish a measurement mode for the three-dimensional shape measuring system 410, so as to measure a three-dimensional shape of the surface 432 of the workpiece 430. It is assumed that the operator establishes a two-dimensional mode for acquiring a two-dimensional captured image, simply for measuring (screening) the overall appearance of the surface 432 of the workpiece 430.

Once the operator has established the two-dimensional mode, the host controller 424 sends a command to the shutter switcher 484 through the I/F 476. The shutter switcher 484 actuates the shutter unit 442 in order to insert the shutter 444 between the irradiated region 454 and the light-detecting surface 440 of the three-dimensional shape measuring apparatus 412, in the direction indicated by the blank arrow (see FIG. 11).

Then, as shown in FIG. 10, the operator enters a measurement start instruction from the non-illustrated control console of the host controller 424, whereupon the three-dimensional shape measuring apparatus 412 starts a process for measuring the surface 432 of the workpiece 430 in a two-dimensional mode (hereinafter referred to as "two-dimensional measurement").

As shown in FIG. 12, natural light N, which is reflected from around the irradiated region 454 on the surface 432 of the workpiece 430, is extracted in a predetermined light quantity and at a given timing by opening and closing of the front diaphragm 448 and the rear diaphragm 450 of the shutter 444 (see FIG. 11). Such light is converged by the objective lens 485 and applied to the focusing optical system 486, which produces a reflected light image from the natural light N. The reflected light image then is converted by the color two-dimensional detector 488 into a captured image signal. The captured image signal is sent via the I/F 490 to the image processor 420, which is disposed externally of the three-dimensional shape measuring apparatus 412. The image processor 420 processes the captured image signal and sends the processed image signal to the monitor 422 (see FIG. 10), which displays a visible image representing the two-dimensional shape of the surface 432 of the workpiece 430, based on the processed image signal.

After one two-dimensional measurement cycle (two-dimensional information acquiring process) has been completed by the three-dimensional shape measuring apparatus 412, the host controller 424 sends a command to the robot controller 426 to actuate the robot arm, not shown, on which the three-dimensional shape measuring apparatus 412 and the chirped light generator 414 are mounted, into a given position and attitude. The image capturing surface 428 of the three-dimensional shape measuring apparatus 412 faces toward the surface 432 of the workpiece 430, thereby establishing an irradiated region 454 (see FIG. 11) within a given measuring location on the surface 432. Thereafter, a two-dimensional measurement cycle of the three-dimensional shape measuring apparatus 412, and a measuring location setting process of the robot controller 426 are repeated until the measuring operation sequence is finished.

If, based on a change in the shading of the two-dimensional visible image displayed on the monitor 422, a location having a possible coating defect is found on the surface 432 of the workpiece 430, then the operator changes the measurement mode using the control console, not shown, of the host controller 424 in order to inspect the location and nearby areas in detail. More specifically, the operator establishes a three-dimensional mode for acquiring a three-dimensional captured image, in order to measure the location on the surface 432 of the workpiece 430 with higher accuracy.

Once the operator has established the three-dimensional mode, the host controller 424 sends a command to the shutter switcher 484 through the I/F 476. The shutter switcher 484 actuates the shutter unit 442 to insert the ultrahigh-speed shutter 446 between the irradiated region 454 and the light-detecting surface 440 of the three-dimensional shape measuring apparatus 412, in the direction indicated by the blank arrow (see FIG. 11).

Then, as shown in FIG. 10, the operator enters a measurement start instruction from the non-illustrated control console of the host controller 424, whereupon the three-dimensional shape measuring apparatus 412 initiates a process for measuring the surface 432 of the workpiece 430 in the three-dimensional mode (hereinafter referred to as "three-dimensional measurement").

As shown in FIG. 12, in response to a pulse emission command from the host controller 424 via the I/F 472 and the pulsed light emission controller 474, the pulsed light source 456 emits pulsed light. Pulsed light from the pulsed light source 456 is transmitted through the beam splitter 458 and then chirped by the chirp introducing device 460, thereby producing chirped light pulses. The chirped light pulses from the chirp introducing device 460 are converged by the objective lens 462 and applied to the irradiated region 454 on the surface 432 of the workpiece 430.

Pulsed light from the pulsed light source 456 is also reflected by the beam splitter 458, and then reflected by the reflecting mirrors 466, 468. The pulsed light is converged by the fiber coupling lens 470, supplied via the optical fiber cable 418 to the shutter device 416, converged by the fiber coupling lens 480, and guided by the light guide fiber 482 so as to travel to the ultrahigh-speed shutter 446. When the ultrahigh-speed shutter 446 is irradiated with the pulsed light, which acts as exciting light, the ultrahigh-speed shutter 446 performs a shutter function, because the refractive index of the shutter diaphragm 452, which is made of a nonlinear optical material, changes upon being irradiated with the pulsed light, which acts as exciting light.

The chirped light pulses, which are reflected by the irradiated region 454 on the surface 432 of the workpiece 430, are extracted in a predetermined light quantity and at a given timing when the exciting light is applied to the ultrahigh-speed shutter 446. The extracted chirped light pulses are converged by the objective lens 485 and applied to the focusing optical system 486, which in turn produces a reflected light image. The reflected light image then is converted by the color two-dimensional detector 488 into a captured image signal. The captured image signal is sent via the I/F 490 to the image processor 420, which is disposed externally of the three-dimensional shape measuring apparatus 412. The image processor 420 processes the captured image signal and sends the processed image signal to the monitor 422, which displays a visible image representing a three-dimensional shape of the surface 432 of the workpiece 430, based on the processed image signal.

At this time, natural light N also is detected by the light-detecting surface 440. However, the quantity of natural light N, which is detected by the light-detecting surface 440, is much smaller than the quantity of chirped light pulses detected by the light-detecting surface 440.

In this manner, a three-dimensional shape of the workpiece 430 within the irradiated region 454 on the surface 432 of the workpiece 430 is measured by the above process (three-dimensional information acquiring process).

As described above, initially, the operator simply inspects the overall appearance of the surface 432 of the workpiece 430 according to the two-dimensional measurement, which is performed using a relatively wide image capturing region. If the operator finds a location having a possible defect therein on the surface 432 of the workpiece 430, the operator then inspects the location with higher accuracy according to the three-dimensional measurement, which is performed using a relatively small image capturing region. By repeating the above processes, the operator is able to efficiently recognize the appearance of the three-dimensional shape over the entire surface 432 of the workpiece 430.

The image processor 420 functions as a three-dimensional information combiner to combine two images, i.e., a two-dimensional image and a three-dimensional image, in aligned measuring positions. The operator therefore is able to visually and easily recognize the appearance of the three-dimensional shape over the entire surface 432 of the workpiece 430.

The image processor 420 may include a function to store spots where a three-dimensional measurement has been performed, and to mark positions on the two-dimensional image that correspond to such stored spots.

Modifications of the three-dimensional shape measuring system 410 according to the third embodiment will be described below with reference to FIGS. 13 through 16. Components of such modifications, which are identical to those of the third embodiment, are denoted using identical reference characters, and such features will not be described in detail below.

First, a three-dimensional shape measuring system 410 according to a first modification of the third embodiment will be described below with reference to FIGS. 13 and 14. The three-dimensional shape measuring system 410 according to the first modification differs from the three-dimensional shape measuring system 410 according to the third embodiment, in that a three-dimensional shape measuring apparatus 412a thereof includes a shutter 444a.

Figure 13:
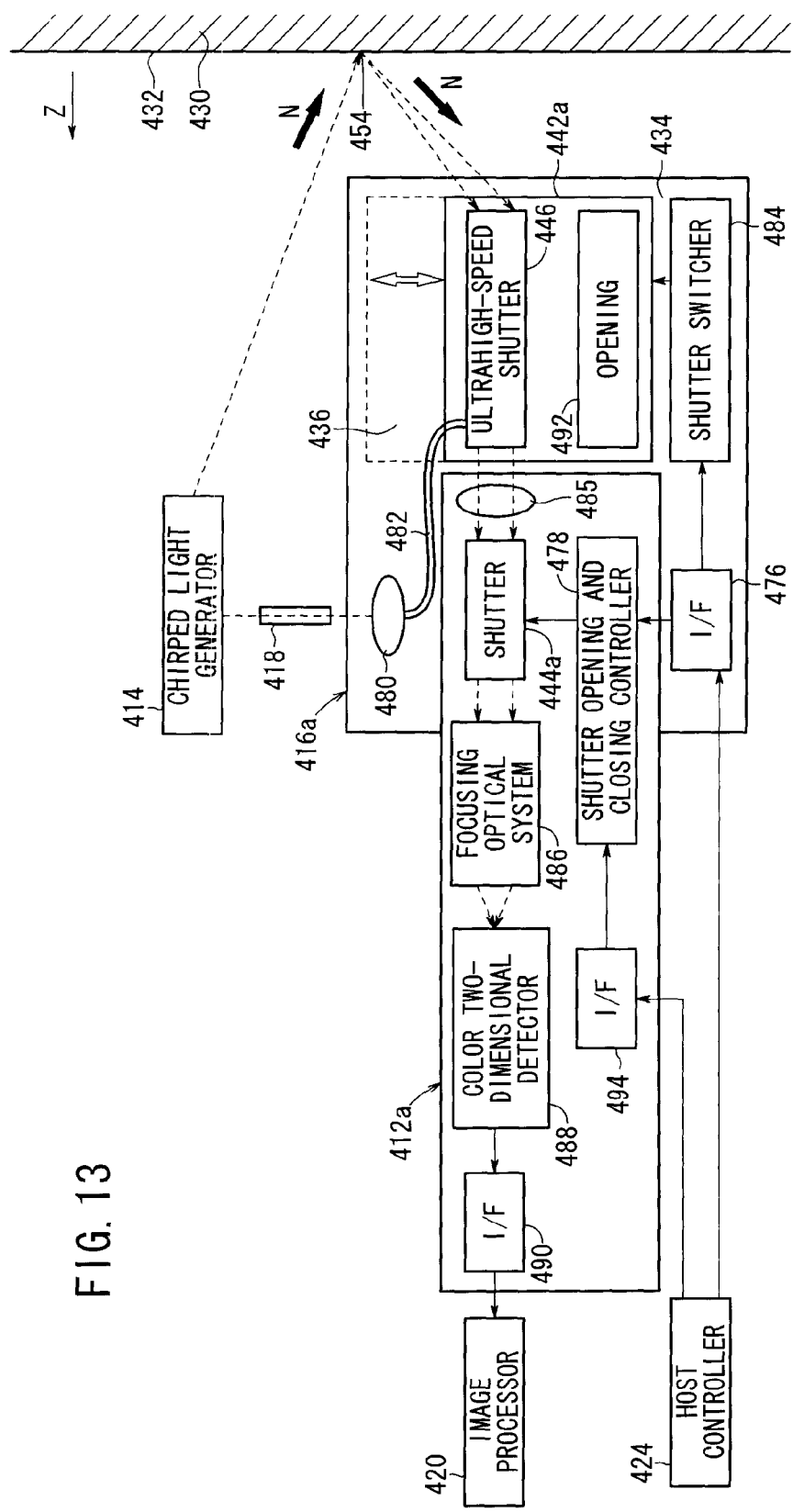
FIG. 13 is a block diagram of a three-dimensional shape measuring apparatus, a chirped light generator, and a shutter device, according to a first modification of the third embodiment.

FIG. 13 is a block diagram of the three-dimensional shape measuring apparatus 412a, a chirped light generator 414, and a shutter device 416a, according to the first modification of the third embodiment.

As shown in FIG. 13, in addition to the components of the three-dimensional shape measuring apparatus 412 shown in FIG. 12, the three-dimensional shape measuring apparatus 412a includes a shutter 444a, a shutter opening and closing controller 478a, and an I/F 494. The shutter device 416a does not include the shutter opening and closing controller 478 shown in FIG. 12, but includes a shutter unit 442a, which has an opening 492 therein in place of the shutter 444 shown in FIG. 12.

Figure 14:
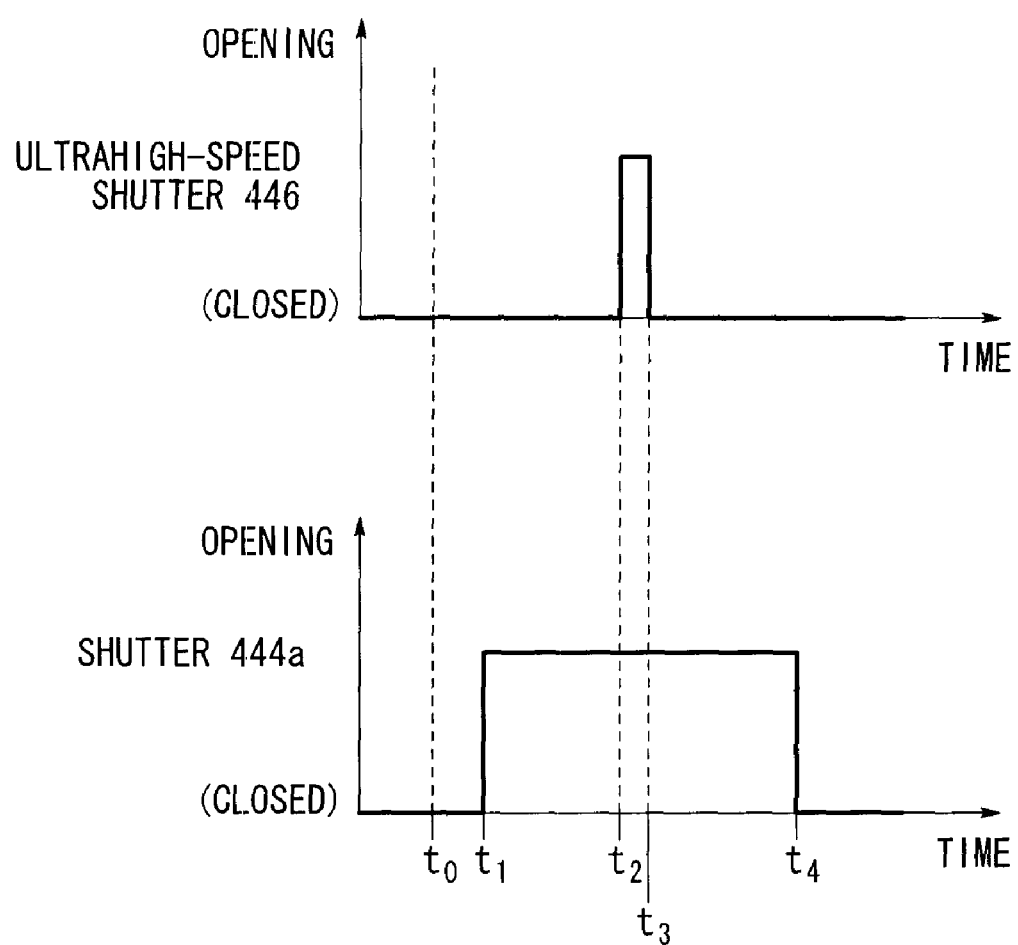
FIG. 14 is a timing chart indicating opening and closing of a shutter and an ultrahigh-speed shutter, which are shown in FIG. 13.

FIG. 14 is a timing chart for opening and closing the shutter 444a and the ultrahigh-speed shutter 446 shown in FIG. 13. The timing chart includes graphs showing timings at which the shutter 444a and the ultrahigh-speed shutter 446 are opened and closed, each graph having a horizontal axis representing time and a vertical axis representing the shutter opening. Time $t_0$ indicated by the broken line represents a time at which a measurement start command is supplied from the host controller 424. The shutter 444a is open from time $t_1$ to time $t_4$, and is closed at other times. The ultrahigh-speed shutter 446 is open from time $t_2$ to time $t_3$, and is closed at other times. The opening period ($t_2$ through $t_3$) of the ultrahigh-speed shutter 446 is short, and is included within the opening period ($t_1$ through $t_4$) of the shutter 444a.

The three-dimensional shape measuring apparatus 412a thus constructed operates in the same manner as the three-dimensional shape measuring apparatus 412 according to the third embodiment.

Once the operator has established the two-dimensional mode, the shutter switcher 484 actuates the shutter unit 442a in order to insert the opening 492 between the irradiated region 454 and the light-detecting surface 440 of the three-dimensional shape measuring apparatus 412a, in the direction indicated by the blank arrow (see FIG. 13). During two-dimensional measurement with the shutter unit 442a thus actuated, natural light N, which is reflected from around the irradiated region 454, passes through the opening 492. The natural light N is extracted in a predetermined light quantity and at a given timing, by opening and closing the front diaphragm 448 and the rear diaphragm 450 of the shutter 444a (see FIG. 11). Therefore, a desired two-dimensional captured image signal is produced.

Once the operator has established the three-dimensional mode, the shutter switcher 484 actuates the shutter unit 442a in order to insert the ultrahigh-speed shutter 446 between the irradiated region 454 and the light-detecting surface 440 of the three-dimensional shape measuring apparatus 412a, in the direction indicated by the blank arrow (see FIG. 13). During three-dimensional measurement with the shutter unit 442a thus actuated, chirped light pulses reflected by the irradiated region 454 on the surface 432 of the workpiece 430 are extracted in a predetermined light quantity and at a given timing when exciting light is applied to the ultrahigh-speed shutter 446. The extracted chirped light pulses then pass through the objective lens 485. Since the shutter 444a remains open at this time (see FIG. 14), all of the chirped light pulses extracted by the ultrahigh-speed shutter 446 pass through the shutter 444a without being blocked. Therefore, a desired three-dimensional captured image signal is produced.

In this manner, the two- or three-dimensional shape of the workpiece 430 within the irradiated region 454 on the surface 432 of the workpiece 430 is measured. According to the first modification, since the shutter 444a used during two-dimensional measurement is incorporated into the three-dimensional shape measuring apparatus 412a, the three-dimensional shape measuring apparatus 412a can be used alone, even when the shutter device 416a is detached. In addition, a measurement mode, i.e., the two-dimensional mode or the three-dimensional mode, can be selected simply by attaching or detaching the shutter device 416a, without the need for changing the settings of the three-dimensional shape measuring apparatus 412a.

A three-dimensional shape measuring system 410 according to a second modification of the third embodiment will be described below with reference to FIGS. 15 and 16. The three-dimensional shape measuring system 410 according to the second modification differs from the three-dimensional shape measuring system 410 according to the third embodiment with respect to features of the shutter device 416b, and in particular, concerning the internal structure of a shutter unit 442b.

Figure 15:
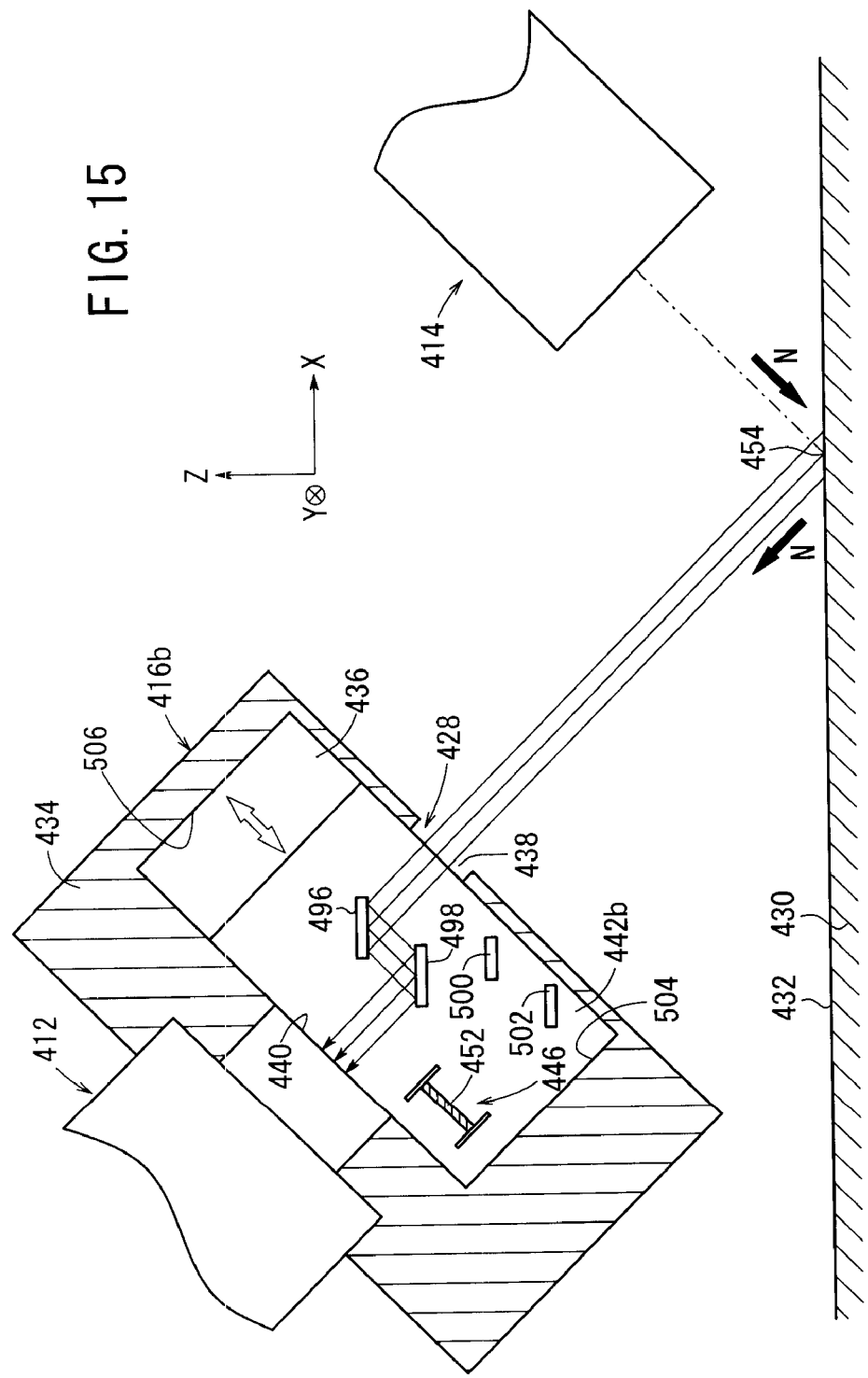
FIG. 15 is a cross-sectional view of a shutter device according to a second modification of the third embodiment.

As shown in FIG. 15, the shutter unit 442b includes reflecting mirrors 496, 498, 500, 502 and an ultrahigh-speed shutter 446. Such components are fixedly disposed in the shutter unit 442b. The shutter unit 442b has an opening 438 defined in a front wall of the main body 434, at a position spaced from the position that confronts the light-detecting surface 440 of the three-dimensional shape measuring apparatus 412.

The shutter device 416b includes the shutter unit 442b, which is adjusted in order to acquire natural light N reflected from around the irradiated region 454 on the surface 432 of the workpiece 430. More specifically, when the shutter unit 442b is actuated in the direction indicated by the blank arrow, until an outer wall of the shutter unit 442b comes into contact with an inner wall surface 504 of the cavity 436 in the main body 434, the opening 438, the reflecting mirrors 496, 498, and the light-detecting surface 440 are relatively positioned, such that natural light N reflected from around the irradiated region 454 enters into the opening 438, whereupon the natural light N is reflected at given angles by the reflecting mirrors 496, 498 and detected by the light-detecting surface 440.

Figure 16:
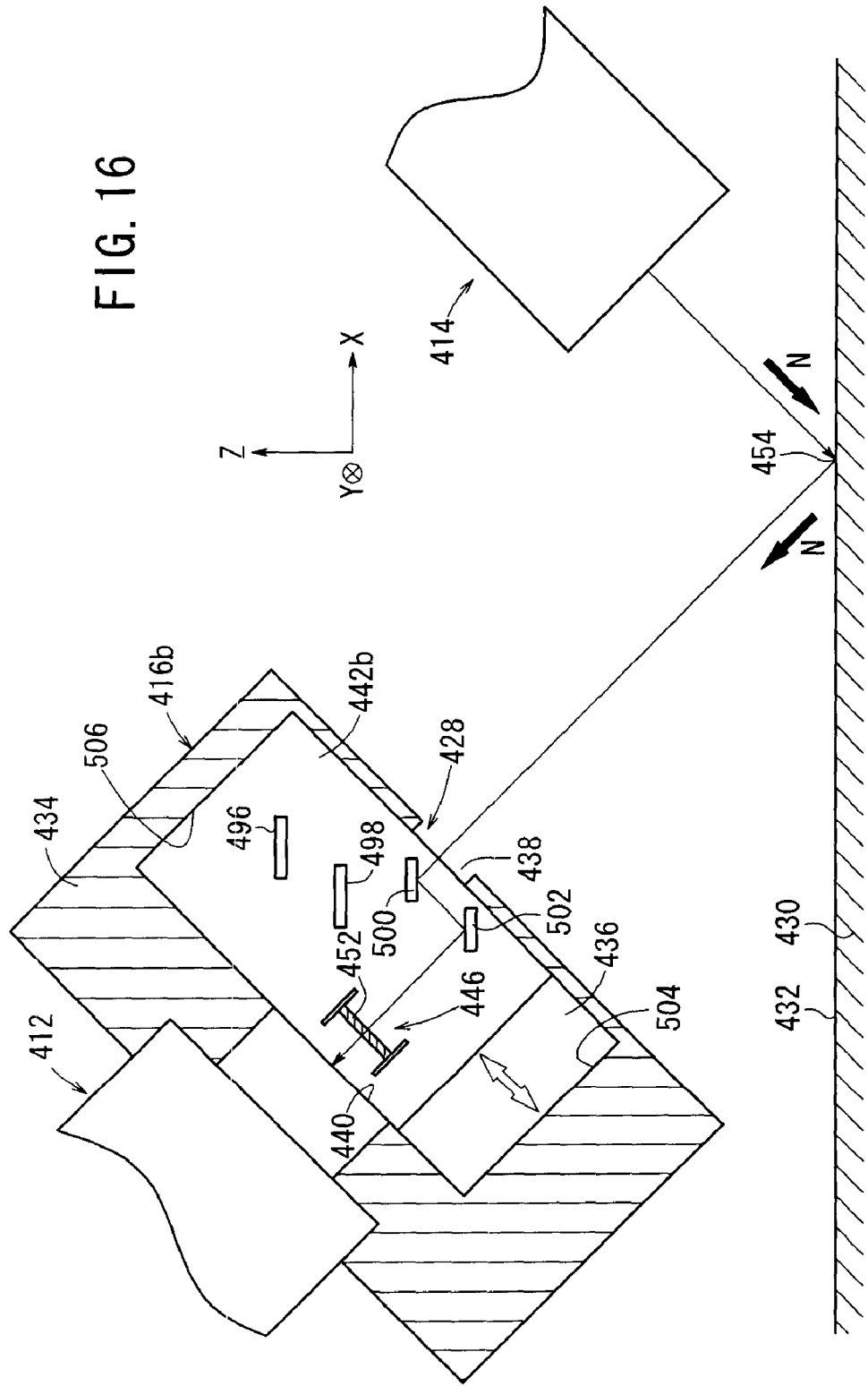
FIG. 16 is a cross-sectional view of the shutter device according to a third modification of the third embodiment.

As shown in FIG. 16, the shutter unit 442b of the shutter device 416lb is adjusted in order to acquire chirped light pulses reflected from the irradiated region 454. More specifically, when the shutter unit 442b is actuated in the direction indicated by the blank arrow, until an opposite outer wall of the shutter unit 442b comes into contact with an opposite inner wall surface 506 of the cavity 436 in the main body 434, the opening 438, the reflecting mirrors 500, 502, and the light-detecting surface 440 are relatively positioned, such that chirped light pulses reflected from the irradiated region 454 enter into the opening 438, whereupon the chirped light pulses are reflected at given angles by the reflecting mirrors 500, 502 and detected by the light-detecting surface 440.

As described above, depending on the type of light used during the measurement mode or during the image capturing process, the light path for light acquired by the three-dimensional shape measuring apparatus 412 is partially changed, so as to offer the same advantages as those of the third embodiment.

A three-dimensional shape measuring system 610 according to a fourth embodiment of the present invention will be described below with reference to FIGS. 17 and 18.

Figure 17:
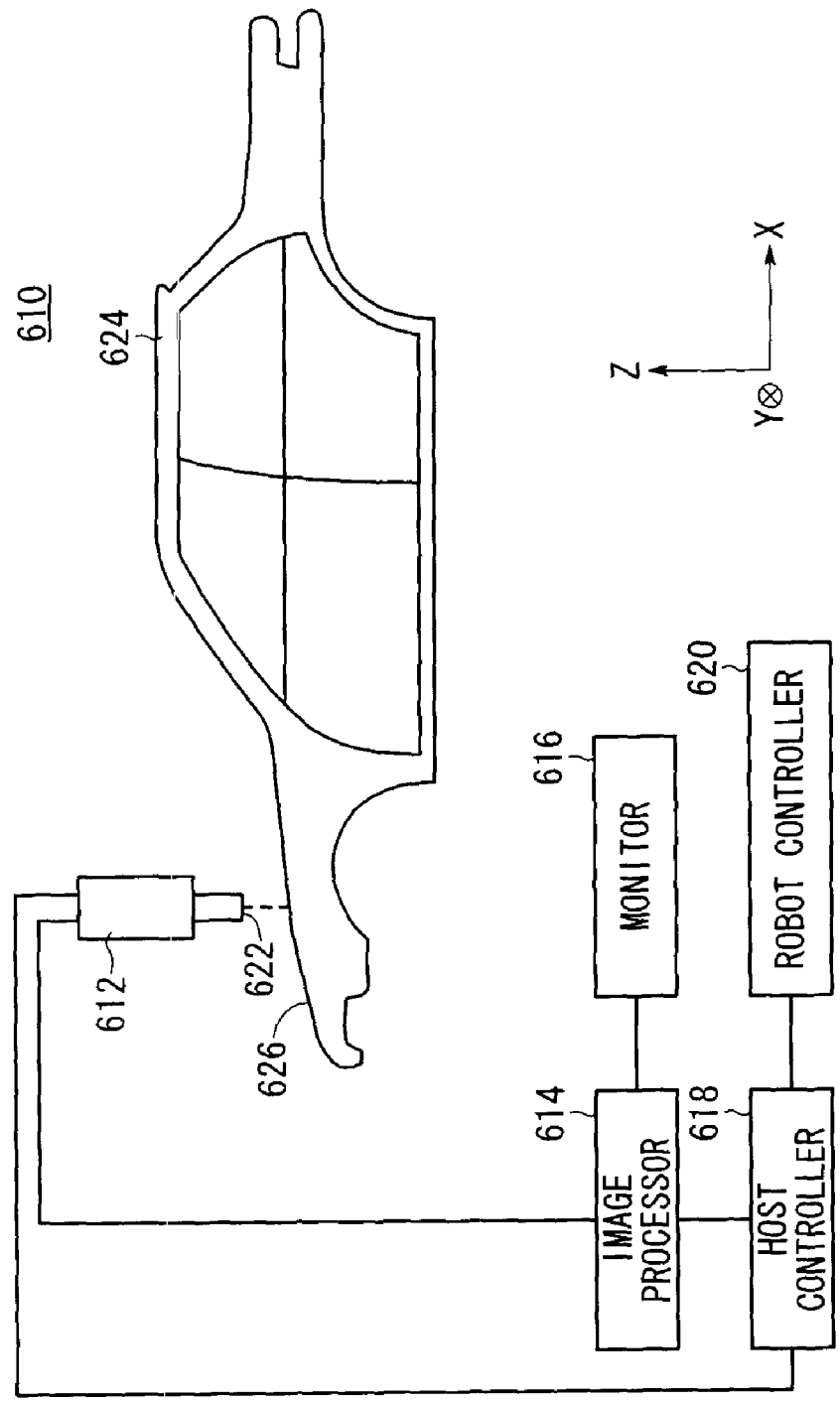
FIG. 17 is a schematic side elevational view, partially in block form, of a three-dimensional shape measuring system according to a fourth embodiment of the present invention.

As shown in FIG. 17, the three-dimensional shape measuring system 610 comprises a three-dimensional shape measuring apparatus 612, an image processor 614, a monitor 616, a host controller 618, and a robot controller 620. The three-dimensional shape measuring apparatus 612 has an image capturing surface 622 that faces toward a surface 626 of a workpiece 624, which serves as an object to be measured.

The three-dimensional shape measuring apparatus 612 differs from the three-dimensional shape measuring apparatus 412 according to the third embodiment, in that the three-dimensional shape measuring apparatus 612 incorporates therein functions corresponding to the chirped light generator 414 and the shutter device 416 shown in FIG. 10. Other components of the three-dimensional shape measuring apparatus 612 are identical to those of the third embodiment (see FIG. 10), and such features will not be described in detail below.

Figure 18:
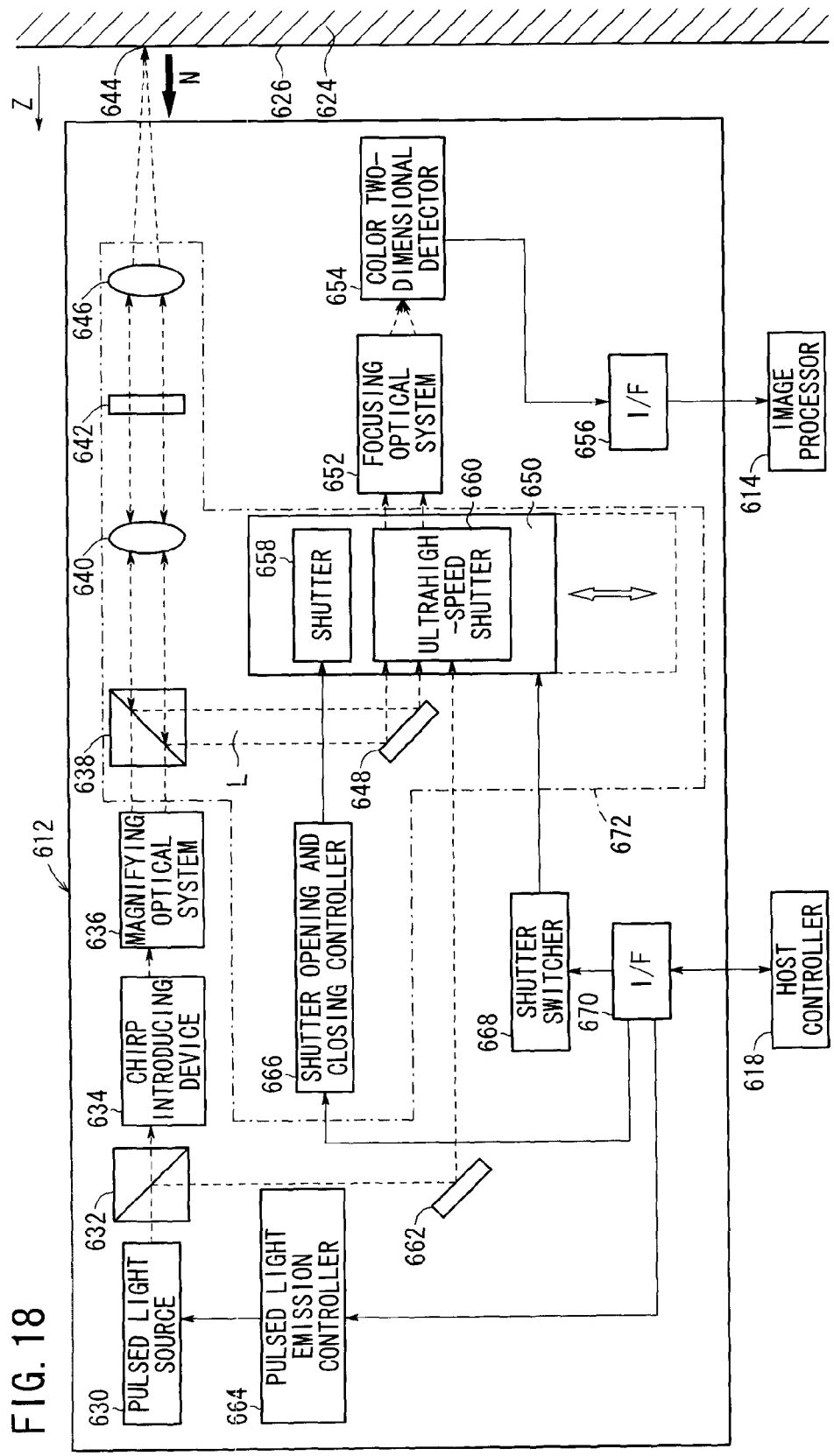
FIG. 18 is a block diagram of a three-dimensional shape measuring apparatus shown in FIG. 17.

FIG. 18 is a block diagram of the three-dimensional shape measuring apparatus 612 shown in FIG. 17.

As shown in FIG. 18, the three-dimensional shape measuring apparatus 612 includes a pulsed light source 630 for emitting pulsed light, a beam splitter 632 for splitting pulsed light emitted from the pulsed light source 630, a chirp introducing device 634 for generating chirped light pulses by chirping the pulsed light transmitted through the beam splitter 632, a magnifying optical system 636 for increasing the beam diameter of the chirped light pulses generated by the chirp introducing device 634, a polarizing beam splitter 638 for splitting the chirped light pulses, the beam diameter of which has been increased by the magnifying optical system 636 depending on the direction of polarization thereof, a collimator lens 640 for parallelizing the chirped light pulses transmitted through the polarizing beam splitter 638, a $\lambda/4$ wavelength plate 642 for tilting the direction of polarization of the chirped light pulses parallelized by the collimator lens 640 to a given direction, and an objective lens 646 for converging rays of the chirped light pulses polarized by the $\lambda/4$ wavelength plate 642 into a focused image (irradiated region) 644 on the surface 626 of the workpiece 624.

The three-dimensional shape measuring apparatus 612 also includes, on a light path L, a reflecting mirror 648 for reflecting light, which has been reflected by the polarizing beam splitter 638, at a given angular direction, a shutter unit 650 for extracting light that has been reflected by the reflecting mirror 648, a focusing optical system 652 for producing a reflected light image from the light extracted by the shutter unit 650, and a color two-dimensional detector 654 for converting the reflected light image produced by the focusing optical system 652 into a captured image signal. An I/F 656 is electrically connected to the image processor 614, for sending a captured image signal produced by the color two-dimensional detector 654 to the image processor 614.

The shutter unit 650 comprises a mechanical or an electronic shutter 658, and an ultrahigh-speed shutter 660 comprising a nonlinear optical shutter or the like. The shutter 658 and the ultrahigh-speed shutter 660 are identical in structure to the shutter 444 and the ultrahigh-speed shutter 446, respectively, shown in FIGS. 11 and 12, and will not be described in detail below.

The three-dimensional shape measuring apparatus 612 also includes a reflecting mirror 662, a pulsed light emission controller 664 for controlling emission of pulsed light from the pulsed light source 630, a shutter opening and closing controller 666 for controlling opening and closing of a shutter diaphragm, not shown, of the shutter 658, and a shutter switcher 668.

The polarizing beam splitter 638, the collimator lens 640, the $\lambda/4$ wavelength plate 642, the objective lens 646, the reflecting mirror 648, the shutter unit 650 (the shutter 658), and the shutter opening and closing controller 666 jointly make up a reflected light image acquisition unit 672 for extracting, at a given timing, a predetermined light quantity of chirped light pulses on the light path L, which are reflected by the workpiece 624, and for acquiring a reflected light image of the chirped light pulses. The polarizing beam splitter 638, the collimator lens 640, the $\lambda/4$ wavelength plate 642, the objective lens 646, the reflecting mirror 648, the shutter unit 650 (the ultrahigh-speed shutter 660), and the shutter opening and closing controller 666 jointly make up another reflected light image acquisition unit (second reflected light image acquisition unit) 672 for extracting, at a given timing, a predetermined light quantity of natural light N on the light path L, which is reflected by the workpiece 624, and for acquiring a reflected light image of the natural light N.

The three-dimensional shape measuring system 610 according to the fourth embodiment basically is constructed as described above. A measuring operation sequence of the three-dimensional shape measuring system 610 will be described below.

The measuring operation sequence of the three-dimensional shape measuring system 610 is similar to the measuring operation sequence of the three-dimensional shape measuring system 410 according to the third embodiment described above. Processes for acquiring captured images during both two-dimensional and three-dimensional measurement processes will be described in detail below with reference to FIG. 18.

Once the operator has established the two-dimensional mode, the host controller 618 sends a command to the shutter switcher 668 through the I/F 670. The shutter switcher 668 actuates the shutter unit 650 in order to insert the shutter 658 between the reflecting mirror 648 and the focusing optical system 652, in the direction indicated by the blank arrow. Thereafter, the two-dimensional measurement process is started in response to a measurement start command.

Natural light N, which is reflected from around the irradiated region 644 on the surface 626 of the workpiece 624, is converged by the objective lens 646, converted from circularly polarized light into linearly polarized light by the $\lambda/4$ wavelength plate 642, parallelized by the collimator lens 640, reflected so as to travel along the light path L by the polarizing beam splitter 638, and reflected at a given angular direction toward the shutter 658 by the reflecting mirror 648. The shutter 658 extracts a predetermined light quantity of natural light N at a given timing. The focusing optical system 652 produces a reflected light image from the extracted light quantity of natural light N. Then, the color two-dimensional detector 654 converts the reflected light image into a captured image signal. The captured image signal is sent via the I/F 656 to the image processor 614, which is disposed externally of the three-dimensional shape measuring apparatus 612.

When the operator has established the three-dimensional mode, the host controller 618 sends a command to the shutter switcher 668 through the I/F 670. The shutter switcher 668 actuates the shutter unit 650 to insert the ultrahigh-speed shutter 660 between the reflecting mirror 648 and the focusing optical system 652, in a direction indicated by the blank arrow. Thereafter, the three-dimensional measurement is started in response to a measurement start command.

In response to a pulse emission command from the host controller 618 via the I/F 670 and the pulsed light emission controller 664, the pulsed light source 630 emits pulsed light. Pulsed light from the pulsed light source 630 is transmitted through the beam splitter 632, and then chirped by the chirp introducing device 634, which produces chirped light pulses. Chirped light pulses from the chirp introducing device 634 are increased in beam diameter by the magnifying optical system 636, and then travel through the polarizing beam splitter 638 to the collimator lens 640, which parallelizes the chirped light pulses. The parallelized chirped light pulses are converted from linearly polarized light into circularly polarized light by the $\lambda/4$ wavelength plate 642, and then focused by the objective lens 646 onto an irradiated region 644 on the surface 626 of the workpiece 624.

The chirped light pulses, which are reflected by the irradiated region 644 on the surface 626 of the workpiece 624, are converged by the objective lens 646, and then converted from circularly polarized light into linearly polarized light by the $\lambda/4$ wavelength plate 642, parallelized by the collimator lens 640, reflected so as to travel along the light path L by the polarizing beam splitter 638, and reflected at a given angular direction toward the ultrahigh-speed shutter 660 by the reflecting mirror 648. The ultrahigh-speed shutter 660 extracts a predetermined light quantity of chirped light pulses at a given timing. The focusing optical system 652 produces a reflected light image from the extracted light quantity of the chirped light pulses. The color two-dimensional detector 654 then converts the reflected light image into a captured image signal. The captured image signal is sent via the I/F 656 to the image processor 614, which is disposed externally of the three-dimensional shape measuring apparatus 612.

Pulsed light, which is reflected by the beam splitter 632, is reflected toward the ultrahigh-speed shutter 660 by the reflecting mirror 662, whereupon the pulsed light is applied to the ultrahigh-speed shutter 660. The ultrahigh-speed shutter 660 opens when the ultrahigh-speed shutter 660 is irradiated with pulsed light, which serves as exciting light.

In this manner, a two- or three-dimensional shape of the workpiece 624 within the irradiated region 644 on the surface 626 of the workpiece 624 is measured. The three-dimensional shape measuring system 610 according to the fourth embodiment is simpler in structure than the three-dimensional shape measuring system 410 according to the third embodiment, and functions advantageously as a space saver.

A modification of the three-dimensional shape measuring system 610 according to the fourth embodiment will be described below with reference to FIGS. 19 through 20B. Components of the modification, which are identical to those of the fourth embodiment, are denoted by identical reference characters, and such features will not be described in detail below.

Figure 19:
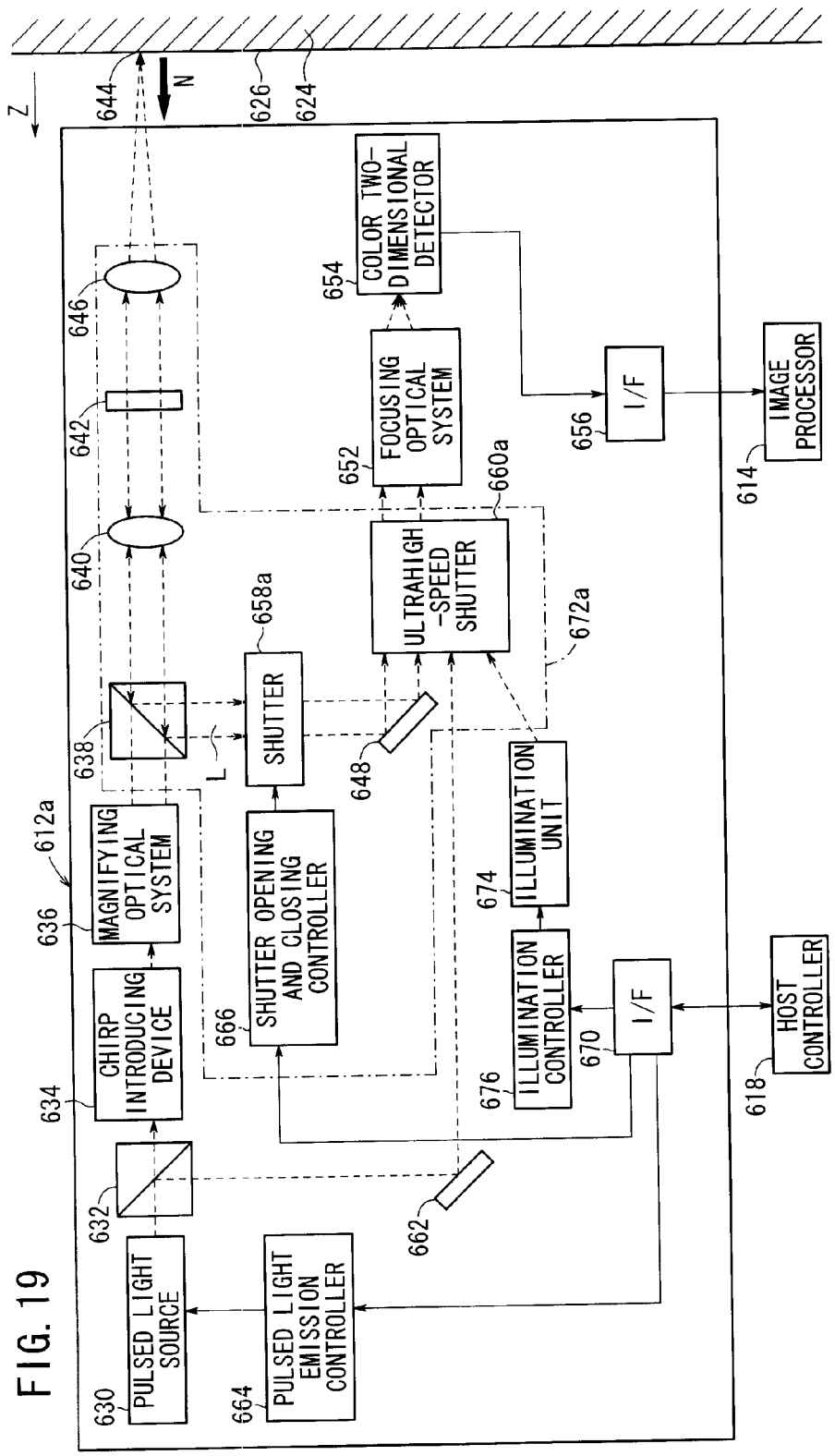
FIG. 19 is a block diagram of a three-dimensional shape measuring apparatus according to a fifth embodiment of the present invention.

FIG. 19 is a block diagram of a three-dimensional shape measuring apparatus 612a according to a modification of the fourth embodiment. The three-dimensional shape measuring apparatus 612a includes a reflected light image acquisition unit 672a, which differs from the reflected light image acquisition unit 672 shown in FIG. 18, in that a shutter 658a and an ultrahigh-speed shutter 660a are included, which are disposed on the same light path L, instead of the shutter unit 650 that selectively positions the shutter 658 and the ultrahigh-speed shutter 660 between the reflecting mirror 648 and the focusing optical system 652. The three-dimensional shape measuring apparatus 612a also includes an illumination unit 674 for supplying exciting light to the ultrahigh-speed shutter 660a, and an illumination controller 676 for controlling energization and de-energization of the illumination unit 674.

Figure 20A:
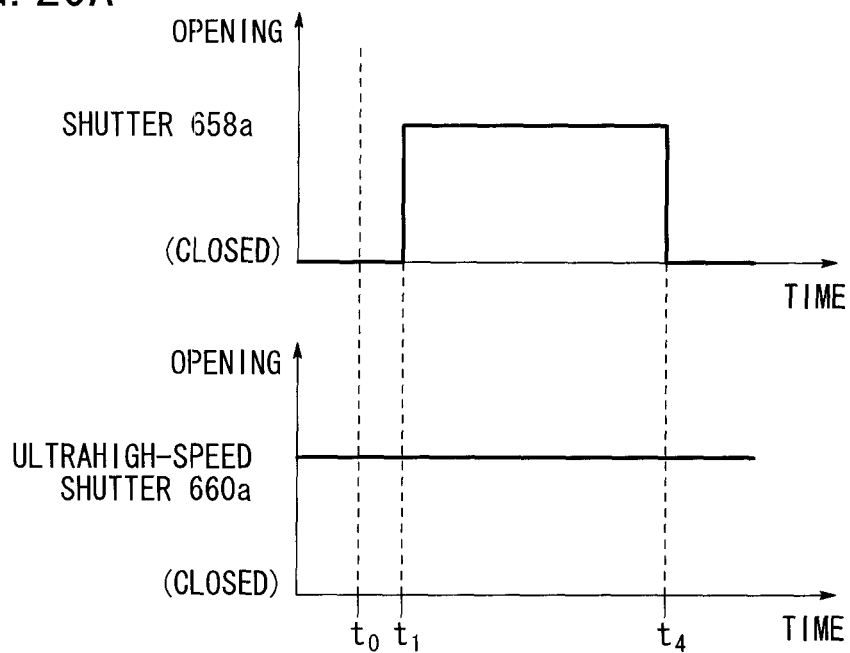
FIGS. 20A and 20B are timing charts indicating opening and closing of a shutter and an ultrahigh-speed shutter, which are shown in FIG. 19.

FIG. 20A is a timing chart for opening and closing the shutter 658a and the ultrahigh-speed shutter 660a, which are shown in FIG. 19. The timing chart has graphs therein, which are defined in the same manner as in the timing chart shown in FIG. 14. According to the timing chart shown in FIG. 20A, the shutter 658a is open from time $t_1$ to time $t_4$, and is closed at other times. In response to an illumination energization command from the host controller 618, the illumination controller 676 energizes the illumination unit 674 to continuously apply exciting light to the ultrahigh-speed shutter 660a. Therefore, the ultrahigh-speed shutter 660a normally remains open.

Figure 20B:
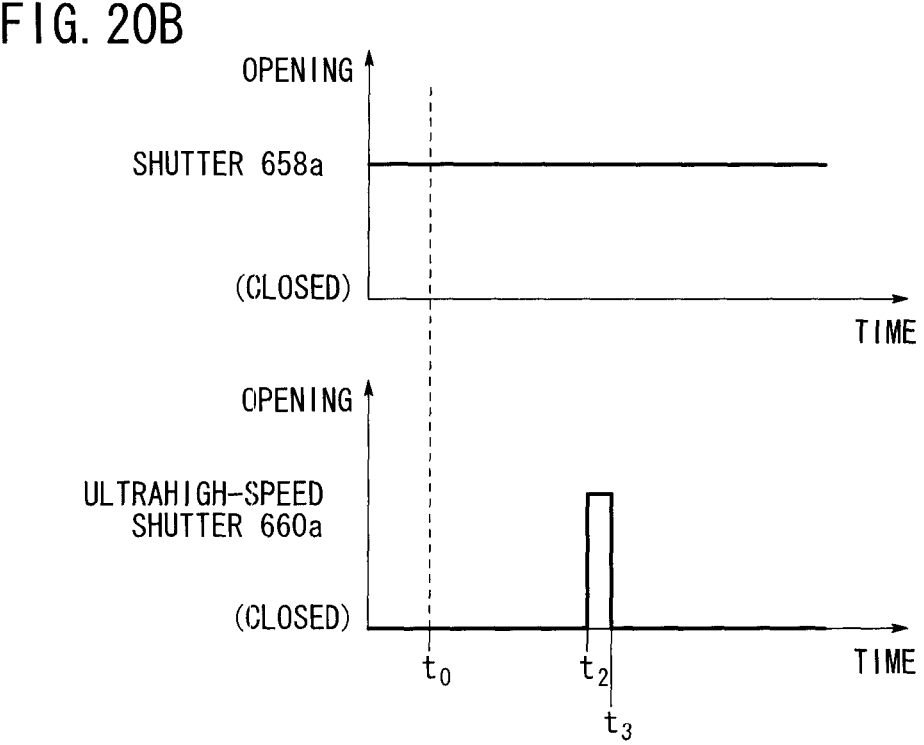

FIG. 20B is a timing chart for opening and closing the shutter 658a and the ultrahigh-speed shutter 660a, which are shown in FIG. 19. The timing chart has graphs therein, which are defined in the same manner as in the timing chart shown in FIG. 14. According to the timing chart shown in FIG. 20A, the ultrahigh-speed shutter 660a is open from time $t_2$ to time $t_3$, and is closed at other times. Based on a shutter opening command from the host controller 618, the shutter 658a normally remains open.

When a two-dimensional measurement is carried out using the shutter 658a and the ultrahigh-speed shutter 660a, which are arranged as shown in FIG. 19 and opened and closed according to the timing control shown in FIG. 20A, natural light N, which is reflected into the light path L by the polarizing beam splitter 638, is extracted in a predetermined light quantity and at a given timing by opening and closing the front diaphragm 448 and the rear diaphragm 450 (see FIG. 11) of the shutter 658a. The natural light N then is reflected by the reflecting mirror 648, and passes through the ultrahigh-speed shutter 660a (see FIG. 20A), which is normally open, without being blocked by the ultrahigh-speed shutter 660a. Therefore, a desired two-dimensional captured image signal is produced.

When a three-dimensional measurement is carried out using the shutter 658a and the ultrahigh-speed shutter 660a, which are arranged as shown in FIG. 19 and opened and closed according to the timing control shown in FIG. 20B, chirped light pulses, which are reflected into the light path L by the polarizing beam splitter 638, pass through the shutter 658a (see FIG. 20B), which is normally open, without being blocked by the shutter 658a. The chirped light pulses then are reflected by the reflecting mirror 648, and are extracted in a predetermined light quantity and at a given timing by the ultrahigh-speed shutter 660a. Therefore, a desired three-dimensional captured image signal is produced.

In this manner, a two- or three-dimensional shape of the workpiece 624 within the irradiated region 644 on the surface 626 of the workpiece 624 is measured. The three-dimensional shape measuring apparatus 612a according to the modification of the fourth embodiment is preferable to the three-dimensional shape measuring apparatus 612a according to the fourth embodiment, because the three-dimensional shape measuring apparatus 612a does not require the shutter switching mechanism.

The present invention is not limited to the above third and fourth embodiments, but various changes and modifications may be made to such embodiments within the scope of the invention.

For example, in the third and fourth embodiments, natural light N is reflected by surfaces 432, 626 of the workpieces 430, 624, whereupon a reflected light image is captured by the three-dimensional shape measuring apparatus 412, 612. However, auxiliary light rather than natural light N may be employed. Alternatively, a light image of an object to be measured, which emits light by itself, may be captured by the three-dimensional shape measuring apparatus 412, 612.

In the third and fourth embodiments, natural light N and chirped light pulses travel along a common light path. However, the natural light N and the chirped light pulses may travel respectively along different light paths. Furthermore, certain components of the three-dimensional shape measuring apparatus 412, 612 may be added, retracted, or replaced depending on the measurement mode that is established. For example, when the two-dimensional mode is selected, the λ/4 wavelength plate 642 shown in FIG. 18 may be retracted away from the light path, and the polarizing beam splitter 638 may be replaced with a reflecting mirror.

A three-dimensional shape measuring system 810 according to a fifth embodiment of the present invention will be described below with reference to FIGS. 21 through 25.

As shown in FIG. 21, the three-dimensional shape measuring system 810 comprises a three-dimensional shape measuring apparatus 812, an image processor 814, a monitor 816, a host controller 818, and a robot controller 820.

The three-dimensional shape measuring apparatus 812 has an image capturing surface 822 facing toward a surface 826 of a workpiece 824, which serves as an object to be measured. The three-dimensional shape measuring apparatus 812 is mounted on the arm of a robot, not shown, and hence the three-dimensional shape measuring apparatus 812 can be moved vertically and horizontally by the robot arm, which is actuated under the control of the robot controller 820.

The image processor 814 is electrically connected to the three-dimensional shape measuring apparatus 812, and performs various image processing steps on a captured image signal, which is supplied from the three-dimensional shape measuring apparatus 812.

The monitor 816 is electrically connected to the image processor 814, and displays images processed by the image processor 814, together with measurement information, etc.

The host controller 818 comprises a PLC, for example, which sends various commands to the image processor 814, and the robot controller 820 that controls the robot, not shown. The host controller 818 includes a control console, not shown, which is used by the operator of the three-dimensional shape measuring system 810 in order to set various measurement conditions.

Figure 22:
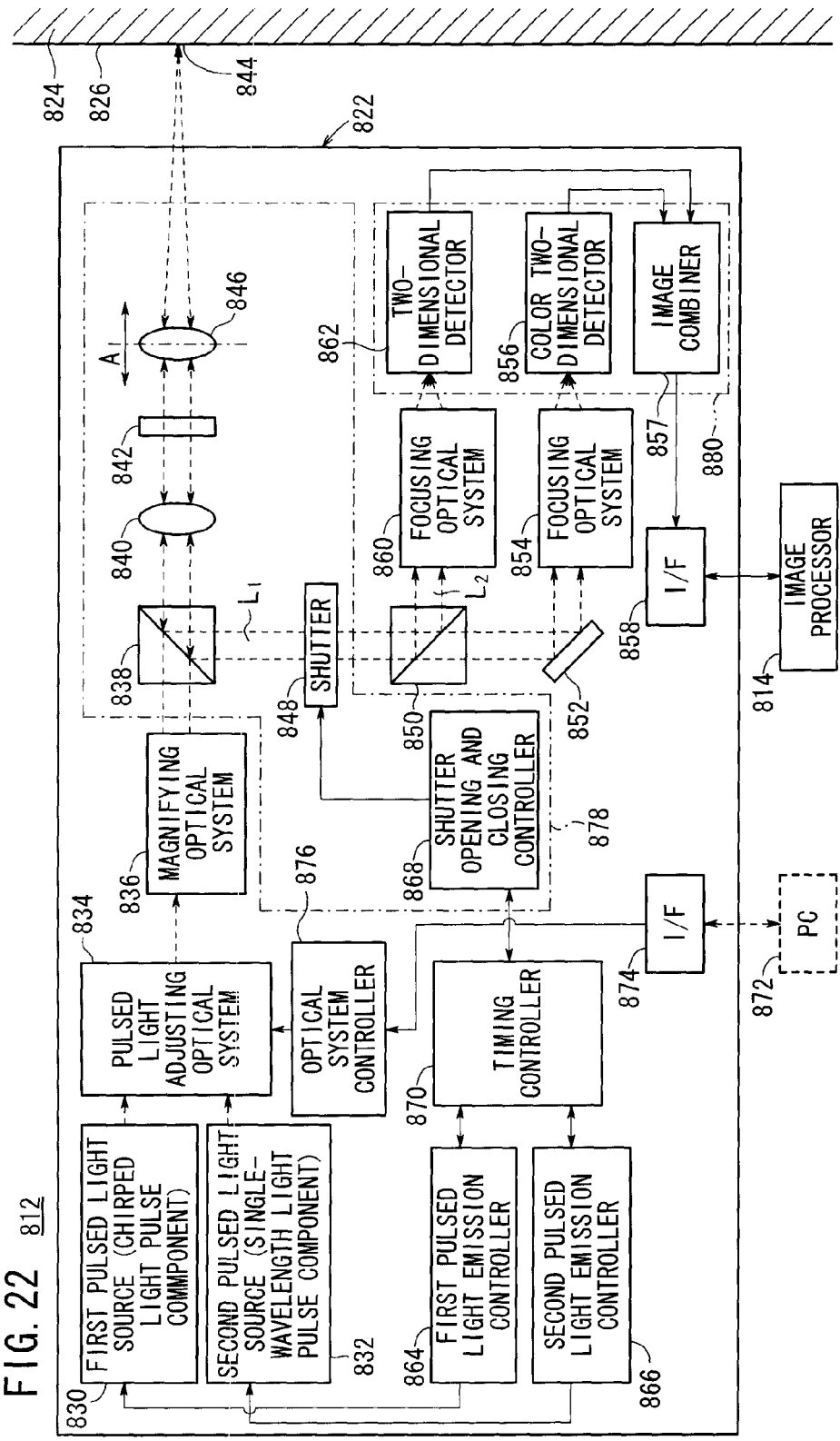
FIG. 22 is a block diagram of a three-dimensional shape measuring apparatus shown in FIG. 21.

FIG. 22 is a block diagram of the three-dimensional shape measuring apparatus 812 shown in FIG. 21.

As shown in FIG. 22, the three-dimensional shape measuring apparatus 812 includes a first pulsed light source 830 for emitting first pulsed light, a second pulsed light source (single-wavelength pulse generator) 832 for emitting second pulsed light, a pulsed light adjusting optical system 834 for generating chirped light pulses by chirping the first pulsed light emitted from the first pulsed light source 830, while also adjusting the light path of the chirped light pulses or the second pulsed light emitted from the second pulsed light source 832 so as to generate combined light pulses, a magnifying optical system 836 for increasing the beam diameter of the combined light pulses generated by the pulsed light adjusting optical system 834, a polarizing beam splitter 838 for splitting the combined light pulses, the beam diameter of which is increased by the magnifying optical system 836 depending on the direction of polarization thereof, a collimator lens 840 for parallelizing the combined light pulses transmitted through the polarizing beam splitter 838, a λ/4 wavelength plate 842 for tilting to a given direction the direction of polarization of the combined light pulses parallelized by the collimator lens 840, and an objective lens 846 for converging the rays of the combined light pulses polarized by the λ/4 wavelength plate 842 into a focused image (hereinafter referred to as "irradiated region") 844 on the surface 826 of the workpiece 824. The objective lens 846 is movable in the directions indicated by the arrow A, i.e., in directions perpendicular to the workpiece 824, by a drive mechanism, not shown.

The three-dimensional shape measuring apparatus 812 also includes, on a light path $L_1$, a shutter 848 having an openable and closable opaque shutter diaphragm, not shown, for extracting combined light pulses reflected by the polarizing beam splitter 838, a dichroic mirror 850 for reflecting into a light path $L_2$ only light pulses having a given wavelength (hereinafter referred to as "single-wavelength pulse component") from among the combined light pulses extracted by the shutter 848, and transmitting therethrough light pulses having other wavelengths (hereinafter referred to as "chirped light pulse component"), a reflecting mirror 852 for reflecting the chirped light pulse component, which is transmitted through the dichroic mirror 850, at a given angular direction, a focusing optical system 854 for producing an appropriate reflected light image (first reflected light image) from the chirped light pulse component reflected by the reflecting mirror 852, a color two-dimensional detector 856 for converting the first reflected light image produced by the focusing optical system 854 into a first captured image signal, an image combiner 857 for combining together the first captured image signal generated by the color two-dimensional detector 856 and a second captured image signal, to be described below, and an I/F 858 for sending a captured image signal combined by the image combiner 857 to the image processor 814.

The three-dimensional shape measuring apparatus 812 also includes, on the light path $L_2$, a focusing optical system 860 for producing an appropriate reflected light image (second reflected light image) from the single-wavelength light pulse component reflected by the dichroic mirror 850, and a two-dimensional detector 862 for converting the second reflected light image produced by the focusing optical system 860 into a second captured image signal. The second captured image signal is supplied to the image combiner 857, which combines the second captured image signal and the first captured image signal from the color two-dimensional detector 856, as described above.

The three-dimensional shape measuring apparatus 812 also includes a first pulsed light emission controller 864 for controlling emission of the first pulsed light from the first pulsed light source 830, a second pulsed light emission controller 866 for controlling emission of the second pulsed light from the second pulsed light source 832, a shutter opening and closing controller 868 for controlling opening and closing of a shutter diaphragm (not shown) of the shutter 848, and a timing controller 870 for controlling emission timing of the first and second pulsed light from the first and second pulsed light sources 830, 832, and also controlling the timing at which the shutter diaphragm of the shutter 848 is opened and closed.

The three-dimensional shape measuring apparatus 812 also includes an I/F 874 electrically connected to a PC 872, which is disposed externally of the three-dimensional shape measuring apparatus 812, for acquiring a light path adjustment parameter preset by the PC 872, and an optical system controller 876 for controlling the light path length of the pulsed light adjusting optical system 834, based on the light path adjustment parameter acquired through the I/F 874.

The polarizing beam splitter 838, the collimator lens 840, the λ/4 wavelength plate 842, the objective lens 846, the shutter 848, and the shutter opening and closing controller 868 jointly make up a reflected light image acquisition unit (first reflected light image acquisition unit) 878 for acquiring a reflected light image made up of chirped light pulses on the light path $L_1$, which are reflected by the workpiece 824. The above components of the reflected light image acquisition unit (first reflected light image acquisition unit) 878 also jointly make up a second reflected light image acquisition unit for acquiring a reflected light image made up of single-wavelength light pulses on the light path $L_1$, which are reflected by the workpiece 824. The color two-dimensional detector 856, the image combiner 857, and the two-dimensional detector 862 jointly make up a three-dimensional information acquisition unit 880 for acquiring three-dimensional information of the workpiece 824 using two-dimensional information and color information represented by the reflected light image made up of chirped light pulses. The dichroic mirror 850 serves as a light separator for separating the combined light pulses into a first reflected light image and a second reflected light image.

Figure 23:
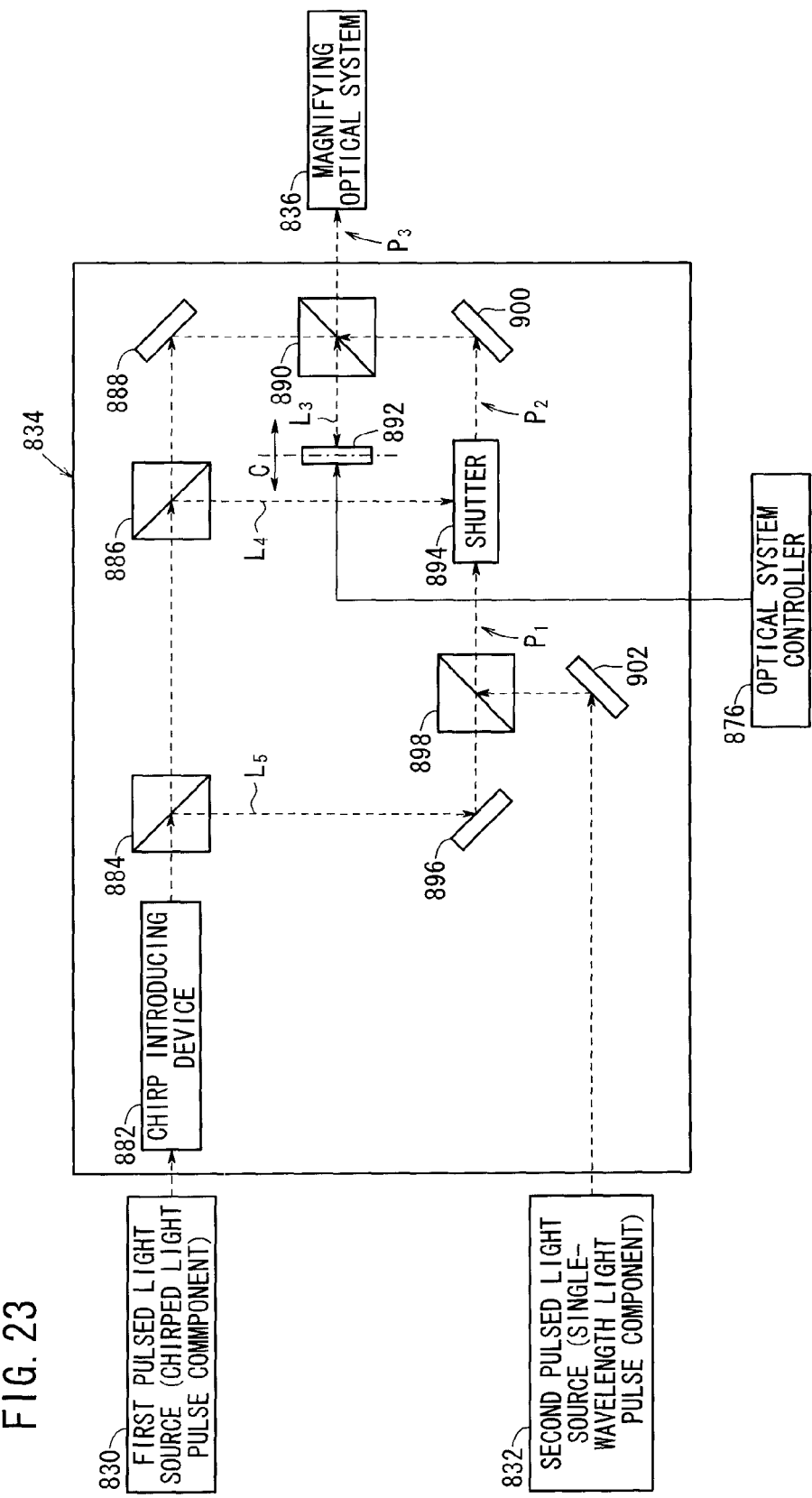
FIG. 23 is a block diagram of a pulsed light adjusting optical system shown in FIG. 22.

FIG. 23 is a block diagram of the pulsed light adjusting optical system 834 shown in FIG. 22.

As shown in FIG. 23, the pulsed light adjusting optical system 834 includes a chirp introducing device (chirped light pulse generator) 882 for generating chirped light pulses by chirping the first pulsed light emitted from the first pulsed light source 830, a beam splitter 884 for splitting the chirped light pulses generated by the chirp introducing device 882, a beam splitter 886 for splitting chirped light pulses transmitted through the beam splitter 884, a reflecting mirror 888 for reflecting at a given angular direction the chirped light pulses transmitted through the beam splitter 886, a beam splitter 890 for reflecting a portion of the chirped light pulses reflected by the reflecting mirror 888 into a light path $L_3$, and a reflecting mirror 892 for reflecting back the chirped light pulses reflected by the beam splitter 890. The reflecting mirror 892 is movable in the directions indicated by the arrow C, i.e., in directions parallel to the light path $L_3$, by a drive mechanism, not shown, under the control of the optical system controller 876.

The pulsed light adjusting optical system 834 also includes, on a light path $L_4$, a shutter 894 having an opaque shutter diaphragm, not shown, which opens and closes when triggered by light, which is reflected by the beam splitter 886. The shutter 894 comprises an ultrahigh-speed nonlinear optical shutter or the like.

The pulsed light adjusting optical system 834 also includes, on a light path $L_5$, a reflecting mirror 896 for reflecting at a given angular direction the chirped light pulses reflected by the beam splitter 884, a dichroic mirror 898 for reflecting, among the light reflected by the reflecting mirror 896, only single-wavelength light pulses having a certain wavelength, while transmitting therethrough light pulses (including chirped light pulses) of other wavelengths, the shutter 894, which extracts chirped light pulses transmitted through the dichroic mirror 898, and a reflecting mirror 900 for reflecting at a given angular direction the chirped light pulses extracted by the shutter 894. The beam splitter 890 reflects a portion of the chirped light pulses reflected by the reflecting mirror 900 toward the magnifying optical system 836.

The pulsed light adjusting optical system 834 also includes a reflecting mirror 902 for reflecting at a given angular direction, i.e., toward the dichroic mirror 898, the second pulsed light emitted from the second pulsed light source 832. The chirped light pulses generated by the chirp introducing device 882 has a wavelength range of $\lambda_P \leq \lambda \leq \lambda_R$, for example, and the second pulsed light comprises single-wavelength light has a wavelength ($\lambda < \lambda_P$ or $\lambda > \lambda_R$) that lies outside of the wavelength range of $\lambda_P \leq \lambda \leq \lambda_R$.

The beam splitter 884, the reflecting mirror 896, the dichroic mirror 898, and the reflecting mirror 902 jointly make up a light combiner for combining chirped light pulses and single-wavelength light pulses into combined light pulses. The beam splitter 884 serves as a light distributor for distributing chirped light pulses. The optical system controller 876 and the reflecting mirror 892 jointly make up a light path length adjuster for adjusting the lengths of light paths of the chirped light pulses, so that the chirped light pulses will not overlap with each other on one light path.

The three-dimensional shape measuring system 810 according to the fifth embodiment basically is constructed as described above. A measuring operation sequence of the three-dimensional shape measuring system 810 will be described below.

First, the operator, i.e., the user, of the three-dimensional shape measuring system 810 makes preparations for a process of measuring a three-dimensional shape of the surface 826 of the workpiece 824 with the three-dimensional shape measuring system 810.

Then, the operator enters a measurement start instruction using the non-illustrated control console of the host controller 818, in order to start the process of measuring a three-dimensional shape of the surface 826 of the workpiece 824.

As shown in FIG. 22, in response to a pulse emission command from the first pulsed light emission controller 864, the first pulsed light source 830 emits pulsed light. The pulsed light is supplied to the pulsed light adjusting optical system 834. Similarly, in response to a pulse emission command from the second pulsed light emission controller 866, the second pulsed light source 832 emits pulsed light. The pulsed light, which comprises single-wavelength light pulses, is supplied to the pulsed light adjusting optical system 834.

As shown in FIG. 23, the pulsed light emitted from the first pulsed light source 830 is chirped by the chirp introducing device 882, thereby generating chirped light pulses. The chirped light pulses are transmitted through the beam splitter 884 and the beam splitter 886, and the chirped light pulses are reflected by the reflecting mirror 888 to the beam splitter 890, which reflects a portion of the chirped light pulses. The reflected chirped light pulses (hereinafter referred to as "chirped light pulses 910*b*") travel on the light path $L_3$ to the reflecting mirror 892, which reflects back the chirped light pulses 910*b* to the beam splitter 890. The beam splitter 890 transmits the chirped light pulses 910*b* therethrough toward the magnifying optical system 836.

A portion of the chirped light pulses, which are transmitted through the beam splitter 884, are reflected into the light path $L_4$ by the beam splitter 886, and are applied to the shutter 894. The shutter 894, which comprises an ultrahigh-speed nonlinear optical shutter or the like, is opened only when chirped light pulses, which act as exciting light, reach the shutter 894. The shutter 894 can realize a response time within a range from picoseconds to femtoseconds. The shutter 894 can be opened and closed at an appropriate timing by setting the light path $L_5$ to an appropriate length.

A portion of the chirped light pulses, which are generated by the chirp introducing device 882 (hereinafter referred to as "chirped light pulses 910*a*"), are reflected into the light path $L_5$ by the beam splitter 884, and the chirped light pulses are reflected by the reflecting mirror 896. The chirped light pulses 910*a* are then transmitted through the dichroic mirror 898, extracted at a given timing by the shutter 984, reflected by the reflecting mirror 900, reflected by the beam splitter 890, and supplied to the magnifying optical system 836.

The second pulsed light source 832 emits single-wavelength light pulses 912. The single-wavelength light pulses 912 are reflected by the reflecting mirror 902, reflected by the dichroic mirror 898, extracted at a given timing by the shutter 984, reflected by the reflecting mirror 900, reflected by the beam splitter 890, and supplied to the magnifying optical system 836.

Flight positions of the chirped light pulses 910*a*, 910*b* and the single-wavelength light pulses 912 are appropriately adjusted by controlling the length of the light path of the chirped light pulses 910*a* by the optical system controller 876 (see FIG. 22), and by controlling the emission timing of the single-wavelength light pulses 912 by the timing controller 870. The adjustment of the flight positions of the chirped light pulses 910*a*, 910*b* and the single-wavelength light pulses 912 will be described in detail below, with reference to FIGS. 24A through 24C.

Figure 24A:
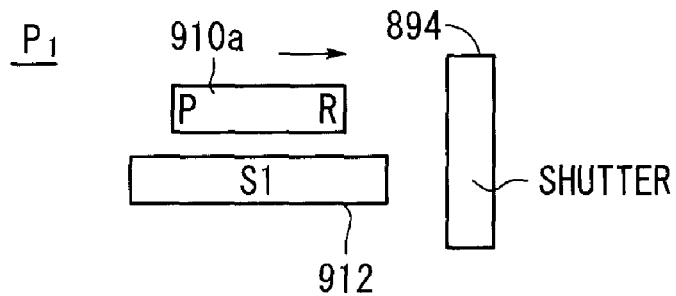
FIG. 24A is a diagram showing the relationship between flight positions of a chirped light pulse and a single-wavelength light pulse immediately before the light pulses pass through a shutter.

FIG. 24A is a diagram showing the relationship between flight positions of a chirped light pulse 910*a* and a single-wavelength light pulse 912 immediately before the pulses pass through the shutter 894, i.e., at the position P1 shown in FIG. 23.

As shown in FIG. 24A, the chirped light pulse 910*a* and the single-wavelength light pulse 912 travel in the direction indicated by the arrow. It is assumed that the chirped light pulse 910*a* changes continuously in color from a longer wavelength side (red indicated as "R" in FIG. 24A) at a leading edge thereof to a shorter wavelength side (purple indicated as "P" in FIG. 24A) at a trailing end thereof. Further, the single-wavelength light pulse 912 has a given wavelength (indicated as "S1" in FIG. 24A, corresponding to a wavelength in the ultraviolet range), which is longer than the chirped light pulse 910a.

The emission timing of the single-wavelength light pulse 912 from the second pulsed light source 832 is adjusted by the timing controller 870 (see FIG. 22). The single-wavelength light pulse 912 is combined at the position of the dichroic mirror 898 with the chirped light pulse 910a, which is emitted from the first pulsed light source 830, and thereafter the light pulses travel along the same light path.

Figure 24B:
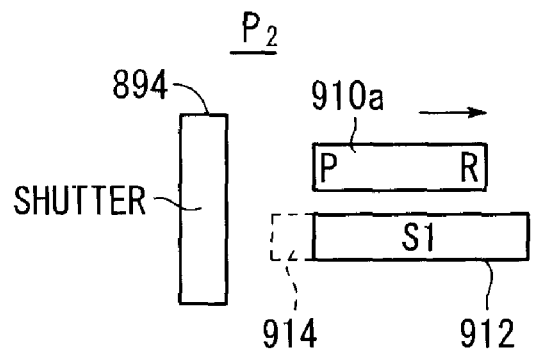
FIG. 24B is a diagram showing the relationship between flight positions of the chirped light pulse and the single-wavelength light pulse immediately after the light pulses pass through the shutter.

FIG. 24B is a diagram showing the relationship between flight positions of the chirped light pulse 910a and the single-wavelength light pulse 912, immediately after the light pulses pass through the shutter 894, i.e., at the position P2 shown in FIG. 23.

As shown in FIG. 24B, the chirped light pulse 910a and the single-wavelength light pulse 912, which are combined with each other, are extracted by the shutter 894 when the shutter 894 is opened and closed. The single-wavelength light pulse 912 has the trailing edge 914 thereof cut off by the shutter 894, so that the chirped light pulse 910a and the single-wavelength light pulse 912 have respective trailing edges aligned with each other.

Thereafter, the chirped light pulse 910a and the single-wavelength light pulse 912, with the trailing edge 914 thereof cut off, are reflected by the reflecting mirror 900 and then reflected by the beam splitter 890. Then, the chirped light pulse 910a and the single-wavelength light pulse 912 are supplied, along with another chirped light pulse 910b, as a combined light pulse 916 to the magnifying optical system 836.

Figure 24C:
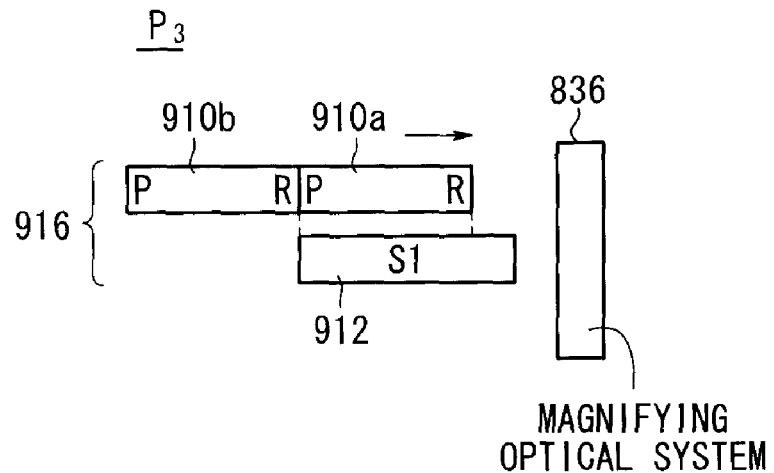
FIG. 24C is a diagram showing the relationship between the flight position of a combined light pulse immediately before it is supplied to a magnifying optical system.

FIG. 24C is a diagram showing the relationship between flight positions of the combined light pulse 916, immediately before the combined light pulse 916 is supplied to the magnifying optical system 836, i.e., at the position $P_3$ shown in FIG. 23.

As shown in FIG. 24C, among the chirped light pulses emitted from the first pulsed light source 830, the chirped light pulse 910b transmitted through the beam splitter 884 and supplied to the beam splitter 890 has the light path length $L_3$ thereof appropriately adjusted by the reflecting mirror 892, which is moved in a direction indicated by the arrow C (see FIG. 23). The training edge P of the chirped light pulse 910a and the leading edge R of the chirped light pulse 910b are in substantial agreement with each other. In other words, no time interval occurs between the chirped light pulses 910a, 910b, or stated otherwise, the chirped light pulses 910a, 910b are positioned in series with each other, such that the trailing edge P of the chirped light pulse 910a and the leading edge R of the chirped light pulse 910b are held in contact with each other.

According to the present embodiment, the light path adjustment parameter preset by the PC 872 is acquired through the I/F 874 and stored in a memory, not shown. The optical system controller 876 reads the light path adjustment parameter from memory, determines a distance by which the reflecting mirror 892 is to move based on the light path adjustment parameter, and moves the reflecting mirror 892 over the determined distance in the direction indicated by the arrow C to a suitable position.

As shown in FIG. 22, when the combined light pulse 916 is supplied from the pulsed light adjusting optical system 834 to the magnifying optical system 936, the beam diameter of the combined light pulse 916 is increased by the magnifying optical system 936. The combined light pulse 916 then is transmitted through the polarizing beam splitter 838, parallelized by the collimator lens 840, converted from linearly polarized light into circularly polarized light by the λ/4 wavelength plate 842, and then focused by the objective lens 846 onto the irradiated region 844 on the surface 826 of the workpiece 824.

The objective lens 846 is displaced in advance by a given distance in the direction indicated by the arrow A, i.e., along the Z-axis, by a drive mechanism, not shown, so as to set the irradiated region 844 to a desired size.

The combined light pulse 916, which is reflected by the irradiated region 844 on the surface 826 of the workpiece 824, is converged by the objective lens 846, converted from circularly polarized light into linearly polarized light by the λ/4 wavelength plate 842, parallelized by the collimator lens 840, reflected so as to travel along the light path $L_1$ by the polarizing beam splitter 838, and extracted in a predetermined light quantity and at a given timing by the shutter 848. Then, only the chirped light pulse component (chirped light pulses 910a, 910b) of the combined light pulse 916 is transmitted through the dichroic mirror 850, and is reflected at a given angular direction by the reflecting mirror 852. The focusing optical system 854 produces a first reflected light image of the chirped light pulse component, which then is converted into a first captured image signal by the color two-dimensional detector 856. The first captured image signal is supplied from the color two-dimensional detector 856 to the image combiner 857.

Among the combined light pulse 916 extracted by the shutter 848, only the single-wavelength light pulse component (the single-wavelength light pulse 912) thereof is reflected by the dichroic mirror 850 into the light path $L_2$. The focusing optical system 860 produces a second reflected light image of the single-wavelength light pulse component, which then is converted into a second captured image signal by the two-dimensional detector 862. The second captured image signal is supplied from the two-dimensional detector 862 to the image combiner 857.

The single-wavelength light pulse 912 has a wavelength that lies outside of the wavelength range of $\lambda_P \leq \lambda \leq \lambda_R$ of the chirped light pulses 910a, 910b. Therefore, the combined light pulse 916 is separated completely by the dichroic mirror 850 into the chirped light pulse component and the single-wavelength light pulse component.

The first captured image signal and the second captured image signal are combined by the image combiner 857 to produce a new captured image signal. A specific image processing sequence carried out by the image combiner 857 will be described in detail below with reference to FIGS. 24C through 25B.

First, the first captured image signal and the second captured image signal are processed, by an appropriate known image processing process such as Affine transformation, image scaling, area-based matching, or the like, in order to associate the two-dimensional positions (X-Y coordinates) of the pixels of the first captured image signal and the second captured image signal. The color two-dimensional detector 856 and the two-dimensional detector 862 preferably have respective image capturing areas, which are identical to each other. The resolution and number of pixels of the color two-dimensional detector 856 preferably are identical to the resolution and number of pixels of the two-dimensional detector 862. If the color two-dimensional detector 856 and the two-dimensional detector 862 have identical image capturing areas, resolutions, and numbers of pixels, then the above image processing steps are not necessary, because the two-dimensional positions (X-Y coordinates) of the pixels of the first captured image signal and the second captured image signal already are associated with each other in advance.

Then, a captured image signal representing a three-dimensional shape of the workpiece 842 is acquired using the two-dimensional positions and the color information of the first captured image signal, while referring to the two-dimensional positions (addresses corresponding to pixels) of the second captured image signal.

Figure 25A:
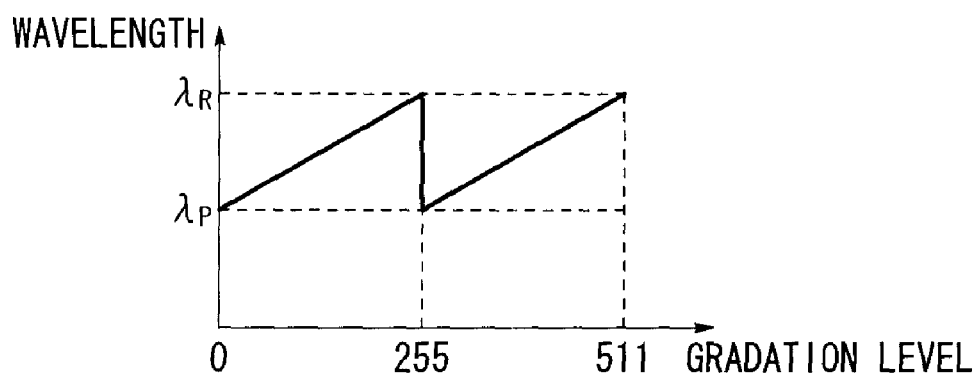
FIG. 25A is a graph showing the relationship between the wavelength of a first captured image signal and gradation levels of a combined captured image signal.

FIG. 25A is a graph showing the relationship between the wavelength of the first captured image signal and gradation levels of the combined captured image signal. It is assumed that as the gradation level of the combined captured image signal becomes higher, the Z-axis coordinate is greater (closer to the image capturing surface 822). Further, as the gradation level of the combined captured image signal becomes lower, the Z-axis coordinate is smaller (farther from the image capturing surface 822).

If each of the chirped light pulses 910a, 910b shown in FIG. 24C is capable of expressing 256 gradation levels for the spatial resolution in the depthwise direction, i.e., along the Z-axis, then the combined light pulse 916 shown in FIG. 25A is capable of expressing 512 gradation levels, which are twice the 256 gradation levels. In FIG. 24C, the gradation level 511 (highest value) corresponds to the wavelength $\lambda_R$ at the leading edge R of the chirped light pulse 910a, the gradation level 0 (lowest value) corresponds to the wavelength $\lambda_P$ at the trailing edge P of the chirped light pulse 910b, and the gradation level 255 (intermediate value) corresponds to the wavelength $\lambda_P$ at the trailing edge P of the chirped light pulse 910a or the wavelength $\lambda_R$ at the leading edge R of the chirped light pulse 910b. Therefore, the wavelength of the first captured image signal and the gradation levels of the combined captured image signal are related to each other in the form of a sawtooth wave.

Figure 25B:
FIG. 25B is a graph showing the relationship between the detected light intensity of a second captured image signal and gradation levels of the combined captured image signal.

FIG. 25B is a graph showing the relationship between the detected light intensity of the second captured image signal and gradation levels of the combined captured image signal. At the flight position corresponding to the chirped light pulse 910a, the detected light intensity of the second captured image signal has a certain value, because the single-wavelength light pulse 912 is detected. At the flight position corresponding to the chirped light pulse 910b, the detected light intensity of the second captured image signal is nil, because no single-wavelength light pulse is detected (see FIG. 24C).

As shown in FIG. 24B, since the single-wavelength light pulse 912 has the trailing edge 914 thereof cut off by the shutter 894, when the chirped light pulse 910b is extracted by the shutter 848 (see FIG. 22), the single-wavelength light pulses 912 are not extracted. Consequently, the type of the extracted chirped light pulse 910a or 910b can be identified, based on whether the single-wavelength light pulses 912 are detected or not.

Furthermore, inasmuch as the trailing edge of the chirped light pulse 910a and the leading edge of the chirped light pulse 910b are not spaced from each other and do not overlap with each other, the captured image signal is prevented from being detected in error.

The chirped light pulses 910a, 910b, which are arranged in series with each other, are combined with the single-wavelength light pulse 912, thereby producing the combined light pulse 916. Therefore, the chirped light pulses 910a, 910b can be detected as a virtually long chirped light pulse. In other words, the single-wavelength light pulse 912 provides a marking function, for identifying the sequence in which the chirped light pulses 910a, 910b are arranged. In addition, the wavelength of the first captured image signal (chirped light pulse component) and the detected light intensity of the second captured image signal (single-wavelength light pulse component) of the detected combined light pulse 916 are combined with each other, in order to express gradation levels beyond the gradation expression capability of one type of chirped light pulses.

The captured image signal, thus combined, is sent via the I/F 858 to the image processor 814, which is disposed externally of the three-dimensional shape measuring apparatus 812. The image processor 814 processes the captured image signal, and sends the processed image signal to the monitor 816 (see FIG. 21), which displays a visible image based on the image signal. Based on the displayed visible image, the operator can analyze and recognize a three-dimensional shape of the workpiece 824 within the irradiated region 844 on the surface 826 of the workpiece 824.

Modifications of the three-dimensional shape measuring apparatus 812 according to the fifth embodiment will be described below with reference to FIGS. 26 through 28C. Components of the modifications, which are identical to those of the fifth embodiment, are denoted by identical reference characters, and such features will not be described in detail below.

Figure 26:
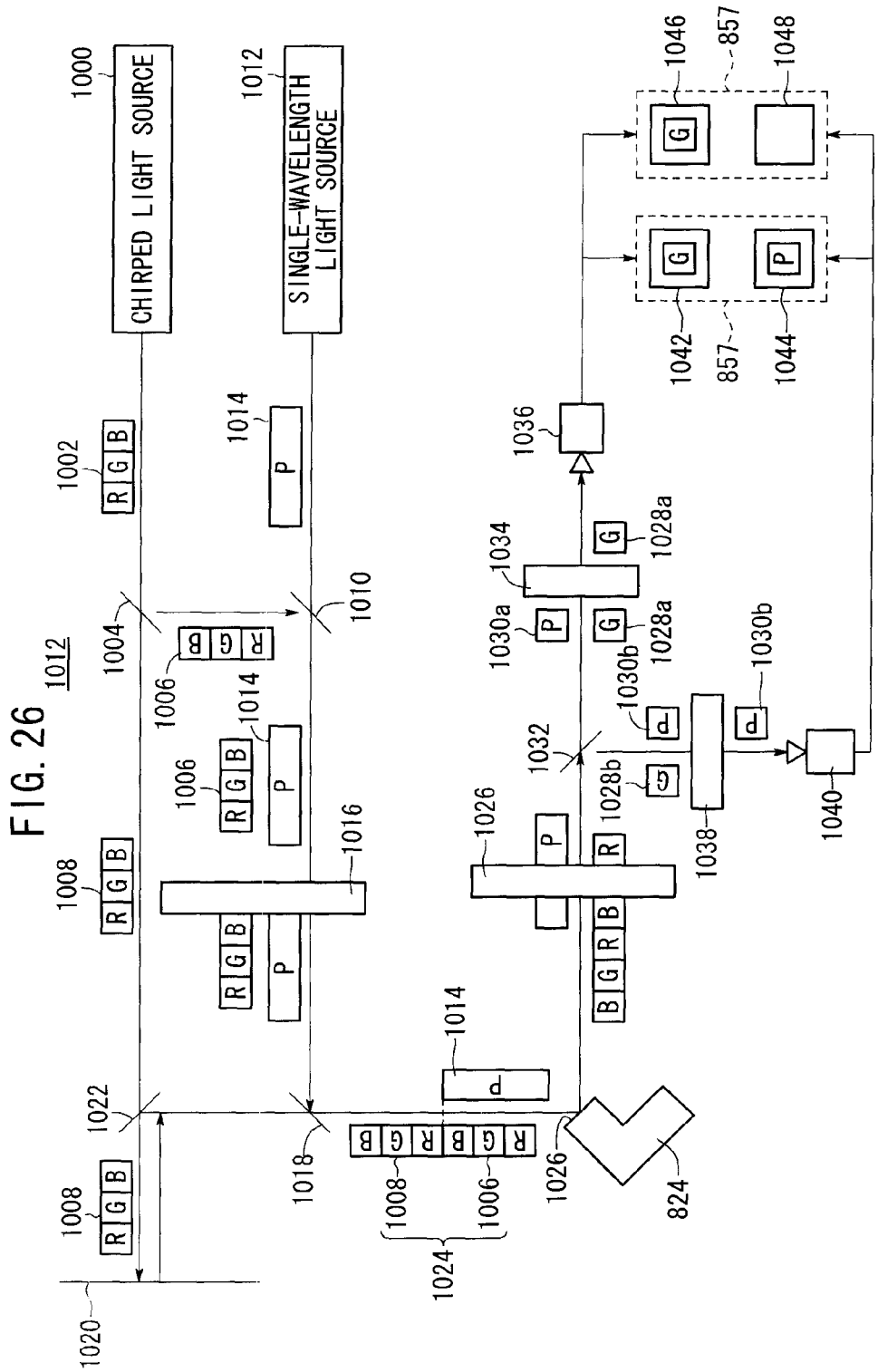
FIG. 26 is a schematic side elevational view, partially in block form, of a three-dimensional shape measuring apparatus according to a first modification of the fifth embodiment.

FIG. 26 is a schematic side elevational view, partially in block form, of a three-dimensional shape measuring apparatus 812a according to a first modification of the fifth embodiment, the view also showing the flight positions of light pulses.

Chirped light pulses 1002 emitted from a chirped light source (chirped light pulse generator) 1000 are changed continuously in color from a leading edge to a trailing edge, in the order of red (R in FIG. 26), green (G in FIG. 26), and blue (B in FIG. 26). The chirped light pulses 1002 are split by a beam splitter (light distributor) 1004 into a first chirped light pulse 1006 and a second chirped light pulse 1008. The first chirped light pulse 1006, which is reflected by the beam splitter 1004, is reflected again by a reflecting mirror 1010 and is combined with a single-wavelength light pulse 1014, which is emitted at an appropriate timing from a single-wavelength light source (single-wavelength light pulse generator) 1012, after which the light pulses travel along the same light path. The single-wavelength light pulse 1014 has a wavelength representing purple (P in FIG. 26), which lies outside of the wavelength range of the chirped light pulses 1002.

When a shutter 1016 is opened and closed, the shutter 1016 cuts off the trailing edge of the single-wavelength light pulse 1014, such that the first chirped light pulse 1006 and the single-wavelength light pulse 1014 have trailing edges that are aligned with each other. Thereafter, the first chirped light pulse 1006 and the single-wavelength light pulse 1014 are reflected at a given angular direction by a reflecting mirror 1018, and are applied to the surface 826 of the workpiece 824.

The second chirped light pulse 1008, which is transmitted through the beam splitter 1004, is reflected by a reflecting mirror (light path length adjuster) 1020. Then, the second chirped light pulse 1008 is reflected at a given angular direction by a reflecting mirror 1022, and applied to the surface 826 of the workpiece 824.

More specifically, the distance by which the reflecting mirror 1020 and the reflecting mirror 1022 are spaced from each other, as well as the length of the light path along which the second chirped light pulse 1008 travels, are set such that the first chirped light pulse 1006 and the second chirped light pulse 1008 are added together, without any time interval being interposed therebetween. The first chirped light pulse 1006, the second chirped light pulse 1008, and the single-wavelength light pulse 1014 are combined into a combined light pulse 1024, which is applied to the surface 826 of the workpiece 824.

The combined light pulse 1024, which is applied to the surface 826 of the workpiece 824, is reflected by the surface 826 and extracted in a predetermined light quantity and at a given timing by a shutter 1026. It is assumed that a green light component 1028 of the first chirped light pulse 1006, and a single-wavelength component 1030 of the single-wavelength light pulse 1014 are extracted by the shutter 1026. The green light component 1028 and the single-wavelength component 1030 then are split by a beam splitter 1032.

A green light component 1028*a* and a single-wavelength component 1030*a*, which are transmitted through the beam splitter 1032, are applied to a bandpass filter (first reflected light image acquisition unit) 1034, which passes light having wavelengths that are longer than blue light. The bandpass filter 1034 blocks only the single-wavelength component 1030*a*. The green light component 1028*a*, which is transmitted through the bandpass filter 1034, is captured by a depthwise measurement camera 1036.

A green light component 1028*b* and a single-wavelength component 1030*b*, which are reflected by the beam splitter 1032, are applied to a bandpass filter (second reflected light image acquisition unit) 1038, which in turn passes light having wavelengths that are shorter than blue light. The bandpass filter 1038 blocks only the green light component 1028*b*. The single-wavelength component 1030*b*, which is transmitted through the bandpass filter 1038, is captured by an index judgement camera 1040.

If the green light component 1028 of the first chirped light pulse 1006 is extracted by the shutter 1026, the image combiner 857 is supplied with a first captured image signal 1042 from the depthwise measurement camera 1036, as well as with a second captured image signal 1044 from the index judgement camera 1040. If the green light component of the second chirped light pulse 1008 is extracted by the shutter 1026, the image combiner 857 is supplied with a first captured image signal 1046 from the depthwise measurement camera 1036, as well as with a second captured image signal 1048 from the index judgement camera 1040.

The first captured image signal 1042 and the first captured image signal 1046 are substantially in agreement with each other, whereas the second captured image signal 1044 and the second captured image signal 1048 differ from each other. Consequently, different depthwise positions on the surface 826 of the workpiece 824 can be identified by referring to the second captured image signals, which serve as an index representing the sequence in which the chirped light pulses are arranged.

A second modification of the fifth embodiment will be described below with reference to FIGS. 27A through 27C. The second modification differs from the fifth embodiment as to the makeup of the combined light pulse generated by the pulsed light adjusting optical system 834, as well as in the process of combining captured image signals, which is carried out by the image combiner 857.

Figure 27A:
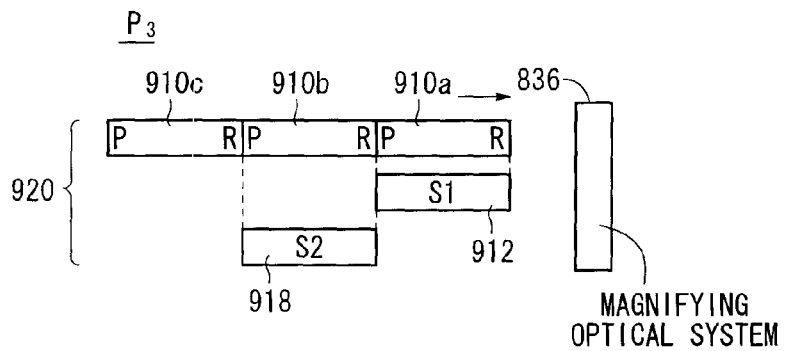
FIG. 27A is a diagram showing the relationship between the flight position of a combined light pulse immediately before it reaches a magnifying optical system, according to a second modification of the fifth embodiment.

FIG. 27A is a diagram showing the relationship between flight positions of a combined light pulse 920 immediately before the combined light pulse 920 reaches the magnifying optical system 836, i.e., at the position $P_3$ in FIG. 23, according to the second modification of the fifth embodiment. The flight position of the trailing edge P of a chirped light pulse 910*a*, and the flight position of the leading edge R of a chirped light pulse 910*b* are in substantial agreement with each other. Also, the flight position of the trailing edge P of the chirped light pulse 910*b*, and the flight position of the leading edge R of the chirped light pulse 910*c* are in substantial agreement with each other. In other words, the chirped light pulses 910*a*, 910*b* and 910*c* are combined such that the chirped light pulses are arranged in series with each other. A single-wavelength light pulse 912 having a given wavelength S1 (corresponding to a wavelength in the ultraviolet range, for example) and the chirped light pulse 910*a* are adjusted such that they have the same flight position and the same pulse length. Furthermore, a single-wavelength light pulse 918 having a given wavelength S2 (corresponding to a wavelength in the infrared range, for example), which differs from the wavelength S1, and the chirped light pulse 910*b* are adjusted such that they have the same flight position and the same pulse length.

The single-wavelength light pulse 912 and the single-wavelength light pulse 918 may be emitted from one pulse light source (the second pulse light source 832 shown in FIG. 22), or may be emitted from different pulse light sources.

Figure 27B:
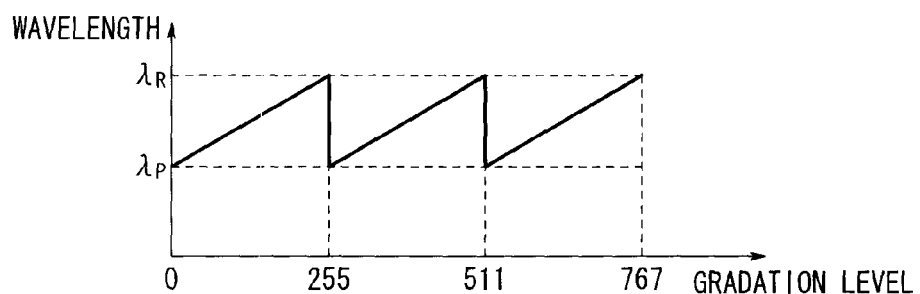
FIG. 27B is a graph showing the relationship between the wavelength of a first captured image signal, and gradation levels of a combined captured image signal according to the second modification of the fifth embodiment.

FIG. 27B is a graph showing the relationship between the wavelength of the first captured image signal and gradation levels of the combined captured image signal, according to the second modification of the fifth embodiment. The combined light pulse 920 shown in FIG. 27A is capable of expressing 768 gradation levels, which are three times the 256 gradation levels. In FIG. 27B, the gradation level 767 (highest value) corresponds to the wavelength $\lambda_R$ at the leading edge R of the chirped light pulse 910*a*, and the gradation level 0 (lowest value) corresponds to the wavelength $\lambda_P$ at the trailing edge P of the chirped light pulse 910*c*.

Figure 27C:
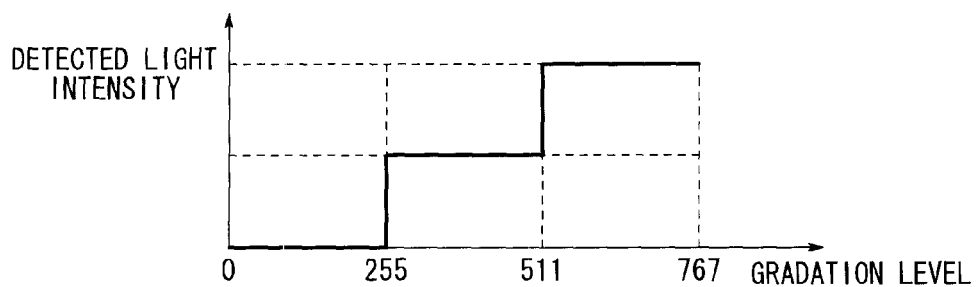
FIG. 27C is a graph showing the relationship between the detected light intensity of a second captured image signal, and gradation levels of the combined captured image signal according to the second modification of the fifth embodiment.

FIG. 27C is a graph showing the relationship between the detected light intensity of the second captured image signal and gradation levels of the combined captured image signal, according to the second modification of the fifth embodiment. At the flight position corresponding to the chirped light pulse 910*a*, the detected light intensity of the second captured image signal has a certain value (high level), because the single-wavelength light pulse 912 is detected. At the flight position corresponding to the chirped light pulse 910*b*, the detected light intensity of the second captured image signal has a certain value (low level), because the single-wavelength light pulse 918 is detected. At the flight position corresponding to the chirped light pulse 910*c*, the detected light intensity of the second captured image signal is nil, because no single-wavelength light pulse is detected.

A third modification of the fifth embodiment will be described below with reference to FIGS. 28A through 28C. The third modification differs from the fifth embodiment as to the makeup of the combined light pulse generated by the pulsed light adjusting optical system 834, as well as in the process of combining images, which is carried out by the image combiner 857.

Figure 28A:
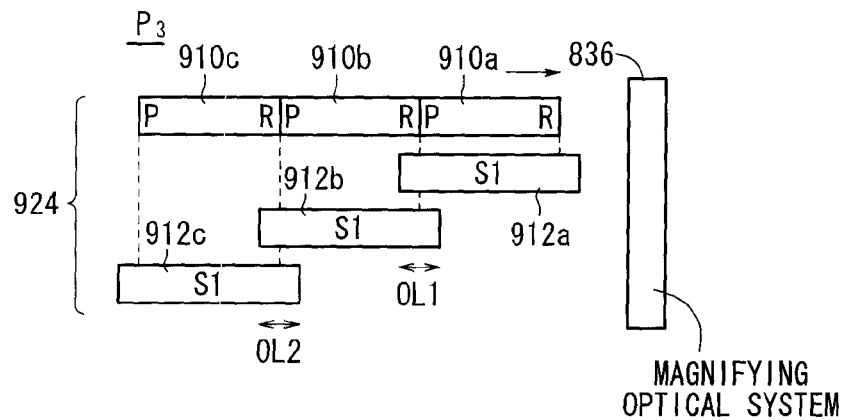
FIG. 28A is a diagram showing the relationship between the flight position of a combined light pulse immediately before it reaches a magnifying optical system, according to a third modification of the fifth embodiment.

FIG. 28A is a diagram showing the relationship between flight positions of a combined light pulse 924 immediately before the combined light pulse 924 reaches the magnifying optical system 836, i.e., at the position $P_3$ in FIG. 23, according to the third modification of the fifth embodiment. The flight position of the trailing edge P of a chirped light pulse 910*a*, and the flight position of the leading edge R of a chirped light pulse 910*b* are in substantial agreement with each other. Also, the flight position of the trailing edge P of the chirped light pulse 910*b*, and the flight position of the leading edge R of a chirped light pulse 910*c* are in substantial agreement with each other. In other words, the chirped light pulses 910*a*, 910*b* and 910*c* are combined such that the chirped light pulses are arranged in series with each other. A single-wavelength light pulse 912*a* having a given wavelength S1 (corresponding to a wavelength in the ultraviolet range, for example) and a high light intensity level, and the chirped light pulse 910*a* are adjusted such that they have the same flight position. A single-wavelength light pulse 912*b* having the wavelength S1 and a medium light intensity level, and the chirped light pulse 910*b* are adjusted such that they have the same flight position. A single-wavelength light pulse 912c having the wavelength S1 and a low light intensity level, and the chirped light pulse 910c are adjusted such that they have the same flight position. The single-wavelength light pulse 912b overlaps with the single-wavelength light pulse 912a within a range OL1, and overlaps with the single-wavelength light pulse 912c within a range OL2.

The single-wavelength light pulses 912a, 912b, 912c may be emitted from one pulse light source (the second pulse light source 832 shown in FIG. 22), or may be emitted from different pulse light sources.

Figure 28B:
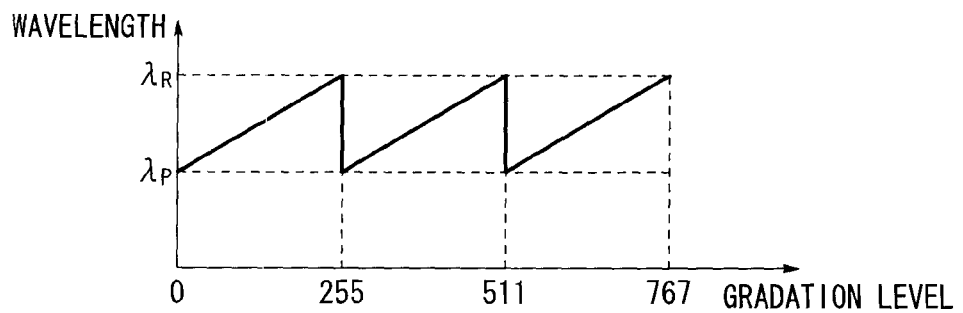
FIG. 28B is a graph showing the relationship between the wavelength of a first captured image signal, and gradation levels of a combined captured image signal according to the third modification of the fifth embodiment.

FIG. 28B is a graph showing the relationship between the wavelength of the first captured image signal and gradation levels of the combined captured image signal, according to the third modification of the fifth embodiment. The combined light pulse 920 shown in FIG. 28A is capable of expressing 768 gradation levels, which are three times the 256 gradation levels. The gradation levels shown in FIG. 28B are identical to those shown in FIG. 27B according to the second modification, and will not be described in detail below.

Figure 28C:
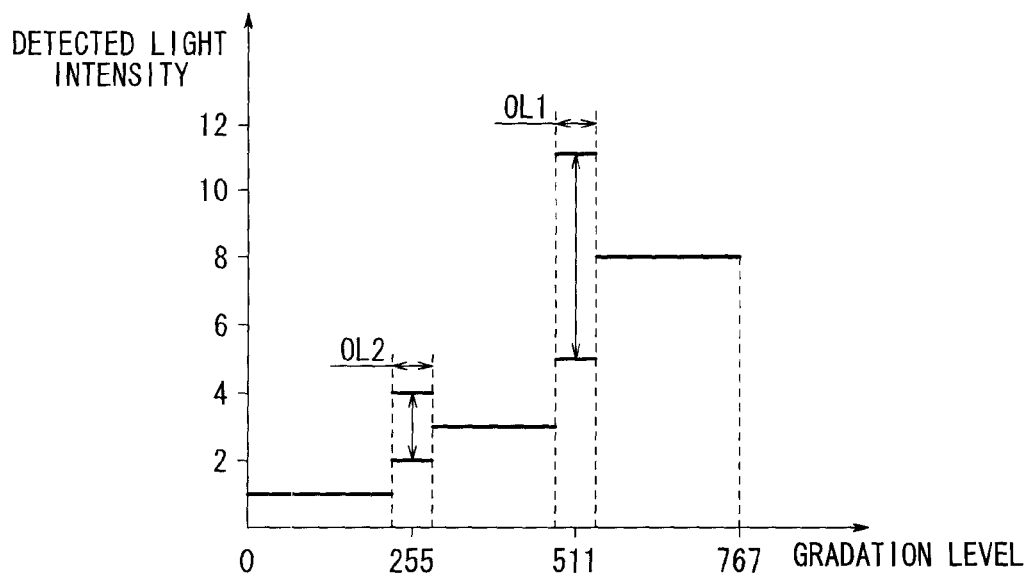
FIG. 28C is a graph showing the relationship between the detected light intensity of a second captured image signal, and gradation levels of the combined captured image signal according to the third modification of the fifth embodiment.

FIG. 28C is a graph showing the relationship between the detected light intensity of the second captured image signal and gradation levels of the combined captured image signal, according to the third modification of the fifth embodiment. At the flight position corresponding to the chirped light pulse 910a, the detected light intensity of the second captured image signal has a certain value (high level=8), because the single-wavelength light pulse 912a is detected. At the flight position corresponding to the chirped light pulse 910b, the detected light intensity of the second captured image signal has a certain value (medium level=3), because the single-wavelength light pulse 912b is detected. At the position corresponding to the chirped light pulse 910c, the detected light intensity of the second captured image signal has a certain value (low level=1), because the single-wavelength light pulse 912c is detected.

Within the range OL1 where the single-wavelength light pulse 912b overlaps with the single-wavelength light pulse 912a, the light intensity detected by the two-dimensional detector 862 may be varied within a range indicated by the arrow, depending on light interference. However, since the light intensity will not become lower than the medium level of 3, the combined captured image signal can be identified as having a gradation level of about 511, and can be converted into an appropriate gradation level without resulting in erroneous detection.

Within the range OL2 where the single-wavelength light pulse 912b overlaps with the single-wavelength light pulse 912c, the light intensity detected by the two-dimensional detector 862 may be varied within a range indicated by the arrow, depending on light interference. However, since the light intensity will not become lower than the low level of 1, the combined captured image signal can be identified as having a gradation level of about 255, and can be converted into an appropriate gradation level without resulting in erroneous detection.

The above light pulses are preferable, because such light pulses do not require an adjustment in the flight positions of the single-wavelength light pulses 912a through 912c and the chirped light pulses 910a through 910c, i.e., the leading edges and trailing edges of the successive light pulses. More specifically, the trailing edges 914 (or the leading edges) of the single-wavelength light pulses 912a through 912c shown in FIG. 24B are not required to be cut off using the shutter 894 (see FIG. 23) or the shutter 1016 (see FIG. 26).

The present invention is not limited to the above fifth embodiment, but various changes and modifications may be made to the illustrated embodiment within the scope of the invention.

For example, according to the fifth embodiment, the first pulsed light source 830 and the second pulsed light source 832, which serve as light sources, and the color two-dimensional detector 856 and the two-dimensional detector 862, which serve as detectors, are integrally incorporated into the three-dimensional shape measuring apparatus 812. However, such light sources and detectors may be disposed separately from the three-dimensional shape measuring apparatus 812.

In the fifth embodiment, the chirped light pulses and the single-wavelength light pulses are combined with each other. However, the chirped light pulses and the single-wavelength light pulses may travel along separate light paths, so that they will not suffer from light interference.

In the fifth embodiment, the image combiner 857 for combining the first and second captured image signals is incorporated into the three-dimensional shape measuring apparatus 812. However, the first and second captured image signals may also be combined by the image processor 814.

The two-dimensional detector 862 may comprise a monochromatic sensor (i.e., a device having a single light detecting wavelength characteristic) or a color sensor (i.e., a device having a plurality of light detecting wavelength characteristics).

In the fifth embodiment, moreover, two or three chirped light pulses are arranged in series with each other. However, four or more chirped light pulses may be arranged in series with each other.

Although certain preferred embodiments of the present invention have been shown and described in detail, it should be understood that various changes and modifications may be made to the embodiments without departing from the scope of the invention as set forth in the appended claims.

What is claimed is:

1. A three-dimensional shape measuring system comprising:
a chirped light pulse generator for generating chirped light pulses the color of which changes regularly with time;
a reflected light image acquisition unit for applying the chirped light pulses generated by the chirped light pulse generator to an object to be measured, and acquiring a reflected light image of the chirped light pulses, which are reflected from the object;
a three-dimensional information acquisition unit for acquiring three-dimensional information of the object using two-dimensional information and color information represented by the reflected light image of the chirped light pulses, which is acquired by the reflected light image acquisition unit; and
a field-of-vision enlarging mechanism for enlarging the field of vision of the three-dimensional information acquired by the three-dimensional information acquisition unit.

2. A three-dimensional shape measuring system according to claim 1, wherein the field-of-vision enlarging mechanism is provided in the reflected light image acquisition unit, the reflected light image acquisition unit further comprising:
an irradiated region scaler for scaling an irradiated region where the object is irradiated with the chirped light pulses; and
a light quantity adjuster for adjusting a light quantity by which the chirped light pulses are extracted, depending on the irradiated region scaled by the irradiated region scaler.

3. A three-dimensional shape measuring system according to claim 2, wherein the light quantity adjuster adjusts a timing at which the chirped light pulses are extracted, depending on a distance from the object to a position where the reflected light image of the chirped light pulses is acquired.

4. A three-dimensional shape measuring system according to claim 2, wherein the light quantity adjuster adjusts the light quantity by which the chirped light pulses are extracted, depending on a distance from the object to a position where the reflected light image of the chirped light pulses is acquired.

5. A three-dimensional shape measuring system according to claim 2, further comprising:
  a range finder for measuring a distance from the object to a position where the reflected light image of the chirped light pulses is acquired.

6. A three-dimensional shape measuring system according to claim 1, wherein the field-of-vision enlarging mechanism comprises a mechanism for applying the chirped light pulses along a plurality of paths toward respective irradiated regions of the object, and acquiring respective reflected light images of the chirped light pulses reflected from the object, the three-dimensional shape measuring system further comprising:
  a pulsed light source for generating pulsed light; and
  a light distributor for distributing the pulsed light generated by the pulsed light source,
  wherein the chirped light pulse generator comprises a plurality of chirped light pulse generators for generating the chirped light pulses, respectively, based on the pulsed light distributed by the light distributor, and
  wherein the reflected light image acquisition unit comprises a plurality of reflected light image acquisition units for acquiring respective reflected light images of the chirped light pulses, which are generated respectively by the chirped light pulse generators.

7. A three-dimensional shape measuring system according to claim 6, wherein the light distributor comprises a light distributor having a variable distribution ratio for distributing the pulsed light.

8. A three-dimensional shape measuring system according to claim 7, further comprising:
  a pulsed light distribution controller for determining quantities by which the pulsed light is to be distributed based on measurement information with respect to the irradiated regions, calculating the distribution ratio based on the determined quantities by which the pulsed light is distributed, and controlling the light distributor according to the calculated distribution ratio.

9. A three-dimensional shape measuring system according to claim 8, wherein the pulsed light distribution controller calculates the distribution ratio based on priority levels associated with the measurement information.

10. A three-dimensional shape measuring system according to claim 8, wherein, when the sum of the determined quantities by which the pulsed light is distributed is in excess of a predetermined value, the pulsed light distribution controller calculates the distribution ratio for distributing the pulsed light to the irradiated regions in a descending order of priority levels.

11. A three-dimensional shape measuring system according to claim 6, further comprising:
  a three-dimensional position acquisition unit for acquiring respective three-dimensional positional information with respect to the reflected light image acquisition units; and
  a three-dimensional information combiner for combining three-dimensional information of the object based on the three-dimensional positional information, which is acquired by the three-dimensional position acquisition unit,
  wherein the three-dimensional position acquisition unit acquires the three-dimensional positional information using a wave which is incoherent with the chirped light pulses.

12. A three-dimensional shape measuring system according to claim 1, wherein the field-of-vision enlarging mechanism comprises a mechanism for acquiring two-dimensional information of the object, within a region that is greater than an area where the three-dimensional information is acquired, the three-dimensional shape measuring system further comprising:
  a second reflected light image acquisition unit for applying illumination light to the object in order to acquire two-dimensional information of the object, and acquiring a reflected light image of the illumination light, which is reflected from the object;
  a two-dimensional detector for acquiring the two-dimensional information of the object by selectively acquiring the reflected light image of the illumination light, which is acquired by the second reflected light image acquisition unit, and the reflected light image of the chirped light pulses; and
  a switcher for switching between the reflected light image acquisition unit and the second reflected light image acquisition unit.

13. A three-dimensional shape measuring system according to claim 12, further comprising:
  a three-dimensional information combiner for combining the three-dimensional information of the object, which is acquired by the three-dimensional information acquisition unit, and the two-dimensional information of the object, which is acquired by the two-dimensional detector.

14. A three-dimensional shape measuring method comprising:
  a two-dimensional information acquiring step of applying illumination light to an object in order to acquire two-dimensional information of the object to be measured, acquiring a reflected light image of the illumination light reflected from the object, and acquiring two-dimensional information represented by the reflected light image of the illumination light;
  a three-dimensional information acquiring step of generating chirped light pulses the color of which changes regularly with time, applying the chirped light pulses to the object, acquiring a reflected light image of the chirped light pulses reflected from the object, and acquiring three-dimensional information of the object using two-dimensional information and color information represented by the reflected light image of the chirped light pulses; and
  a step of carrying out the three-dimensional information acquiring step on a location of the object, which is selected based on the two-dimensional information acquired by the two-dimensional information acquiring step.

15. A three-dimensional shape measuring system comprising:
  a chirped light pulse generator for generating chirped light pulses the color of which changes regularly with time;
  a single-wavelength light pulse generator for generating single-wavelength light pulses having a predetermined wavelength;

a first reflected light image acquisition unit for applying the chirped light pulses generated by the chirped light pulse generator to an object to be measured, and acquiring a reflected light image of the chirped light pulses, which are reflected from the object;

a second reflected light image acquisition unit for applying the single-wavelength light pulses generated by the single-wavelength light pulse generator to the object, and acquiring a reflected light image of the single-wavelength light pulses, which are reflected from the object;

a three-dimensional information acquisition unit for acquiring three-dimensional information of the object using two-dimensional information and color information represented by the reflected light image of the chirped light pulses, which is acquired by the first reflected light image acquisition unit, while referring to two-dimensional information of the reflected light image of the single-wavelength light pulses, which is acquired by the second reflected light image acquisition unit; and an irradiation timing adjuster for adjusting a timing at which the chirped light pulses are applied to the object, and a timing at which the single-wavelength light pulses are applied to the object.

16. A three-dimensional shape measuring system according to claim 15, further comprising:

a light combiner for combining the chirped light pulses and the single-wavelength light pulses into combined light pulses; and a light separator for separating the combined light pulses into the reflected light image of the chirped light pulses, which is acquired by the first reflected light image acquisition unit, and the reflected light image of the single-wavelength light pulses, which is acquired by the second reflected light image acquisition unit.

17. A three-dimensional shape measuring system according to claim 15, wherein the single-wavelength light pulse generator alternately generates single-wavelength light pulses having different wavelengths.

18. A three-dimensional shape measuring system according to claim 15, further comprising:

a light distributor for distributing the chirped light pulses; and a light path length adjuster for adjusting the lengths of light paths of the chirped light pulses distributed by the light distributor, so that the distributed chirped light pulses will not overlap each other on one light path.

\* \* \* \* \*